Two Input - Two Output Signal Component Control Compensator which Incorporates Short-Time Memory Units.

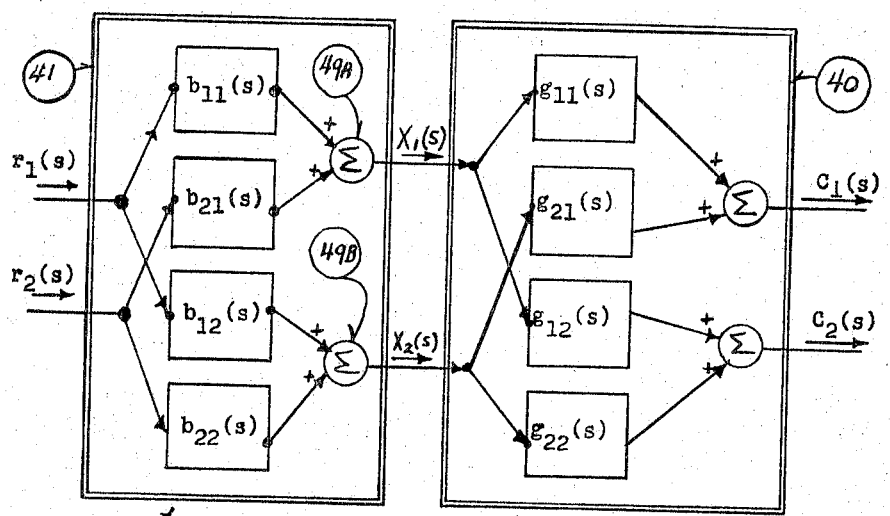

Two Input - Two Output System being Controlled.

FIG. 1

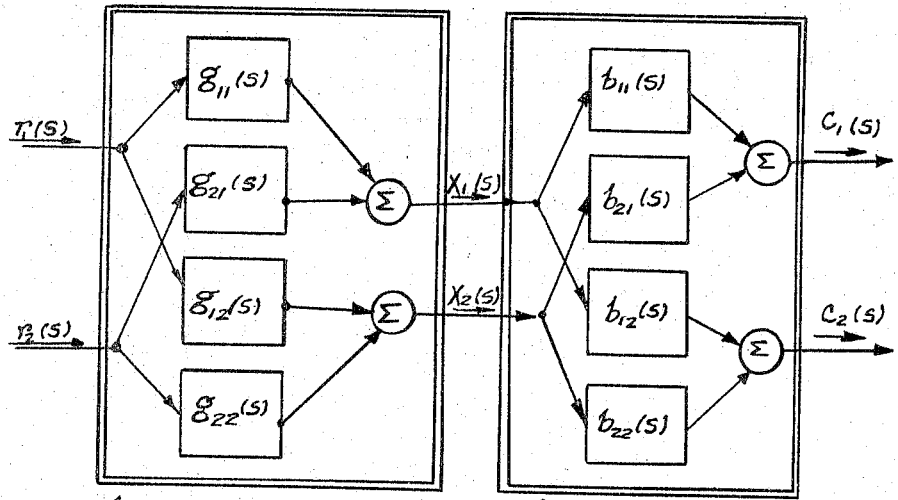

TWO INPUT-TWO OUTPUT SYSTEM BEING CONTROLLED

FIG. IA

TWO INPUT-TWO OUTPUT SIGNAL COMPONENT CONTROL COMPENSATOR WHICH INCORPORATES SHORT-TIME MEMORY UNITS

INVENTORS
JOHN F. CALVERT
RONALD G. SCHULTZ
BY Mann Brown & McWilliams
ATTORNEY

FIG. 3

$$e_1 = \left(\frac{L}{r}\right) pe_2 + K\left[e_2/p\right] + R\left[e_2\right]$$

$$e_2 = ri$$

where,
  $p = \frac{d}{dt}$ and $\frac{1}{p} = \int_0 + dt$
  $L$ = a constant inductance
  $r$ = a constant resistance
$K[e_2/p]$ = function of $[e_2/p]$
$R[e_2]$ = function of $e_2$ In abreviate form, write, $$e_1 = \mathcal{G}^{-1}[e_2],$$

where $\mathcal{G}^{-1}[e_2]$ = function of $[e_2]$

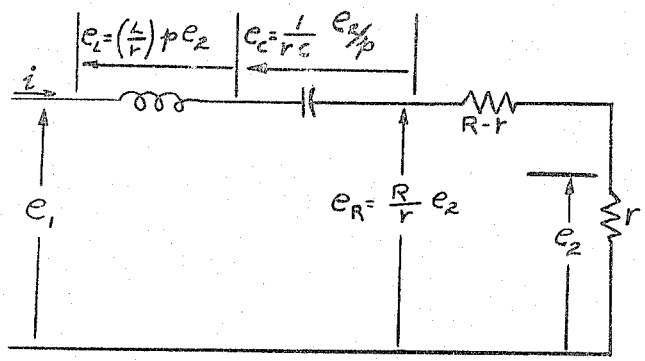
FIG. 6
$$e_1 = \left\{ \frac{Lp}{r} + \frac{1}{rcp} + \frac{R}{r} \right\} e_2$$
$$e_2 = ri$$
$$e_1 = g_{12}^{-1}(p) e_2$$
$$e_2 = g_{12}(p) e_1$$
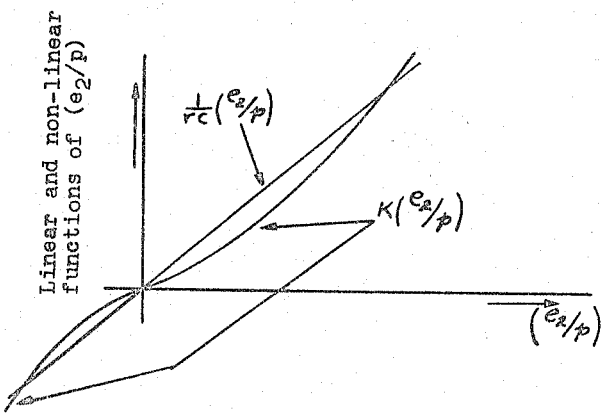
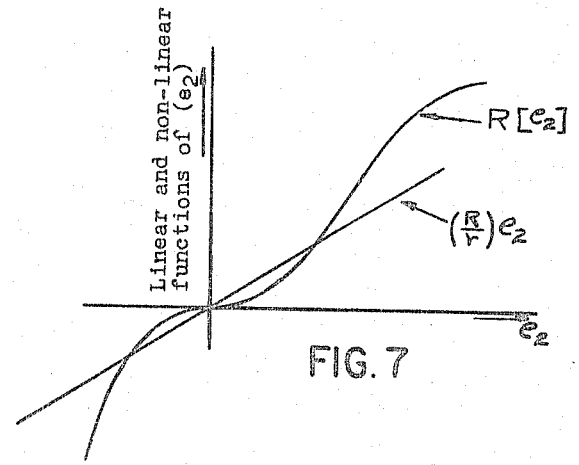
FIG. 7

INVENTORS
JOHN F. CALVERT
RONALD G. SCHULTZ
BY Mann Brown & McWilliams
ATTORNEY $$C(t) = b\left[g_4(g_3 + g_2)g_1\right]V_1(t)$$

$$+ \left\{1 - hb\left[g_4(g_3 + g_2)g_1\right]\right\} \left\{ \begin{array}{l} g_4(g_3 + g_2)g_1\mu_1'(t) \\ + g_4g_2\mu_2'(t) \\ + g_4g_3\mu_3'(t) \\ + g_4\mu_4(t) \\ + g_4(g_2 + g_3)g_1\eta_1(t) \\ + g_4g_2\eta_2(t) \end{array} \right\}$$

INVENTORS
JOHN F. CALVERT
RONALD G. SCHULTZ
BY Mann, Brown & McWilliams
ATTORNEY

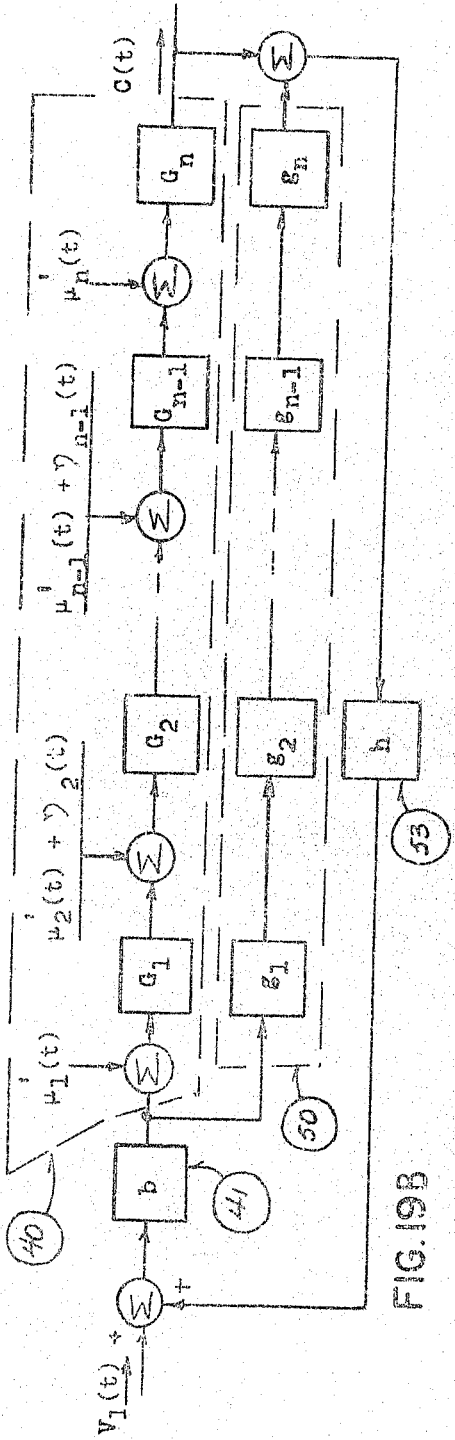

FIG. 19B $$c(t) = b \left[ g_n \cdot g_{n-1} \cdots g_1 \right] v_1(t)$$

$$+ \left[ 1 - hb(g_n g_{n-1} \cdots g_1) \right] \left[ (g_n \cdot g_{n-1} \cdots g_1) \mu_1^i(t) + (g_n \cdot g_{n-1} \cdots g_2) \mu_2^i(t) + \text{etc.} + g_n \mu_n^i(t) \right]$$

$$+ (g_n g_{n-1} \cdots g_2) \gamma_2(t) + \text{etc.} + (g_n g_{n-1}) \gamma_{n-1}(t)$$

OR $$c(t) = BG_{10} v_1(t) + \left[ 1 - hbG_{10} \; G_{10} \right] \left[ \mu_1^i(t) + G_{20}/G_{10} \; \mu_2^i(t) + \ldots + G_{n0}/G_{10} \; \mu_n^i(t) \right]$$

$$+ G_{20}/G_{10} \gamma_2(t) + \ldots + G_{(n-1)}/G_{10} \gamma_{n-1}(t)$$

where, $g_n = G_{n0}$; $g_n \cdot g_{n-1} = G_{(n-1)0}$; $\ldots$ ; $g_n \cdot g_{n-1} \cdots g_1 = G_{10}$

INVENTORS
JOHN F. CALVERT
RONALD G. SCHULTZ

BY Mann, Brown & McWilliams

ATTORNEY

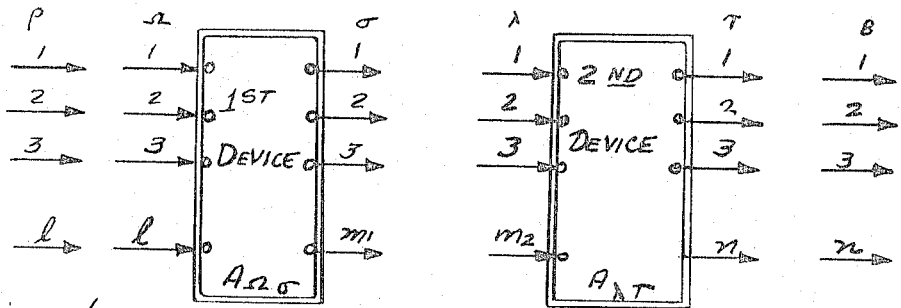

Signals:
$V_\rho(s)$  $X_\Omega(s)$  $X_\sigma(s)$  $X_\lambda(s)$  $X_\tau(s)$  $C_\theta(s)$ Transfer functions: $A_{\Omega\sigma}(s)$  $A_{\lambda\tau}(s)$ Subscripts
$\rho = 1, 2, 3, \cdots, \ell$  $\sigma = 1, 2, 3, \cdots, m_1$  $\tau = 1, 2, 3, \cdots, n$
$\Omega = 1, 2, 3, \cdots, \ell$  $\lambda = 1, 2, 3, \cdots, m_2$  $\theta = 1, 2, 3, \cdots, n$ Relations:
$\rho = \Omega$  $\sigma = \lambda$  $\tau = \theta$
$V_\rho(s) = X_\Omega(s)$  $X_\sigma(s) = X_\lambda(s)$  $X_\tau(s) = C_\theta(s)$
$A_{\Omega\sigma}(s) X_\Omega(s) = X_\sigma(s)$ and $A_{\lambda\tau}(s) X_\lambda(s) = X_\tau(s)$

FIG. 24

United States Patent Office 3,317,719
Patented May 2, 1967

3,317,719
SHORT-TIME MEMORY DEVICES IN MULTIPLE INPUT-MULTIPLE OUTPUT CONTROL
John F. Calvert and Ronald G. Schultz, Pittsburgh, Pa., assignors to John F. Calvert, as trustee
Filed Dec. 20, 1962, Ser. No. 246,175
39 Claims. (Cl. 235—151.1)

The present invention is concerned with the use of short-time memory devices in closed-loop control systems and in open-loop control systems. This invention is concerned with feedforward-feedback control systems as well as with simply feedback control systems and, in particular, it is concerned with control systems which have a plurality of input signals, or a plurality of output signals, or a plurality of input signals and also a plurality of output signals.

Various types of short-time memory device, or signal component control devices have been developed for use as compensators, or parts of compensators, or lead networks, both for use in open-loop and in closed-loop control systems. For such control systems, employing the said short-time memory devices, or signal-component control techniques, it has been shown that the band width of any given control system could be substantially increased. For reference concerning these statements and demonstrations thereof, see U.S. Patent No. 2,801,351 and also U.S. Patent No. 3,010,035. These earlier inventions emphasized control systems in which there was a single input signal and a single output signal though these earlier inventions were not specifically restricted in their application to systems with single inputs and single outputs.

The principal objectives of the present invention are as follows:

(1) The first objective is to compel, at all times, the output signals from the total control system to be substantially equal to specified functions of the input signals, or command functions, while, at the same time, maintaining system stability throughout all parts of the total control system.

(2) The second objective is to cause the effects of noise, load disturbance, and various other disturbances occurring within the system being controlled to have small effects or else substantially no effects, on the output signals of the total control system while, at the same time, compelling the output signals to be substantially predetermined functions of the input signals and while, at the same time, maintaining stability throughout the total control system.

(3) The third objective applies specifically to total control systems within which the part of the system being controlled contains one or more nonlinear elements. It is intended to make the nonlinear total control system act substantially like a linear system while, at the same time, compelling the output signals to be substantially equal to predetermined functions of the input signals to the total control system and while, at the same time, maintaining stability throughout the total control system.

(4) The fourth objective is to cause either a linear, or a nonlinear, interacting system being controlled, to act as a linear non-interacting system being controlled while, at the same time, making each output signal substantially equal to a specified single input signal and while, at the same time, maintaining stability throughout the total control system.

(5) The fifth objective is to cause a multiple input-multiple output nonlinear interacting system being controlled which is subject to noise and possible load and internal disturbance to act substantially like a multiple input-multiple output linear non-interacting control system without noise, or load, or other disturbance while, at the same time, compelling each single output signal to perform substantially as a specified function of a single specific input signal to the total control system and while maintaining stability throughout the total control system.

DESCRIPTION OF FIGURES

FIGURE 1 is a block diagram of an open-loop total control system having a two input-two output signal component control compensator 41, which incorporates short-time memory units in the blocks of that item bearing the legends $b_{11}(S)$, $b_{21}(S)$, $b_{12}(S)$ and $b_{22}(S)$. The said blocks can each be like item 21 of FIGURE 1 of U.S. Patent 3,010,035, dated Nov. 21, 1961. The said two input-two output signal component control compensator 41 in FIGURE 1 is shown cascaded with the two input-two output system being controlled, 40, where, in the system being controlled, there are paths for signals shown between each input point and each output point. The transfer functions from input points to output points for the system being controlled are designated as $g_{11}(S)$, $g_{21}(S)$, $g_{12}(S)$ and $g_{22}(S)$.

FIGURE 1A is like FIGURE 1 except that the SCC compensator follows the system being controlled rather than preceding the said system.

FIGURE 2 also illustrates those principles taught through FIGURE 1 of U.S. Patent 3,010,035. In FIGURE 2, item 45 is the delay line, or other short-time memory device, the blocks $B_0$ through $B_3$ designate multiplying units for the signal from the entrance to the delay line unit and from points along the said unit. Item 49 designates a summing device, and item 43 is the same as item 23 of FIGURE 1 of U.S. Patent 3,010,035. Item 40 of FIGURE 2, the part of the system being controlled, is the same as item 20 of FIGURE 1 of U.S. Patent 3,010,035. The said item 40 also could represent any one path from an input to an output terminal in the system being controlled of FIGURE 1.

FIGURE 3 shows how two delay lines or short-time memory units, 45A and 45B, can be employed to do the work of delaying the signal, changing the magnitude and, if desired, the signs of the signals passing through the SCC compensator, so as to form pluralities of signal components. The said pluralities of signal components are summed at items 49A and 49B. No $[N_{\alpha x \beta}(s)]$ units are incorporated in this figure though they could be. The system being controlled is designated as item 40. FIGURE 3 is intended to serve as a further illustration of FIGURE 1 of this present disclosure.

FIGURE 4 shows, in addition, feedback control paths 53, which can also incorporate SCC equipment or else other physical apparatus.

FIGURE 6 shows the linearized version of the electrical circuit of FIGURE 5.

FIGURE 7 shows examples of the linear representations of the types of nonlinear system elements in terms of performance for those elements illustrated in FIGURES 5 and 6.

FIGURE 13 shows a general multi-port system of the type illustrated by the two-port system of FIGURE 4.

FIGURE 19B serves FIGURE 19A as FIGURE 18B serves FIGURE 18A. FIGURES 18A through 19B have been introduced simply to illustrate that, regardless of the complicated nature of the system being controlled, the techniques and equipment set forth in relation to this disclosure can be employed for the reduction of the effects on system output of noise, load disturbance, and system nonlinearities.

FIGURE 24 is a figure that will be used to provide a basis in the specification for the subscripts that are used in the claims.

THEORY

So far as seems practicable, the symbols and definitions for feedback control systems proposed in the AIEE Committee Report entitled "Proposed Symbols and Terms for Feedback Control Systems," as published in Electrical Engineering, vol. 70, October 1951, pp. 905–909, will be employed throughout this disclosure. However, reference should be made at this time to the section in this disclosure which is entitled Symbols and Definitions. In the present invention the Heaviside operator is frequently used rather than the complex variable of the Laplace calculus. The reason for this choice is that the Heaviside operator seems more appropriate for the nonlinear systems, and it sometimes seems desirable to treat both the linear and the similar nonlinear system in the same manner.

For illustrative purposes, the theoretical discussion will start with a total control system which has two input signals and two output signals. Subsequently, the discussion will be extended to systems which can have any finite number of input signals and any finite number of output signals.

Figure 2:
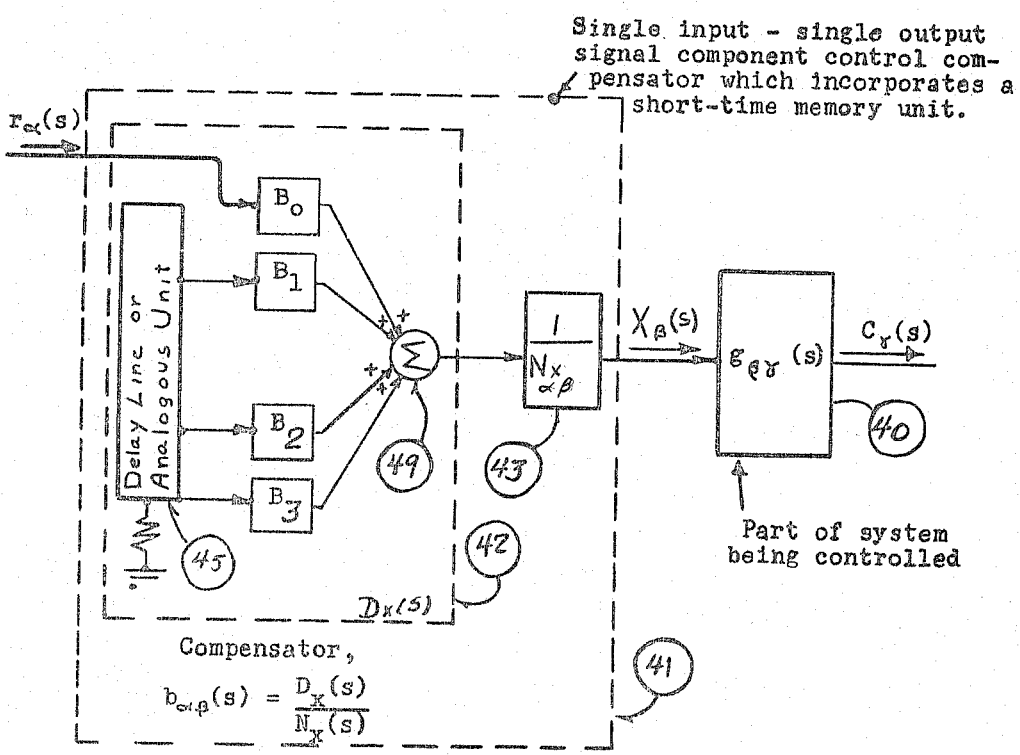
FIGURE 2 shows a single input-single output open-loop total control system which includes a single signal component control (SCC) compensator, 41. This figure corresponds to a single path from one command function or input point in FIGURE 1 to one output or controlled variable point of that figure.

Refer, now, to FIGURES 1 and 2. FIGURE 1 shows a set of short-time memory devices arranged with one such device between each input and output terminal of the set. FIGURE 2 shows one form of short-time memory device. However, references should be made to U.S. Patent 2,801,351 and U.S. Patent 3,010,035 for further claims and details regarding such said devices. For the whole device 41 of FIGURE 2

$$b_{\alpha\beta}(s) = \{B_0 + B_1 \epsilon^{-T_1 s} + B_2 \epsilon^{-T_2 s} + B_3 \epsilon^{-T_3 s}\} \frac{1}{N_{\alpha_x \beta}(s)}$$

(38–1)

Reference to FIGURE 1 shows that $\alpha = 1, 2$ and $\beta = 1, 2$ and that $b_{11}(s)$, $b_{12}(s)$, $b_{21}(s)$, and $b_{22}(s)$ are the transfer operators for the set of compensators which contain short-time memory devices. If $r_\alpha(s)$ is the reference input to the device of FIGURE 2, the output becomes $$b_{\alpha\beta}(s)r_\alpha(s) = \left[\frac{1}{N_{\alpha_x\beta}(s)}\right] \begin{Bmatrix} B_{\alpha_0\beta}r_\alpha(s) + B_{\alpha_1\beta}\epsilon^{-T_1s}r_\alpha(t) + \\ B_{\alpha_2\beta}\epsilon^{-T_2s}r_\alpha(s) + B_{\alpha_3\beta}\epsilon^{-T_3s}r_\alpha(t) \end{Bmatrix} \quad (38-2)$$

Returning to the time domain and using the Heaviside notation to illustrate the delay features, we have for conditions $t > T_1$, $T_2$, and $T_3 > 0$ $$b_{\alpha\beta}(p)r_\alpha(t) = \left[\frac{1}{N_{\alpha_x\beta}(p)}\right] \begin{Bmatrix} B_{\alpha_0\beta}r(t) + \\ B_{\alpha_1\beta}(p)r_\alpha(t-T_1)U(t-T_1) + \\ B_{\alpha_2\beta}r_\alpha(t-T_2)U((t-T_2) + \\ B_{\alpha_3\beta}r_\alpha(t-T_3)U(t-T_3) \end{Bmatrix} \quad (38-3)$$

where $U(t-T_1)$ is a unit step function beginning at $t = T_1$ and $N_{\alpha_x\beta}(p)$ is of the form of a polynomial in $p$.

Figure 3:
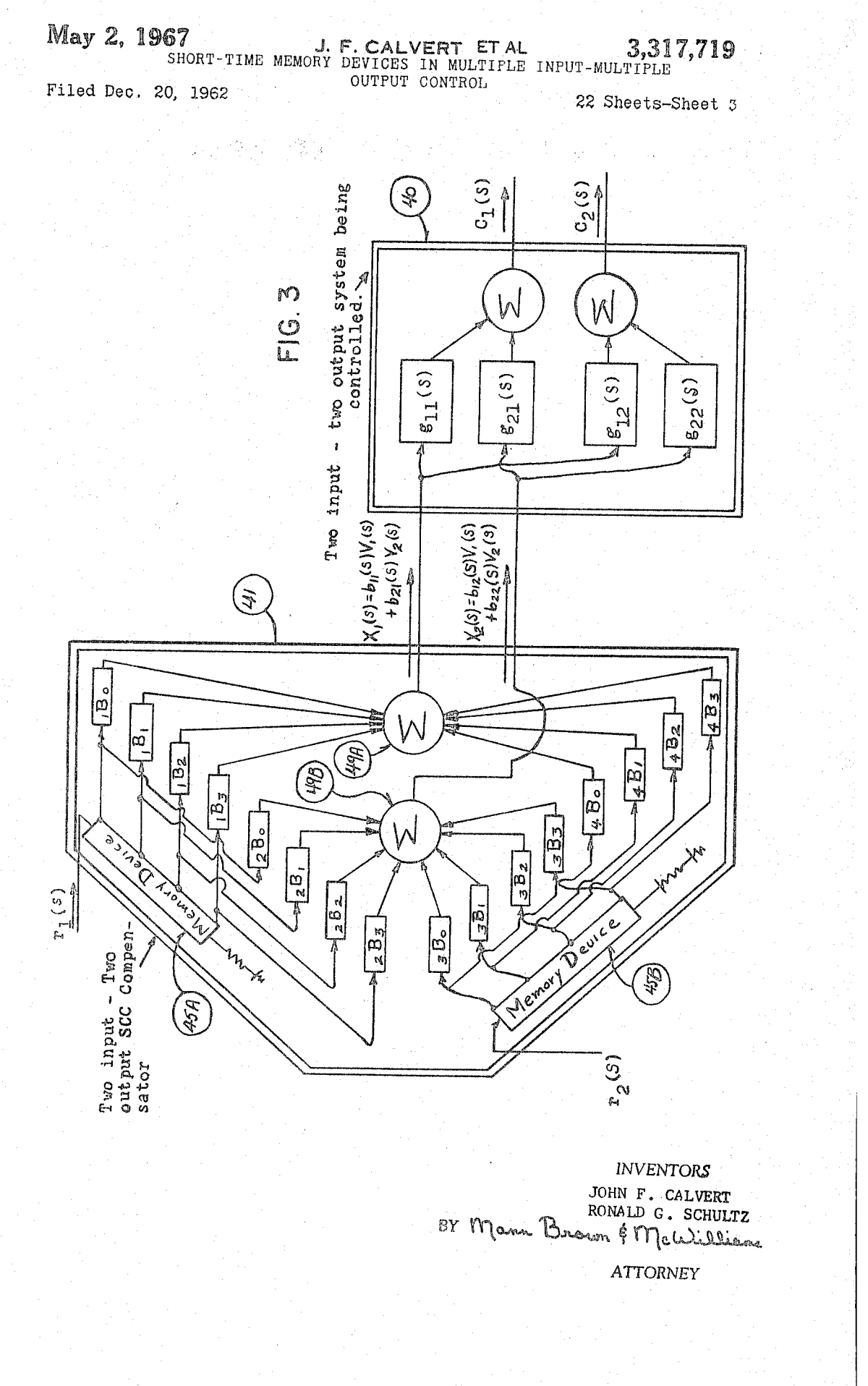

FIGURE 3 shows that the compensator or SCC device of FIGURE 1 is a combination of several units like that of FIGURE 2.

Returning, now to FIGURE 1:

$$X_1(s) = b_{11}(s)r_1(s) + b_{21}(s)r_2(s) \quad (38-4)$$

$$X_2(s) = b_{12}(s)r_1(s) + b_{22}(s)r_2(s)$$

$$C_1(s) = g_{11}(s)X_1(s) + g_{21}(s)X_2(s) \quad (38-5)$$

$$C_2(s) = g_{12}(s)X_1(s) + g_{22}(s)X_2(s)$$

$$C_1(s) = g_{11}(s)b_{11}(s)r_1(s) + g_{11}(s)b_{21}(s)r_2(s) \quad (38-6)$$
$$+ g_{21}(s)b_{12}(s)r_1(s) + g_{21}(s)b_{22}(s)r_2(s)$$

$$C_2(s) = g_{12}(s)b_{11}(s)r_1(s) + g_{12}(s)b_{21}(s)r_2(s) \quad (38-7)$$
$$+ g_{22}(s)b_{12}(s)r_1(s) + g_{22}(s)b_{22}(s)r_2(s)$$

$$C_1(s) = [g_{11}(s)b_{11}(s) + g_{21}(s)b_{12}(s)]r_1(s) \quad (38-8)$$
$$+ [g_{11}(s)b_{21}(s) + g_{21}(s)b_{22}(s)]r_2(s)$$

$$C_2(s) = [g_{12}(s)b_{11}(s) + g_{22}(s)b_{12}(s)]r_1(s) \quad (38-9)$$
$$+ [g_{12}(s)b_{21}(s) + g_{22}(s)b_{22}(s)]r_2(s)$$

The foregoing relations are in general form, where a system, or group, of short-time memory devices are cascaded with a system being controlled, and where the system being controlled is linear, or else can be treated as though it were linear.

Suppose that $r_1(s)$ and $r_2(s)$ are the transforms of purely sinusoidal signals so that $s = o + j\omega$. Thus $r_1(s)$ can be replaced by $r_1(j\omega)$, and $r_2(s)$ by $r_2(j\omega)$ and, with reference to Equations 38-8 and 38-9, write:

$$[g_{11}(j\omega)b_{11}(j\omega) + g_{21}(j\omega)b_{12}(j\omega)] = |BG|_{11}\epsilon^{-jT_1\omega} \quad (38-10)$$

$$[g_{12}(j\omega)b_{11}(j\omega) + g_{22}(j\omega)b_{12}(j\omega)] = |BG|_{12}\epsilon^{-jT_1\omega}$$

$$[g_{11}(j\omega)b_{21}(j\omega) + g_{21}(j\omega)b_{22}(j\omega)] = |BG|_{21}\epsilon^{-jT_2\omega} \quad (38-11)$$

$$[g_{12}(j\omega)b_{21}(j\omega) + g_{22}(j\omega)b_{22}(j\omega)] = |BG|_{22}\epsilon^{-jT_2\omega}$$

Then, from Equations 38-10 and 38-11 rewrite Equations 38-8 and 38-9 as follows:

$$C_1(j\omega) = |BG|_{11}\epsilon^{-jT_1\omega}r_1(j\omega) \quad (38-8A)$$
$$+ |BG|_{21}\epsilon^{-jT_2\omega}r_2(j\omega)$$

$$C_2(j\omega) = |BG|_{12}\epsilon^{-jT_1\omega}r_1(j\omega) \quad (38-9A)$$
$$+ |BG|_{22}\epsilon^{-jT_2\omega}r_2(j\omega)$$

While, also from Equations 38-10, $$b_{11}(j\omega) = \frac{\begin{vmatrix} |BG|_{11} & g_{21}(j\omega) \\ |BG|_{12} & g_{22}(j\omega) \end{vmatrix}\epsilon^{-jT_1\omega}}{\nabla}$$

$$b_{12}(j\omega) = \frac{\begin{vmatrix} g_{11}(j\omega) & |BG|_{11} \\ g_{12}(j\omega) & |BG|_{12} \end{vmatrix}\epsilon^{-jT_1\omega}}{\nabla} \quad \Bigg\} (38-12)$$

While also from Equations 38-11, $$b_{21}(j\omega) = \frac{\begin{vmatrix} |BG|_{21} & g_{21}(j\omega) \\ |BG|_{22} & g_{22}(j\omega) \end{vmatrix}\epsilon^{-jT_2\omega}}{\nabla}$$

$$b_{22}(j\omega) = \frac{\begin{vmatrix} g_{11}(j\omega) & |BG|_{21} \\ g_{12}(j\omega) & |BG|_{22} \end{vmatrix}\epsilon^{-jT_2\omega}}{\nabla} \quad \Bigg\} (38-13)$$

where, in Equations 38-12 and 38-13, $$\nabla = \begin{vmatrix} g_{11}(j\omega) & g_{21}(j\omega) \\ g_{12}(j\omega) & g_{22}(j\omega) \end{vmatrix} \quad (38-14)$$

Physical equipment, and means for providing the desired transfer functions $b_{11}(j\omega)$, $b_{12}(j\omega)$, $b_{21}(j\omega)$ and $b_{22}(j\omega)$, will be considered. As a specific example, start with $b_{11}(j\omega)$.

Assume, first, that for the system being controlled, $$\nabla \neq 0 \quad (38-14a)$$

Prior to the design of any physical equipment, choose desired values of $|BG|_{11}$, $|BG|_{12}$, and $T_1$. Then, directly employing the top line of Equations 12 and also employing Equation 38-14, calculate the desired value of $b_{11}*(j\omega)$ where $$b_{11}*(j\omega) = \frac{D_{11}(j\omega)}{N_{11}(j\omega)}\epsilon^{-jT_1\omega} \quad (38-15)$$

and where, $D_{11}(j\omega)$ and $N_{11}(j\omega)$ are each polynominals in $(j\omega)$.

Refer, now, to U.S. Patents 2,801,351 and 3,010,035, wherein it is shown how physical equipment involving a tapped delay line, or tapped short-time memory device can be cascaded with lumped constant type equipment, and wherein it is shown how that equipment can be designed and built, so that the transfer function for the said equipment will be:

$$b_{11}(j\omega) = \frac{D_{x11}(j\omega)}{N_{x11}(j\omega)}\epsilon^{-jT_1\omega}$$

wherein, $$D_{x11}(j\omega) \cong D_{11}(j\omega)$$

$$N_{x11}(j\omega) \cong N_{11}(j\omega) \quad \Bigg\} (38-16)$$

when, as stated above, $D_{11}(j\omega)$ and $N_{11}(j\omega)$ are polynominals.

Exactly, parallel procedures can be applied to determine the desired values $b_{21}*(j\omega)$, $b_{12}*(j\omega)$, and $b_{22}*(j\omega)$. Following this, similar procedures can be employed to design the equipment which will produce the actual values of $b_{21}(j\omega)$, $b_{12}(j\omega)$, and $b_{22}(j\omega)$.

Once the expression for $b_{11}(j\omega)$ has been obtained in accord with Equation 38-16, the equipment can be designed and constructed in accord with U.S. Patents 2,801,351 and 3,010,035. The same can be said once $b_{21}(j\omega)$, $b_{12}(j\omega)$ and $b_{22}(j\omega)$ have been similarly expressed. Note, however, that the number of short-time memory devices, or delay lines, employed need not be more than the number of input signals which, in the presently discussed example, is two. Thus, for $b_{11}(j\omega)$, $b_{21}(j\omega)$, $b_{12}(j\omega)$ and $b_{22}(j\omega)$ four sets of attenuators, and summers can be used, while only two short-time memory devices are required. In many cases, the number of summers can be reduced also, as may be seen from the drawings.

Equations 38–8 and 38–9 show $C_1(j\omega)$ and $C_2(j\omega)$ each to be function of $r_1(j\omega)$ and $r_2(j\omega)$. While this is possible, it also is possible to so build the equipment producing $b_{11}(j\omega)$, $b_{21}(j\omega)$, $b_{12}(j\omega)$ and $b_{22}(j\omega)$ that any or all of the cross terms, namely, $|BG|_{12}$ and $|BG|_{21}$, can be made substantially zero. Thus, a normally interacting system being controlled could be made non-interacting. Thus, for example, if $$|BG|_{21} \cong |BG|_{12} \cong 0$$

then, $$C_1(j\omega) = |BG|_{11} \epsilon^{-jT_1\omega} r_1(j\omega) \quad (38\text{–}8A)$$

$$C_2(j\omega) = |BG|_{22} \epsilon^{-jT_2\omega} r_2(j\omega) \quad (38\text{–}9A)$$

Note that U.S. Patent 2,801,351 describes and claims the adjustment of the time delays and of the amplification magnitudes for the taps of the delay lines or short-time memory devices. Today, this could be called adaptive control. This, too, then, is possible so that the transfer functions of the Equations 38–9 and 38–9A can be changed at will or else changed as functions of variables in the system being controlled.

This concludes, for the present, the illustrative case involving the two input-two linear system being controlled when there is cascaded therewith, as a lead network, a signal component control arrangement which includes a short-time memory device or devices. It has been shown how each output of the total open-loop control system so formed can be made a function of either, or both, input signals, or command functions.

The next situation to be considered is that wherein the foregoing total cascaded equipment forms the forward path of a feedback control system.

In the work thus far, terms like $|BG|_{\alpha\beta}\epsilon^{-jT\omega}$, where $\alpha=1, 2$ and $\beta=1, 2$, have been introduced to represent a combination of transfer functions (see Equations 38–10 and 38–11). These terms, like $|BG|_{\alpha\beta}\epsilon^{-jT\omega}$, were not physically realized. Instead, steps were taken, through Equations 38–12 through 38–14, to show the desired values for $b_{11}*(j\omega)$, $b_{12}*(j\omega)$, $b_{21}*(j\omega)$, and $b_{22}*(j\omega)$ which represented the input-output transfer functions which could be closely approximated with lead networks and which included short-time memory devices.

In the next part of this theoretical discussion, the terms $[B(s)G(s)]_{11}$, $[B(s)G(s)]_{21}$, $[B(s)G(s)]_{12}$, and $$[B(s)G(s)]_{22}$$

will be introduced as mathematical concepts which, again, can be obtained from an ensemble of equipment just as has been described earlier.

Figure 4:
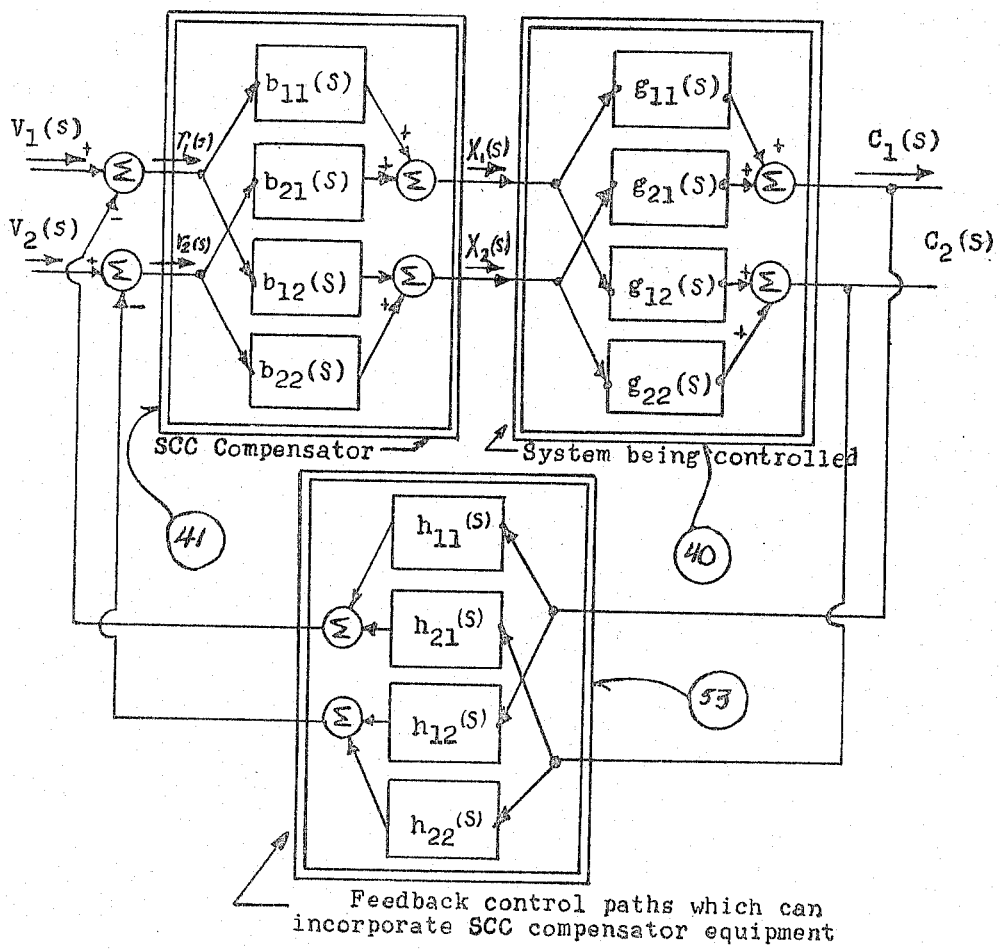
FIGURE 4 shows the block diagram for a two input-two output total control system which includes signal component control equipment 41 in the forward paths cascaded with the system being controlled, 40, just as is done in FIGURE 1. However.

Refer, now, to FIGURE 4. Since the system, shown therein, is to be treated as linear, either the Heaviside or the Laplace calculus notation might be used. The latter is employed below. It is, today, the more conventional notation for linear systems:

$$C_1(s) = [B(s)G(s)]_{11}r_1(s) + [B(s)G(s)]_{21}r_2(s)$$
$$(38\text{–}17)$$

$$C_2(s) = [B(s)G(s)]_{12}r_1(s) + [B(s)G(s)]_{22}r_2(s)$$

where, $$[g_{11}(s)b_{11}(s) + g_{21}(s)b_{12}(s)] = [B(s)G(s)]_{11}$$
$$(38\text{–}10A)$$

$$[g_{12}(s)b_{11}(s) + g_{22}(s)b_{12}(s)] = [B(s)G(s)]_{12}$$

$$[g_{11}(s)b_{21}(s) + g_{12}(s)b_{22}(s)] = [B(s)G(s)]_{21}$$
$$(38\text{–}11A)$$

$$[g_{12}(s)b_{21}(s) + g_{22}(s)b_{22}(s)] = [B(s)G(s)]_{22}$$

Also from FIGURE 4, $$r_1(s) = V_1(s) + h_{11}(s)C_1(s) + h_{21}(s)C_2(s)$$
$$(38\text{–}18)$$

$$r_2(s) = V_2(s) + h_{12}(s)C_1(s) + h_{22}(s)C_2(s)$$

Then, from Equations 38–17 and 38–18, $$C_1(s) = [B(s)G(s)]_{11}V_1(s) + [B(s)G(s)]_{11}h_{11}(s)C_1(s)$$
$$+ [B(s)G(s)]_{11}h_{21}(s)C_2(s)$$
$$+ [B(s)G(s)]_{21}V_2(s) \quad (38\text{–}19)$$
$$+ [B(s)G(s)]_{21}h_{12}(s)C_1(s)$$
$$+ [B(s)G(s)]_{21}h_{22}(s)C_2(s)$$

$$C_2(s) = [B(s)G(s)]_{12}V_1(s) + [B(s)G(s)]_{12}h_{11}(s)C_1(s)$$
$$+ [B(s)G(s)]_{12}h_{21}(s)C_2(s) + [B(s)G(s)]_{22}V_2(s)$$
$$+ [B(s)G(s)]_{22}h_{12}(s)C_1(s) + [B(s)G(s)]_{22}h_{22}(s)C_2(s)$$
$$(38\text{–}20)$$

Equations 38–19 and 38–20 lead to the following, $$\{1 - ([B(s)G(s)]_{11}h_{11}(s) + [B(s)G(s)]_{12}h_{12}(s)\}C_1(s)$$
$$- \{[B(s)G(s)]_{11}h_{21}(s) + [B(s)G(s)]_{21}h_{22}(s)\}C_2(s)$$
$$= [B(s)G(s)]_{11}V_1(s) + [B(s)G(s)]_{21}V_2(s)$$
$$(38\text{–}21)$$

$$-\{[B(s)G(s)]_{12}h_{11}(s) + [B(s)G(s)]_{22}h_{12}(s)\}C_1(s)$$
$$+\{1 - ([B(s)G(s)]_{12}h_{21}(s)$$
$$+ [B(s)G(s)]_{22}h_{22}(s))\}C_2(s)$$
$$= [B(s)G(s)]_{12}V_1(s)$$
$$+ [B(s)G(s)]_{22}V_2(s) \quad (38\text{–}22)$$

In Equations 38–10A, 38–11A, and 38–17 through 38–22, the variable S of the Laplace calculus appears throughout, it could be understood as present though left out for simplicity of writing. Proceeding on that basis Equations 38–21 and 38–22 yield the following:

$$\nabla = \begin{vmatrix} \{1 - ([BG]_{11}h_{11} + [BG]_{21}h_{12})\} & -\{[BG]_{11}h_{21} + [BG]_{21}h_{22}\} \\ -\{[BG]_{12}h_{11} + [BG]_{22}h_{12}\} & \{1 - ([BG]_{12}h_{21} + [BG]_{21}h_{22})\} \end{vmatrix}$$
$$(38\text{–}23)$$

and, $$C_1 = \frac{\begin{vmatrix} \{[BG]_{11}V_1 + [BG]_{21}V_2\} & -\{[BG]_{11}h_{21} + [BG]_{21}h_{22}\} \\ \{[BG]_{12}V_1 + [BG]_{22}V_2\} & \{1 - ([BG]_{12}h_{21} + [BG]_{22}h_{22})\} \end{vmatrix}}{\nabla}$$
$$(38\text{–}24)$$

$$C_2 = \frac{\begin{vmatrix} \{1 - ([BG]_{11}h_{11} + [BG]_{21}h_{12})\} & \{[BG]_{11}V_1 + [BG]_{21}V_2\} \\ -\{[BG]_{12}h_{11} + [BG]_{22}h_{12}\} & \{[BG]_{12}V_1 + [BG]_{22}V_2\} \end{vmatrix}}{\nabla}$$
$$(38\text{–}25)$$

Equations 38–23 through 38–25 show the performance of a two-port linear, feedback, interacting control system in which short-time memory devices and SCC techniques are assumed to be used, at least in the forward paths. These devices and techniques can be used in the feedback paths as well. These said Equations 38–23 through 38–25 as written, describe an interacting system. However, various modifications can be made. For example, the system can be made non-interacting. To do this, choose, $$[B(S)G(s)]_{12} \cong [B(s)G(s)]_{21} \cong 0 \quad (38\text{–}26)$$

Then, by comparing Equations 38–10A with 38–10 and 38–11A with 38–11, and by reference to Equations 38–12 through 38–14; it is seen how the forward paths of the feedback control system of FIGURE 4 can be made to be substantially non-interacting. Then, in Equations 38–21 and 38–22, $h_{21}(s)$ and $h_{12}(s)$ are made zero by simply omitting the correspondingly implied two feedback control paths of FIGURE 4. These procedures reduce Equations 38–24 and 38–25 to Equations 38–24A and 38–25A, respectively.

$$C_1 = \frac{\{1 - [BG]_{22}h_{22}\}[BG]_{11}V_1}{\{1 - [BG]_{11}h_{11}\}\{1 - [BG]_{22}h_{22}\}}$$
$$(38\text{–}24A)$$

$$C_1 = \frac{[BG]_{11}V_1}{\{1-[BG]_{11}h_{11}\}}$$

$$C_2 = \frac{\{1-[BG]_{11}h_{11}\}[BG]_{22}V_2}{\{1-[BG]_{11}h_{11}\}\{1-[BG]_{22}h_{22}\}}$$

(38-25A)

$$C_2 = \frac{[BG]_{22}V_2}{\{1-[BG]_{22}h_{22}\}}$$

Again, the forming of the equations has been made possible to a very large extent by the flexible and unique characteristics of the signal component control techniques involving the use of short-time memory devices. The necessary forming of terms is achieved by these techniques and devices.

It has been shown how the feedback control system could be made non-interacting. A variety of modifications of Equations 38-23 through 38-25 are possible. Examples will be given.

The use of the short-time memory devices, using sinusoidal inputs so that $s = o + j\omega$, make it possible, for lower values of $\omega$, to keep $[B(j\omega)G(j\omega)]_{\alpha\beta}$ (where $\alpha = 1, 2$ and $\beta = 1, 2$) nearly constant in magnitude and to yield a slow linear phase shift, or lag, with frequency. Although not taken up in detail, the introduction of $h(j\omega)_{\gamma a}$, ($\gamma = 1, 2$) can be employed so that $\{[B(j\omega)G(j\omega)]_{\alpha\beta}h(j\omega)_{\gamma a}\}$, for example, while no longer having linear phase shift, will have almost no phase shift until $\omega$ becomes quite large. Therefore, over quite a range for $\omega$, it is possible to make the following two terms quite small.

$$\{1-([B(j\omega)G(j\omega)]_{11}h_{11}(j\omega) + [B(j\omega)G(j\omega)]_{21}h_{12}(j\omega))\}$$

and $$\{1-([B(j\omega)G(j\omega)]_{12}h_{21}(j\omega) + [B(j\omega)G(j\omega)]_{22}h_{22}(j\omega))\}$$

(38-26)

To estimate this effect suppose that these last two expressions were neglected, the Equations 38-23 through 38-25 yield the following (omitting the $(j\omega)$ quantity for simplicity in writing the equations):

$$C_1 \cong \frac{\{[BG]_{11}h_{21} + [BG]_{21}h_{22}\}\{[BG]_{12}V_1 + [BG]_{22}V_2\}}{-\{[BG]_{12}h_{11} + [BG]_{22}h_{12}\}\{[BG]_{11}h_{21} + [BG]_{21}h_{22}\}}$$

$$C_1 \cong \frac{-\{[BG]_{21}V_1 + [BG]_{22}V_2\}}{\{[BG]_{12}h_{11} + [BG]_{22}h_{12}\}}$$

(38-24B)

$$C_2 \cong \frac{+\{[BG]_{12}h_{11} + [BG]_{22}h_{12}\}\{[BG]_{11}V_1 + [BG]_{12}h_2\}}{-\{[BG]_{12}h_{11} + [BG]_{22}h_{12}\}\{[BG]_{11}h_{21} + [BG]_{12}h_{22}\}}$$

$$C_2 \cong \frac{-\{[BG]_{11}V_1 + [BG]_{21}V_2\}}{\{[BG]_{11}h_{21} + [BG]_{12}h_{22}\}}$$

(38-25B)

At low frequencies, with $\omega$ as the variable, $C_1(j\omega)$ and $C_2(j\omega)$ can be made to take on various values as functions of $V_1(j\omega)$ and $V_2(j\omega)$.

Throughout the discussion of the total feedback control system of FIGURE 4, stability has not been discussed. Attention is called, now, to the rigorous proof for the applicability of the Nyquist criteria when discrete delays appear in the overall control system, which proof is presented in U.S. Patent 3,010,035. The proof therein presented shows the adequacy of the Nyquist criteria when applied to the study of stability in any linear closed-loop system presented in the present disclosure.

The two input-two output control system discussed, thus far, will be given greater generality. It will be assumed that the system contains nonlinear elements, as will be described below, and also that the system is subject to noise and to load disturbances. It will be shown how, employing the short-time memory devices and SCC techniques, the said control system can be made to perform, substantially, as if it were linear, and subjected neither to noise nor to load disturbances.

Figure 5:
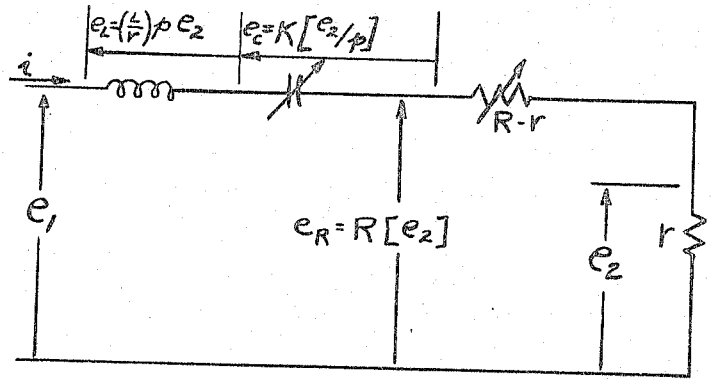
FIGURE 5 illustrates, by means of a simple non-linear electrical system, the types of system nonlinearities which can be incorporated in the system being controlled whether the system being controlled is electrical, mechanical, hydraulic, or any suitable combinations thereof.

The types of system nonlinearites assumed are illustrated by an example in FIGURES 5 through 7 for an electrical system. They are nonlinear resistance and nonlinear capacitance in the illustration. The essential feature is that the usual parameters are made nonlinear and single valued. If the system being controlled were mechanical, hydraulic, pnumatic, or the like, analogous assumptions would be introduced.

For the nonlinear system, the input signal can still be expressed in closed form in terms of the output signal. Thus, in the example, with the presence of noise, $$G^{-1}C(t) = Lp^2C(t) + R_1[pC(t)] + k[C(t)]$$
$$= X(t) + \mu'(t)$$

(38-26)

The linearized version becomes, $$g^{-1}C(t) = Lp^2C(t) + RpC(t) + KC(t)$$
$$= X(t) + \mu'(t) + \Delta\mu'(t) + \eta'(t)$$

(38-27)

where $\Delta\mu'(t)$ = the change in $\mu'(t)$, or noise and load disturbance.

$\eta'(t)$ = the change due nonlinearity terms.

These last two terms are not really separable. Hence, let, $$\eta(t) = \eta'(t) + \Delta\mu'(t) = g^{-1}[C(t)] - G^{-1}[C(t)]$$

(38-28)

While $[\eta(t)]$ cannot be found without knowing $C(t)$, it is claimed that, with the linearized version $g^{-1}[C(t)]$ chosen, there always will be a $[\eta(t)]$ which will satisfy Equation 38-28.

Figure 8A:
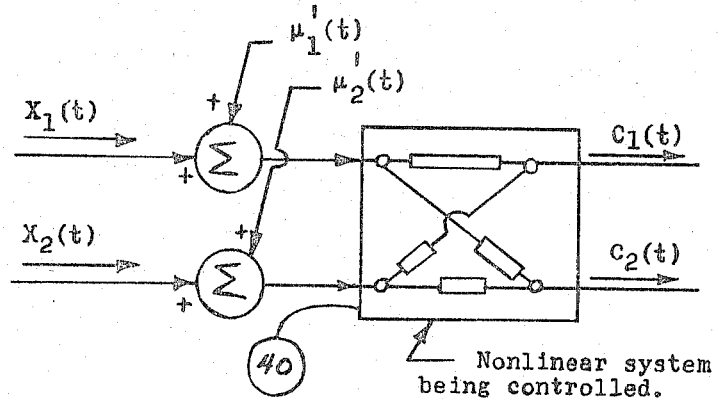
FIGURE 8A illustrates, in block diagram form, a two input-two output system being controlled, 40, including noise and load disturbance effects $\mu_1'(t)$ and $\mu_2'(t)$. While it shows that signal paths exist between each input and each output point, these paths are not given specific designation in this figure as they will be in the next.
Figure 8B:
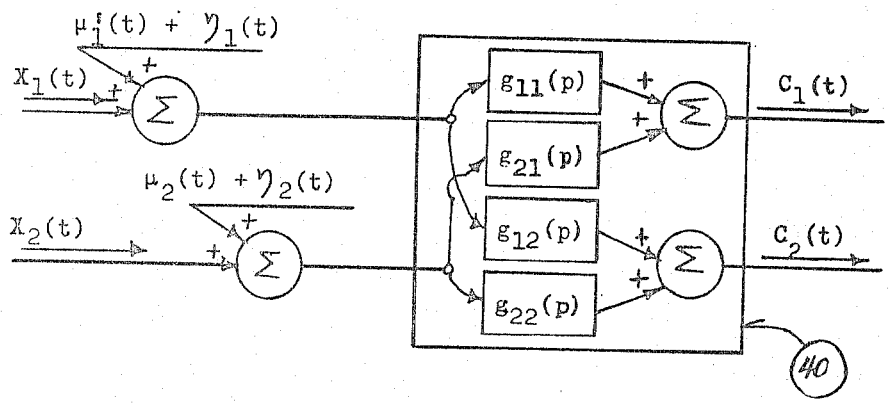
FIGURE 8B shows the linearized version of FIGURE 8A where, in FIGURE 8B, the transfer operators $g_{11}(p)$, $g_{21}(p)$, $g_{12}(p)$ and $g_{22}(p)$ are indicated for the linear system being controlled, 40, and where additional signals $\eta_1(t)$ and $\eta_2(t)$, are added at the inputs. These additional inputs, $\eta_1(t)$ and $\eta_2(t)$, add to inputs $x_1(t)$ and $x_2(t)$ so that the output of the system being controlled, $C_1(t)$ and $C_2(t)$, remain the same for FIGURE 8B as they were for FIGURE 8A.

Refer, now, to FIGURE 8A and FIGURE 8B. From FIGURE 8A, $$x_1(t) + \mu'(t) = G_{11}^{-1}[C_1(t)] + G_{12}^{-1}[C_2(t)]$$
$$x_2(t) + \mu'(t) = G_{21}^{-1}[C_1(t)] + G_{12}^{-1}[C_2(t)]$$

(38-29)

Refer, next, to FIGURE 8B which is the linearized version of FIGURE 8A. Here, $$x_1(t) + \mu'(t) + \eta_1(t) = g_{11}^{-1}[C_1(t)] + g_{12}^{-1}[C_2(t)]$$
$$x_2(t) + \mu'(t) + \eta_2(t) = g_{21}^{-1}[C_1(t)] + g_{22}[C_2(t)]$$

(38-30)

From Equations 38-30 and 38-29, $$\eta_1(t) = \{g_{11}^{-1}[C_1(t)] - G_{11}^{-1}[C_1(t)]\}$$
$$+ \{g_{12}^{-1}[C_2(t)] - G_{12}^{-1}[C_2(t)]\}$$
$$\eta_2(t) = \{g_{21}^{-1}[C(t)] - G_{21}^{-1}[C_1(t)]\}$$
$$+ \{g_{22}[C_2(t)] - G_{22}^{-1}[C_2(t)]\}$$

(38-31)

It will be observed that, thus far, $g_{11}$, $g_{21}$, $g_{12}$, and $g_{22}$ are not physically realized. The point is that if they were built, and if the additional inputs $\eta_1(t)$ and $\eta_2(t)$ then were provided, the performance would be the same as it would be for the nonlinear system as is described by Equations 38-29 through 38-31.

Figure 9:
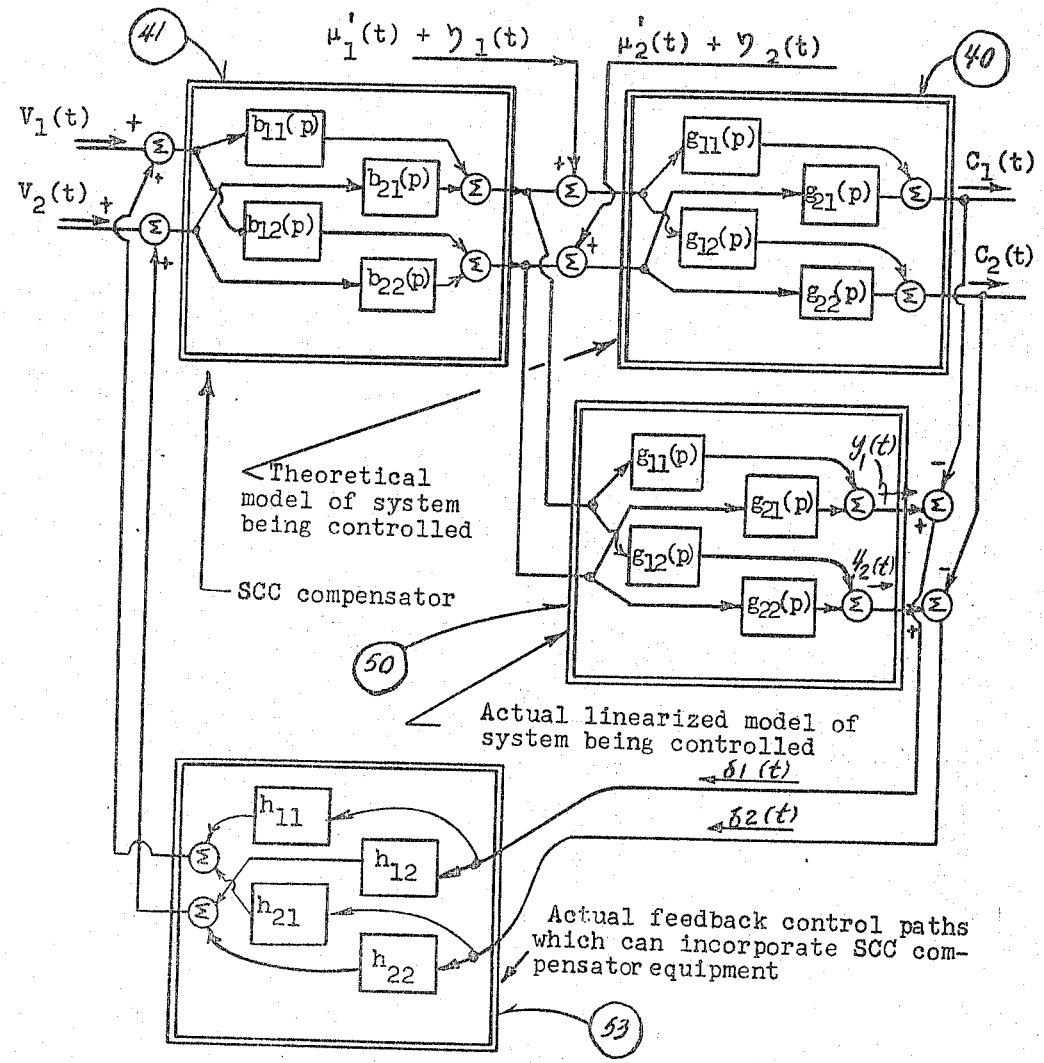
FIGURE 9 shows a two input-two output total control system including a linearized model 50, in parallel with the system being controlled, 40. This figure also shows feedback control paths, 53, which can incorporate SCC equipment or else other physical apparatus. The SCC compensator, 41, is shown in the forward path. The system being controlled, 40, is shown in its linearized version, along with $\eta_1(t)$ and $\eta_2(t)$, as was done in FIGURE 8B, rather than showing the actual system being controlled at this same location.

Now, assume that the linear system is used to replace the nonlinear system being controlled, and that the values chosen for $g_{11}$, $g_{21}$, $g_{12}$, and $g_{22}$ are exactly those existing in the physically realized model which, now, is placed in parallel with the nonlinear system being controlled. Refer, next, to FIGURE 9.

The relations for FIGURE 9 follow, using Heaviside operator $p$ for the nonlinear system:

$$\left.\begin{array}{l}C_1(t) = \{b_{11}(p)g_{11}(p)r_1(t) + b_{21}(p)g_{11}(p)r_2(t)\\ + b_{12}(p)g_{21}(p)r_1(t) + b_{22}(p)g_{21}(p)r_2(t)\}\\ + \{g_{11}(p)[\eta_1(t) + \mu_1'(t)] + g_{21}(p)[\eta_2(t) + \mu_2'(t)]\}\\ C_2(t) = \{b_{11}(p)g_{12}(p)r_1(t) + b_{21}(p)g_{12}(p)r_2(t)\\ + b_{12}(p)g_{22}(p)r_1(t) + b_{22}(p)g_{22}(p)r_2(t)\}\\ + \{g_{12}(p)[\eta_1(t) + \mu_1^1(t)]\\ + g_{22}(p)[\eta_2(t) + \mu_2^1(t)]\}\end{array}\right\}$$

(38-32)

$$C_1(t) = \{b_{11}(p)g_{11}(p) + b_{12}(p)g_{21}(p)\}r_1(t)$$
$$+ \{b_{21}(p)g_{11}(p) + b_{22}(p)g_{21}(p)\}r_2(t) - \delta_1(t)$$

$$C_2(t) = \{b_{11}(p)g_{12}(p) + b_{12}(p)g_{22}(p)\}r_1(t)$$
$$+ \{b_{21}(p)g_{12}(p) + b_{22}(p)g_{22}(p)\}r_2(t) - \delta_2(t)$$

where, $$-\delta_1(t) = g_{11}(p)[\eta_1(t) + \mu_1'(t)] + g_{21}(p)\eta_2(t) + \mu_2'(t)]$$
$$-\delta_2(t) = g_{12}(p)[\eta_1(t) + \mu_2'(t)] + g_{22}(p)\eta_2(t) + \mu_2'(t)]$$

(38–33)

Let, $$\{b_{11}(p)g_{11}(p) + b_{12}(p)g_{21}(p)\} = [B(p)G(p)]_{11}$$
$$\{b_{11}(p)g_{12}(p) + b_{12}(p)g_{22}(p)\} = [B(p)G(p)]_{12}$$

(38–34)

$$\{b_{21}(p)g_{11}(p) + b_{22}(p)g_{21}(p)\} = [B(p)G(p)]_{21}$$
$$\{b_{21}(p)g_{12}(p) + b_{22}(p)g_{22}(p)\} = [B(p)G(p)]_{22}$$

(38–35)

Then, from Equations 38–34 and 38–35

$$b_{11}(p) = \frac{\begin{vmatrix} [B(p)G(p)]_{11}g_{21}(p) \\ [B(p)G(p)]_{12}g_{22}(p) \end{vmatrix}}{\nabla}$$

$$\beta_{12}(p) = \frac{\begin{vmatrix} g_{11}(p)[B(p)G(p)]_{11} \\ g_{12}(p)[B(p)G(p)]_{12} \end{vmatrix}}{\nabla}$$

$$b_{21}(p) = \frac{\begin{vmatrix} [B(p)G(p)]_{21}g_{21}(p) \\ [B(p)G(p)]_{22}g_{22}(p) \end{vmatrix}}{\nabla}$$

$$b_{22}(p) = \frac{\begin{vmatrix} g_{11}(p)[B(p)G(p)]_{21} \\ g_{12}(p)[B(p)G(p)]_{22} \end{vmatrix}}{\nabla}$$

(38–36)

where, $$\nabla = \begin{vmatrix} g_{11}(p)g_{21}(p) \\ g_{12}(p)g_{22}(p) \end{vmatrix}$$

$$C_1(t) = [B(p)G(p)]_{11}r_1(t) + [B(p)G(p)]_{21}r_2(t) - \delta_1(t) \quad (38–37)$$

$$C_2(t) = [B(p)G(p)]_{12}r_1(t) + [B(p)G(p)]_{22}r_2(t) - \delta_2(t)$$

From Figure 9

$$y_1(t) = [B(p)G(p)]_{11}r_1(t) - [B(p)G(p)]_{21}r_2(t)$$
$$y_2(t) = [B(p)G(p)]_{12}r_1(t) + [B(p)G(p)]_{22}r_2(t)$$

(38–38)

From Equations 38–38, $$y_1(t) - C_1(t) = \delta_1(t)$$
$$y_2(t) - C_2(t) = \delta_2(t)$$

(38–39)

Then, from Equations 38–39 and FIGURE 9, $$C_1(t) = [B(p)G(p)]_{11}\{V_1(t) + h_{11}(p)\delta_1(t) + h_{21}(p)\delta_2(t)\} - \delta_1(t) + [B(p)G(p)]_{21}\{V_2(t) + h_{12}(p)\delta_1(t) + h_{22}(p)\delta_2(t)\}$$

(38–40)

$$C_2(t) = [B(p)G(p)]_{12}\{V_1(t) + h_{11}(p)\delta_1(t) + h_{21}(p)\delta_2(t)\} + [B(p)G(p)]_{22}\{V_2(t) + h_{12}(p)\delta_1(t) + h_{22}(p)\delta_2(t)\} \delta_2(t)$$

It is desired to make, $$C_1(t) \cong [B(p)G(p)]_{11}V_1(t) + [B(p)G(p)]_{21}V_2(t)$$

(38–41)

$$C_2(t) \cong [B(p)G(p)]_{12}V_1(t) + [B(p)G(p)]_{22}V_2(t)$$

Figure 10:
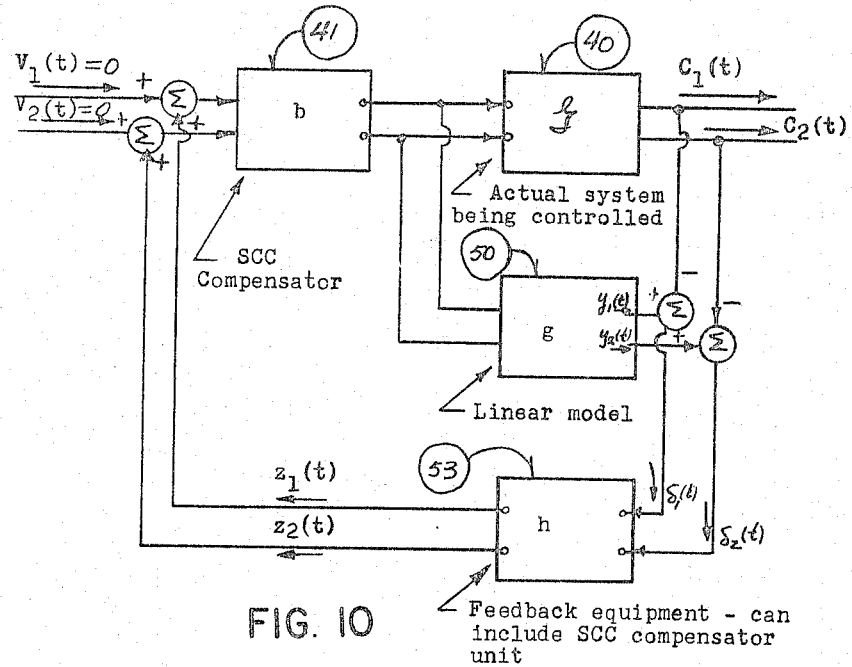
FIGURE 10 shows a more schematic diagram for the previous figure, but this time shows the actual system being controlled and the location of a number of signals $y_1(t)$, $y_2(t)$, $\delta_1(t)$, $\delta_2(t)$, $z_1(t)$ and $z_2(t)$, which are to be employed in the theoretical presentation of this disclosure.

Consideration will be given to stability, and for this, reference is invited to FIGURES 10 and 11. FIGURE 10 illustrates the true system in block diagram form when the input signals $V_1(t)$ and $V_2(t)$ are both zero. In that figure $\delta_1(t)$ and $\delta_2(t)$ are the differences in the outputs from the nonlinear system being controlled G and the outputs of the linear model g. If either alone were present the outputs to h would, in general, be larger. Assume via FIGURE 11 that the model g remains while G is removed from the circuit. The outputs $\delta'_1(t)$ and $\delta'_2(t)$ are no longer the same as $\delta_1(t)$ and $\delta_2(t)$, respectively; they merely appear at the same place in the system. However, stable operation is desired.

Figure 11:
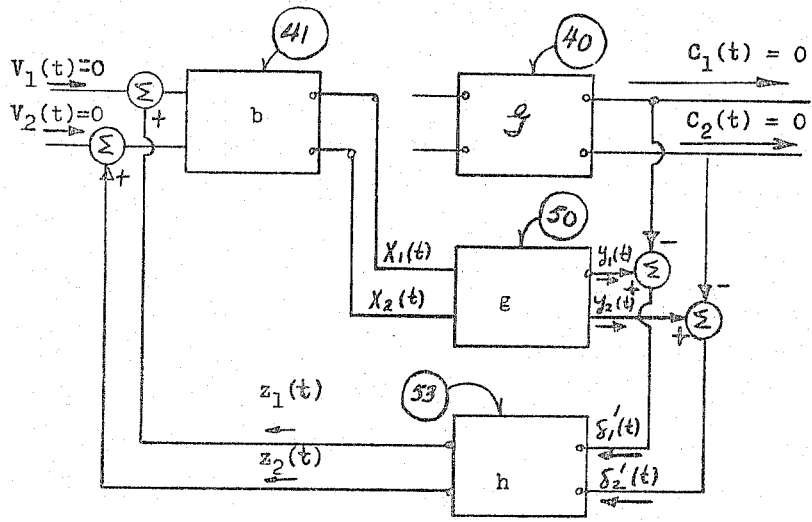
FIGURE 11 is essentially the same as is FIGURE 10 except that now the connections to the inputs of the system being controlled are broken.

Since FIGURE 11 is linear, write, in Laplace notation, $$[1 - \{[B(s)G(s)]_{11}h_{11}(s) + [B(s)G(s)]_{21}h_{12}(s)\}]\delta'_1(s)$$
$$= \{[B(s)G(s)]_{11}h_{21}(s) + [B(s)G(s)]_{21}h_{22}(s)\}\delta'_2(s)$$

(38–42)

$$\{[B(s)G(s)]_{12}h_{11}(s) + [B(s)G(s)]_{22}h_{12}(s)\}\delta'(s)$$

(38–43)

$$+ B(s)G(s)]_{12}h_{21}(s)\}]\delta'_2(s)$$

In Equations 38–42 and 38–43 the terms $[B(s)G(s)]_{\alpha\beta}$; where $\alpha = 1, 2$; and $\beta = 1, 2$; will have been established in accord with Equations 38–41 and earlier design criteria. Hence, $h_{11}(s)$, $h_{12}(s)$, $h_{21}(s)$ and $h_{22}(s)$ remain as adjustable transfer functions.

For example, suppose, $$[B(s)G(s)]_{12}h_{11}(s) + [B(s)G(s)]_{22}h_{12}(s) = 0$$
$$[B(s)G(s)]_{11}h_{21}(s) + [B(s)G(s)]_{21}h_{22}(s) = 0$$

(38–44)

Then, $$h_{12}(s) = \frac{-[B(s)G(S)]_{12}h_{11}(s)}{[B(s)G(s)]_{22}}$$

$$h_{21}(s) = \frac{-[B(s)G(s)]_{21}h_{22}(s)}{[B(s)G(s)]_{11}}$$

(38–45)

Then, from Equations 38–42 through 38–42, $$\left[1 - \left\{[B(s)G(s)]_{11} - \frac{[B(s)G(s)]_{21}[B(s)G(s)]_{12}}{[B(s)G(s)]_{22}}\right\}\right]h_{11}(s)\delta'_1(s) = 0$$

(38–46)

and, $$\left[1 - \left\{[B(s)G(s)]_{22} - \frac{[B(s)G(s)]_{21}[B(s)G(s)]_{12}}{[B(s)G(s)]_{22}}\right\}\right]h_{22}(s)\delta'_2(s) = 0$$

If $[B(s)G(s)]_{\alpha\beta}$; for $\alpha = 1, 2$, $\beta = 1, 2$; have all been reasonably and carefully chosen, the system will remain stable. Calculations for stability can be made employing Nyquist's criteria.

However, reference to Equations 38–40 and 38–41 show that the terms involving $\delta_1(t)$ and $\delta_2(t)$ are the terms which it is desired to have small at all times. Reference to Equations 38–42 and 38–43 shows that essentially the same terms are involved in stability. This leads to one potential design procedure for $h_{11}(s)$, $h_{12}(s)$, $h_{21}(s)$ and $h_{22}(s)$, as follows.

Let, $$|[B(s)G(s)]_{11}h_{11}(s) + [B(s)G(s)]_{21}h_{12}(s)| = k_1$$

(38–47)

$$|[B(s)G(s)]_{12}h_{11}(s) + [B(s)G(s)]_{22}h_{12}(s)| = 0$$

$$|[B(s)G(s)]_{12}h_{21}(s) + [B(s)G(s)]_{22}h_{22}(s)| = k_2$$

(38–48)

$$|[B(s)G(s)]_{11}h_{21}(s) + [B(s)G(s)]_{21}h_{22}(s)| = 0$$

where, in Equations 38–47 through 38–48, $$0 < k_1 < 1$$
$$0 < k_2 < 1 \quad (38\text{–}49)$$

(Thus, 0.9 is a reasonable value for $k_1$ and $k_2$).
From Equations 38–47 through 38–49, $$h_{11}(s) = \frac{\begin{vmatrix} k_1[B(s)G(s)]_{21} \\ 0[B(s)G(s)]_{22} \end{vmatrix} \epsilon^{-T_1's}}{\nabla} \quad (38\text{–}50)$$

$$h_{12}(s) = \frac{\begin{vmatrix} [B(s)G(s)]_{11}k_1 \\ [B(s)G(s)]_{12}0 \end{vmatrix} \epsilon^{-T_1's}}{\nabla} \quad (38\text{–}51)$$

$$h_{21}(s) = \frac{\begin{vmatrix} 0[B(s)G(s)]_{21} \\ k_2[B(s)G(s)]_{22} \end{vmatrix} \epsilon^{-T_2's}}{\nabla} \quad (38\text{–}52)$$

$$h_{22}(s) = \frac{\begin{vmatrix} [B(s)G(s)]_{11}0 \\ [B(s)G(s)]_{12}k_2 \end{vmatrix} \epsilon^{-T_2's}}{\nabla} \quad (38\text{–}53)$$

where, $T_1'$ and $T_2'$ are so chosen that all $h_{\alpha\beta}(s)$ can be realized for $\alpha = 1, 2$ and $\beta = 1, 2$.

where, $$\nabla = \begin{vmatrix} [B(s)G(s)]_{11}[B(s)G(s)]_{21} \\ [B(s)G(s)]_{12}[B(s)G(s)]_{22} \end{vmatrix} \quad (38\text{–}54)$$

To summarize the last development, which was concerned with the substantial reduction of the effects of noise, load disturbances, and system nonlinearities, one set of design procedures are outlined below where the operator ($p$) is used in preference to the operator ($s$):

(1) With $g_{11}(p)$, $g_{12}(p)$, $g_{21}(p)$ and $g_{22}(p)$ given and with $[B(p)G(p)]_{11}$, $[B(p)G(p)]_{12}$, and with $$[B(p)G(p)]_{21}, \text{ and } [B(p)G(p)]_{22}$$

chosen at reasonable values, then, (2) By Equations 38–36 evaluate to $b_{11}(p)$, $b_{12}(p)$, $b_{21}(p)$ and $b_{22}(p)$, and (3) By slight modifications of Equations 38–50 through 38–54 determine $h_{11}(p)$, $h_{21}(p)$, $h_{12}(p)$, and $h_{22}(p)$, and (4) From the results of (2) and (3), and by employing the T.S.C. approach set forth in U.S. Patent 3,010,035, design the four short-time memory devices to produce $b_{11}(p)$, $b_{12}(p)$, $b_{21}(p)$ and $b_{22}(p)$ and include therewith any conventional equipment and, similarly, design the four short-time memory devices and associated equipment to produce $h_{11}(p)$, $h_{12}(p)$, $h_{21}(p)$, and $h_{22}(p)$.

The procedures of Equations 38–50 through 38–54, it will be found, are not conducive to the notion that the system of FIGURE 9 be made non-interacting. It will be found that if $[B(j\omega)G(j\omega)]_{12} = [B(j\omega)G(j\omega)]_{21} = 0$, then $[B(j\omega)G(j\omega)]_{11}$ and $[B(j\omega)G(j\omega)]_{22}$ appear by themselves in the denominator. It is not feasible to meet exactly this requirement by means of physical equipment. That is to say, these mathematical requirements are not fully realizable.

A further summary, to this point, is in order. In the work leading up to but not including FIGURE 5 or Equations 38–26, it was shown how an assemblage of multiple input-multiple output short-time memory devices could be employed in the forward paths and another such assemblage could be employed in the feedback paths to make the system outputs closely follow specified functions of the overall, or total system inputs. This included the possibility of making an interacting system perform like a non-interacting system.

Then, starting with the discussion of FIGURE 5 and proceeding up to this present summary, it has been shown how a multiple input-multiple output system being controlled which was interacting, nonlinear, and beset with noise and load disturbance, could be made to act like a nearly linear-open-loop system with little noise.

The arrangements for making this latter system act, by itself, as if it were non-interacting can be only partially successful.

However, all of the work up to this point can be combined into a single performance, i.e., to reduce the effects of noise, load disturbances, and nonlinearity in the system being controlled; and then to prevent drift by means of feedback, to cause the outputs of the total system to be specified functions of the total inputs while, if desired, also to making the total control system operate substantially as a non-interacting system. How all of these objects just stated can be achieved, will be discussed next.

Start with the system being controlled which is presumed to be nonlinear, interacting, and troubled with noise, and load disturbance. Proceed as has been discussed in relation to FIGURE 9 to obtain the performance described approximately in Equations 38–41. Then in Equations 38–41, let $X_1(t)$ replace $V_1(t)$ and $X_2(t)$ replace $V_2(t)$. Thus, upon referring jointly to FIGURE 9 and FIGURE 4 it is seen that the whole of FIGURE 9 could become the system being controlled in FIGURE 4. From that point on the development is carried out as before in leading up to Equations 38–24A and 38–25A.

In discussing multiple input-multiple output control systems up to this point, all illustrations in figures and equations have included only a two input and two output system being controlled. However, the procedures thus employed can be extended to systems with many inputs and many outputs.

The general problem will be introduced and solved, wherein the system being controlled can: (1) have any finite number of inputs, (2) have any finite number of outputs, (3) be interacting or noninteracting, (4) contain all linear elements, or else contain many or else all nonlinear elements, (5) be subject to noise and load disturbances.

The procedure to be followed will be simply an extension of the two input-two output illustration employed up to this point. Thus, first a multiple input-multiple output short-time memory unit will be employed in cascade with the system being controlled. Second, feedback involving a multiple input-multiple output short-time memory device will be employed. Third, the method for producing an open-loop input to output system with internal loops to suppress noise and nonlinearities will be developed. Fourth, items two and three will be combined as has just been done for the two input-two output system.

Figure 12A:
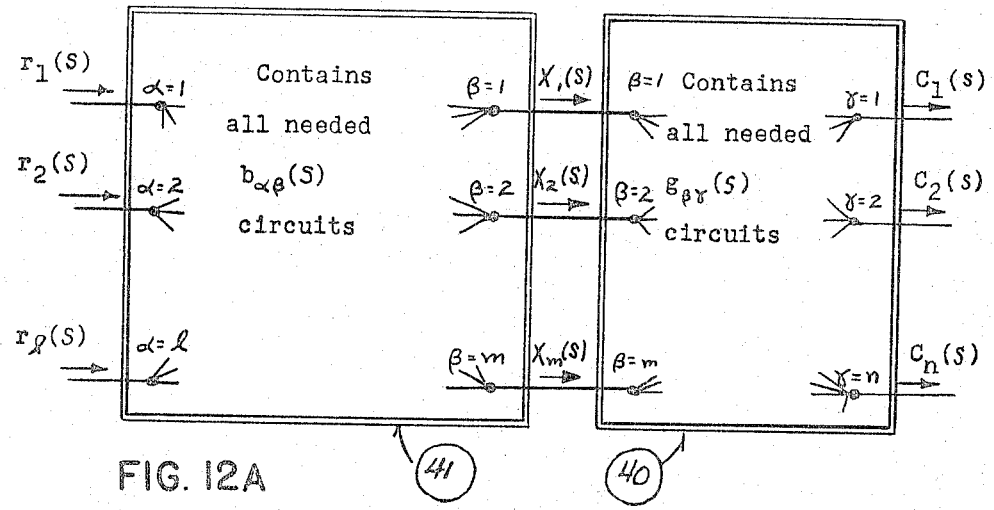
FIGURE 12A is the same, in principle, as the two-port total system being controlled of FIGURE 1 except that now there are $l$ input signals to the total control system, $m$ input signals to the system being controlled, and $n$ output signals from the system being controlled. As before, the multiple input-multiple output SCC compensator is designated as item 41, and the multiple input-multiple output system being controlled is designated as item 40.
Figure 12B:
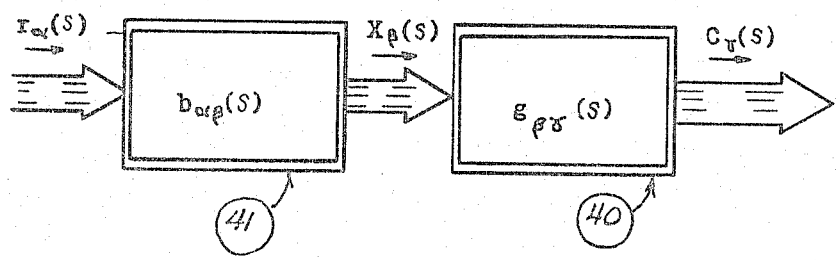
FIGURE 12B is the same as FIGURE 12A except in simpler form.

Refer, next, to FIGURES 12A and 12B and using the Laplace operator ($s$) for these linear systems:

$$(38\text{–}55)$$
$$X_1(s) = b_{11}(s)r_1(s) + b_{21}(s)r_2(s) + \ldots + b_{\text{l}1}(s)r_1(s)$$
$$X_2(s) = b_{12}(s)r_1(s) + b_{22}(s)r_2(s) + \ldots + b_{\text{l}2}(s)r_1(s)$$

.
.
.

$$X_m(s) = b_{1m}(s)r_1(s) + b_{2m}(s)r_2(s) + \ldots + b_{\text{l}m}(s)r_1(s)$$

Also, $$(38\text{–}56)$$
$$C_1(s) = g_{11}(s)X_1(s) + g_{21}(s)X_2(s) + \ldots + g_{m1}(s)X_m(s)$$
$$C_2(s) = g_{12}(s)X_1(s) + g_{22}(s)X_2(s) + \ldots + g_{m2}(s)X_m(s)$$

.
.
.

$$C_n(s) = g_{1n}(s)X_1(s) + g_{2n}(s)X_2(s)$$
$$+ \ldots + g_{mn}(s)X_m(s)$$

Then, $$C_1(s) = g_{11}(s)b_{11}(s)r_1(s) + g_{11}(s)b_{21}(s)r_2(s) + \cdots \\ + g_{11}(s)b_{11}(s)r_l(s) \\ + g_{21}(s)b_{12}(s)r_1(s) + g_{21}(s)b_{22}(s)r_2(s) + \cdots \\ + g_{21}(s)b_{12}(s)r_l(s) \\ \vdots \\ + g_{m1}(s)b_{1m}(s)r_1(s) + g_{m1}(s)b_{2m}(s)r_2(s) + \cdots \\ + g_{m1}(s)b_{1m}(s)r_l(s) \quad (38\text{-}56)$$

$$C_2(s) = g_{12}(s)b_{11}(s)r_1(s) + g_{12}(s)b_{21}(s)r_2(s) + \cdots \\ + g_{12}(s)b_{11}(s)r_l(s) \\ + g_{22}(s)b_{12}(s)r_1(s) + g_{22}(s)b_{22}(s)r_2(s) + \cdots \\ + g_{22}(s)b_{12}(s)r_l(s) \\ \vdots \\ + g_{m2}(s)b_{1m}(s)r_1(s) \\ + g_{m2}(s)b_{2m}(s)r_2(s) + \cdots \\ + g_{m2}(s)b_{1m}(s)r_l(s) \quad (38\text{-}57)$$

$$C_n(s) = g_{1n}(s)b_{11}(s)r_1(s) + g_{1n}(s)b_{21}(s)r_2(s) + \cdots \\ + g_{1n}(s)b_{11}(s)r_l(s) \\ + g_{2n}(s)b_{12}(s)r_1(s) + g_{2n}(s)b_{22}(s)r_2(s) + \cdots \\ + g_{2n}(s)b_{12}(s)r_l(s) \\ \vdots \\ + g_{mn}(s)b_{1m}(s)r_1(s) + g_{mn}(s)b_{2m}(s)r_2(s) + \cdots \\ + g_{mn}(s)b_{1m}(s)r_l(s) \quad (38\text{-}58)$$

The following subscripts will be employed,
For the input signals:

$$\alpha = 1, 2, 3, \ldots, l \quad (38\text{-}59)$$

For the output signals from the SCC equipment and input signals to the system being controlled:

$$\beta = 1, 2, 3, \ldots, m \quad (38\text{-}60)$$

For the outputs from the system being controlled:

$$\gamma = 1, 2, 3, \ldots, n \quad (38\text{-}61)$$

Then, in general, $$C_\gamma(s) = \sum_{\alpha=1}^{\alpha=l} \left\{ \sum_{\beta=1}^{\beta=m} g_{\beta\gamma}(s) b_{\alpha\beta}(s) r_\alpha(s) \right\} \quad (38\text{-}62)$$

Let, $$\sum_{\beta=1}^{\beta=m} g_{\beta\gamma}(s) b_{\alpha\beta}(s) = [B(s)G(s)]_{\alpha\gamma} \quad (38\text{-}63)$$

Again, in general, $$C_\gamma(s) = \sum_{\alpha=1}^{\alpha=l} [B(s)G(s)]_{\alpha\beta} r_\alpha(s) \quad (38\text{-}64)$$

Or $$C_1(s) = [B(s)G(s)]_{11} r_1(s) + [B(s)G(s)]_{21} r_2(s) + \cdots \\ + [B(s)G(s)]_{l1} r_l(s) \\ C_2(s) = [B(s)G(s)]_{12} r_1(s) + [B(s)G(s)]_{22} r_2(s) + \cdots \\ + [B(s)G(s)]_{l2} r_l(s) \\ \vdots \\ C_n(s) = [B(s)G(s)]_{1n} r_1(s) + [B(s)G(s)]_{2n} r_2(s) + \cdots \\ + [B(s)G(s)]_{ln} r_l(s) \quad (38\text{-}65)$$

Turning to the frequency domain, for sinusoidal quantities where $s = 0 + j\omega$, and for brevity, write, $$[BG]_{\alpha\beta} = [B(j\omega)G(j\omega)]_{\alpha\beta} = |B(j\omega)G(j\omega)|_{\alpha\beta} \epsilon^{-jT_{\alpha\omega}}$$

Then, $$[BG]_{11} = |B(j\omega)g(j\omega)|_{11} \epsilon^{-jT_1\omega} \\ [BG]_{12} = |B(j\omega)G(j\omega)|_{12} \epsilon^{-jT_1\omega} \\ [BG]_{1n} = |B(j\omega)G(j\omega)|_{1n} \epsilon^{-jT_1\omega} \quad (38\text{-}66)$$

Then, let, $$g_{\beta\gamma}(j\omega) b_{\alpha\beta}(j\omega) = g_{\beta\gamma} b_{\alpha\beta}$$

and write (in the frequency domain), $$g_{11}b_{11} + g_{21}b_{12} + \cdots + g_{m1}b_{1m} = |BG|_{11} \epsilon^{-jT_1\omega} g_{12}b_{11} \\ + g_{22}b_{12} + \cdots + g_{m2}b_{1m} = |BG|_{12} \epsilon^{-jT_1\omega} \quad (38\text{-}67) \\ \vdots \\ g_{1n}b_{11} + g_{2n}b_{12} + \cdots + g_{mn}b_{1m} = |BG|_{1n} \epsilon^{-jT_1\omega}$$

Similarly, $$g_{11}b_{21} + g_{21}b_{22} + \cdots + g_{m1}b_{2m} = |BG|_{21} \epsilon^{-jT_2\omega} \\ \vdots \\ g_{1n}b_{21} + g_{2n}b_{22} + \cdots + g_{mn}b_{2m} = |BG|_{2n} \epsilon^{-jT_2\omega} \quad (38\text{-}68)$$

And, $$g_{11}b_{11} + g_{21}b_{12} + \cdots + g_{m1}b_{1m} = |BG|_{11} \epsilon^{-jT_1\omega} \\ \vdots \\ g_{1n}b_{11} + g_{2n}b_{12} + \cdots + g_{mn}b_{1m} = |BG|_{1n} \epsilon^{-jT_1\omega} \quad (38\text{-}69)$$

In general, Equations 38–67 through 38–69 lead to the desired values for all $b_{\alpha\beta}$. If the matrices are square the values are discretely determined. If there are more than enough equations, certain $(BG)_{\alpha\gamma}$ terms cannot be independently selected. If there are too few equations certain of the $(b_{\alpha\beta})$ terms will be found to be functions of certain other $(b_{\alpha\beta})$ terms as well as functions of the $(BG)_{\alpha\gamma}$ terms.

It will be recalled that Equations 38–55 through 38–69 apply to an open-loop control system wherein the system being controlled has $m$ inputs and $n$ outputs, and for which there are $l$ command functions fed through a set of SCC devices. The system being controlled is interacting. Suppose in Equations 38–65, $$l = n \quad (38\text{-}70)$$
$$[BG]_{\alpha\gamma} = 0 \text{ for all } \alpha \neq \gamma \quad (38\text{-}71)$$

There are a sufficient number of equations like (38–67) through (38–69) such that all $[BG]_{\alpha\gamma}$ can be independently established for all $\alpha = \gamma$. Then, the total open-loop control system will act substantially like a, now, specified non-interacting open-loop control system, even though the part of the system being controlled is, in itself, an interacting system.

This concludes the discussion of the general case of the multiple input-multiple output linear system being controlled when the said system is located in an open-loop control system.

Feedback control using multiple input-multiple output short-time memory devices when the system being controlled has any finite number of input and any finite number of output terminals, will be discussed next.

Figure 13:
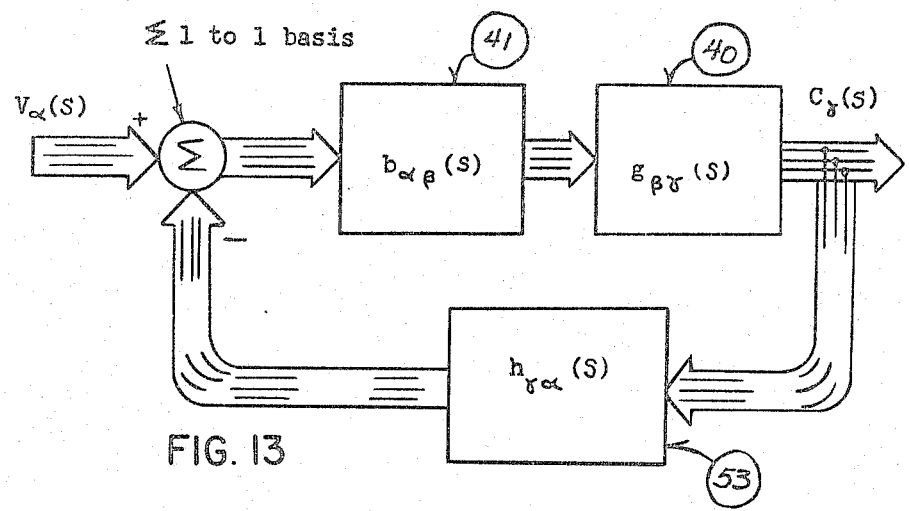
FIGURE 13 is the same as FIGURE 12B except that now feedback has been incorporated. Hence

Refer to FIGURE 13. Here the multiple input-multiple output short-time memory device is employed in the forward path in cascade with the system being controlled, and a similar multiple input-multiple output short-time memory control device is employed in the feedback paths.

The physical relations for this general system will be expressed in equation form using Laplace notation.

The system discussed here is, $$C_1(s) = [B(s)G(s)]_{11}r_1(s) + [B(s)G(s)]_{21}r_2(s) + \ldots + [B(s)G(s)]_{l1}r_l(s)$$
$$C_2(s) = [B(s)G(s)]_{12}r_1(s) + [B(s)G(s)]_{22}r_2(s) + \ldots + [B(s)G(s)]_{l2}r_l(s)$$
$$\vdots$$
$$C_n(s) = [B(s)G(s)]_{1n}r_1(s) + [B(s)G(s)]_{2n}r_2(s) + \ldots + [B(s)G(s)]_{ln}r_l(s) \quad (38\text{-}72)$$

Next, $$r_1(s) = V_1(s) + h_{11}(s)C_1(s) + h_{21}(s)C_2(s) + \ldots + h_{n1}(s)C_n(s)$$
$$r_2(s) = V_2(s) + h_{12}(s)C_1(s) + h_{22}(s)C_2(s) + \ldots + h_{n2}(s)C_n(s)$$
$$\vdots \quad (38\text{-}73)$$
$$r_l(s) = V_l(s) + h_{1l}(s)C_1(s) + h_{2l}(s)C_2(s) + \ldots + h_{nl}(s)C_n(s)$$

Equations 38–72 and 38–73 will be combined to form Equations 38–74. The Laplace variable, S, while omitted from Equations 38–74 and results stemming therefrom, will be understood without ambiguity. Equations 38–74 follows, as described:

$$C_1 = [BG]_{11}V_1 + [BG]_{11}[h_{11}C_1 + h_{21}C_2 + \ldots + h_{n1}C_n]$$
$$+ [BG]_{21}V_2 + [BG]_{21}[h_{12}C_1 + h_{22}C_2 + \ldots + h_{n2}C_n]$$
$$\vdots \quad (38\text{-}74)$$
$$+ [BG]_{l1}V_l + [BG]_{l1}[h_{1l}C_1 + h_{2l}C_2 + \ldots + h_{nl}C_n]$$

Hence, $$\left\{1 - \sum_{\alpha=1}^{\alpha=l}[BG]_{\alpha 1}h_{1\alpha}\right\}C_1 - \left\{\sum_{\alpha=1}^{\alpha=l}[BG]_{\alpha 1}h_{2\alpha}\right\}C_2 - \ldots$$
$$- \left\{\sum_{\alpha=1}^{\alpha=l}[BG]_{\alpha 1}h_{n\alpha}\right\}C_n = \sum_{\alpha=1}^{\alpha=l}[BG]_{\alpha 1}V_\alpha$$
$$- \left\{\sum_{\alpha=1}^{\alpha=l}[BG]_{\alpha 2}h_{1\alpha}\right\}C_1 + \left\{1 - \sum_{\alpha=1}^{\alpha=l}[BG]_{\alpha 2}h_{2\alpha}\right\}C_2 - \ldots$$
$$- \left\{\sum_{\alpha=1}^{\alpha=l}[BG]_{\alpha 2}h_{n\alpha}\right\}C_n = \sum_{\alpha=1}^{\alpha=l}[BG]_{\alpha 2}V_\alpha$$
$$\vdots$$
$$- \left\{\sum_{\alpha=1}^{\alpha=l}[BG]_{\alpha n}h_{1\alpha}\right\}C_1 - \left\{\sum_{\alpha=1}^{\alpha=l}[BG]_{\alpha n}h_{2\alpha}\right\}C_2 - \ldots$$
$$+ \left\{1 - \sum_{\alpha=1}^{\alpha=l}[BG]_{\alpha n}h_{n\alpha}\right\}C_n = \sum_{\alpha=1}^{\alpha=l}[BG]_{\alpha n}V_\alpha$$

$$(38\text{-}75)$$

Suppose that $n=l$, and then let $h_{\alpha\gamma}=0$ when $\alpha \neq \gamma$. Under these circumstances, Equation 38–75 can be arranged so that $C_1 \ldots C_n$ each can be made independent functions of all $V_\alpha$ for $\alpha=1, 2, 3 \ldots l$.

Thus, $$C_1 = \frac{\sum_{\alpha=1}^{\alpha=l}[BG]_{\alpha 1}V_\alpha}{\{1 - [BG]_{11}h_{11}\}}$$
$$C_2 = \frac{\sum_{\alpha=1}^{\alpha=l}[BG]_{\alpha 2}V_\alpha}{\{1 - [BG]_{22}h_{22}\}} \quad (38\text{-}76)$$
$$\vdots$$
$$C_l = \frac{\sum_{\alpha=1}^{\alpha=l}[BG]_{\alpha 2}V_\alpha}{\{1 - BG_{ll}h_{ll}\}}$$

The above system is still interacting in that a change in any $V_\alpha$ changes all $C_1 \ldots C_2 \ldots C_l$.

Suppose, now, that $n=l$ and both $h_{\gamma\alpha}=0$ and $$(BG)_{\alpha\gamma}=0$$

for all $\alpha \neq \gamma$. Then the system is non-interacting and, in general, $$C_\gamma = [BG]_{\gamma\gamma}V^\alpha\{1 - [BG]_{\gamma\gamma}h_{\gamma\gamma}\}$$
for
$$\gamma = 1, 2 \ldots (l=n) \quad (38\text{-}77)$$

Besides the relations shown in Equations 38–76 and 38–77, various others may be formed from Equation 38–75 by making appropriate use of the SCC apparatus in the forward and backward paths of closed-loops of the control system.

Next, the conditions will be studied wherein the system being controlled has: (1) two or more inputs, (2) two or more outputs, (3) noise and other disturbances within the said system being controlled; and (4) the said system contains nonlinearities; and (5) the said system being controlled can be interacting. It will be assumed that the intent is to reduce the noise, other disturbances and nonlinearity effects of the system being controlled so that an input-output relation will be made to closely approximate that expected for an open-loop linear system without noise or other disturbances being present, and with the same number of interactions as appeared in the original system being controlled.

Figure 14:
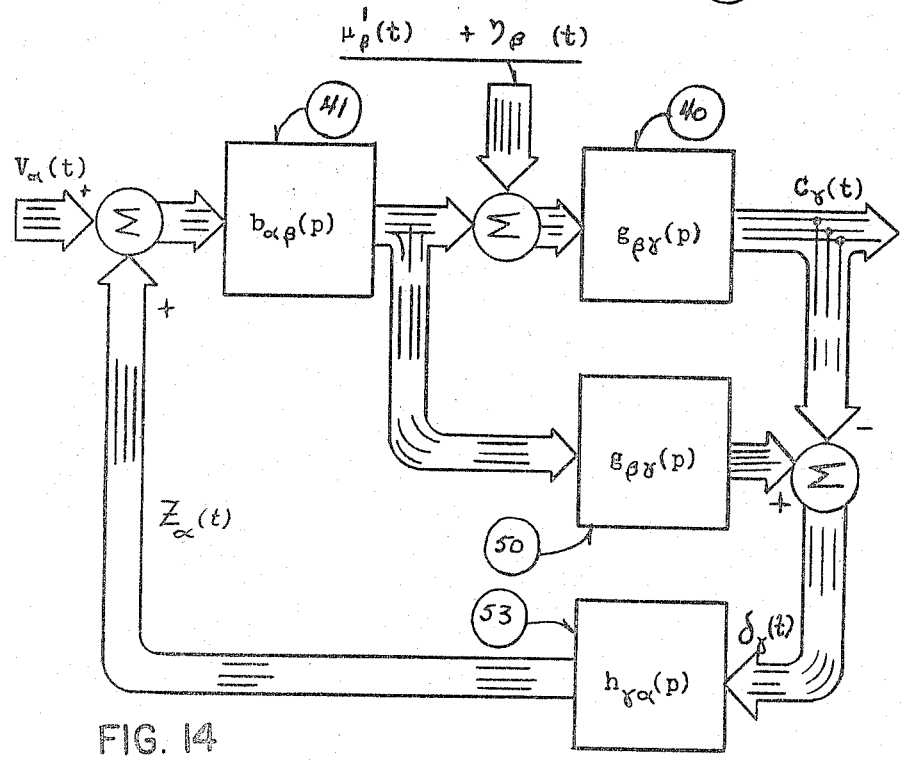
FIGURE 14 illustrates a general multiple input-multiple output total control system like the two-port system of FIGURE 9.

With these purposes in mind, and with reference to the similar earlier work in this disclosure for the two input-two output system being controlled; reference is invited, now, to FIGURE 14, for which relations will be developed where:

$\eta_1(t) + \mu_1'(t) =$ additional input signals to terminal No. 1,
$\eta_2(t) + \mu_2'(t) =$ additional input signals to terminal No. 2,
$\vdots$
$\eta_{m1}(t) + \mu_m'(t) =$ additional input signals to terminal No. m.

Then, from FIGURE 14, $$C_1(t) = [B(p)G(p)]_{11}r_1(t) + [B(p)G(p)]_{21}r_2(t) + \ldots + [B(p)G(p)]_{l1}r_l(t) - \delta_1(t)$$
$$C_2(t) = [B(p)G(p)]_{12}r_1(t) + [B(p)G(p)]r_2(t) + \ldots + [B(p)G(p)]_{l2}r_l(t) - \delta_2(t)$$
$$\vdots \quad (38\text{-}78)$$
$$C_n(t) = [B(p)G(p)]_{1n}r_1(t) + [B(p)G(p)]r_2(t) + \ldots + [B(p)G(p)]_{ln}r_l(t) - \delta_n(t)$$

where, $$[B(p)G(p)]_{\alpha\gamma} = \sum_{\beta=1}^{\beta=m} b_{\alpha\beta}g_{\beta\gamma}$$

and where, $$-\delta_1(t) = g_{11}(p)[\eta_1(t) + \mu_1'(t)] + \ldots + g_{m1}(p)[\eta_m(t) + \mu_m'(t)]$$
$$-\delta_2(t) = g_{12}(p)[\eta_1(t) + \mu_1'(t)] + \ldots + g_{m2}(p)[\eta_m(t) + \mu_m'(t)]$$
$$\vdots \quad (38\text{-}78)$$
$$-\delta_n(t) = g_{1n}(p)[\eta_1(t) + \mu_1'(t)] + \ldots + g_{mn}(p)[\eta_m(t) + \mu_m'(t)]$$

Also from FIGURE 14

$$z_1'(t) = h_{11}(p)\delta_1(t) + h_{21}(p)\delta_2(t) + \ldots + h_{n1}(p)\delta_n(t)$$
$$z_2'(t) = h_{12}(p)\delta_1(t) + h_{22}(p)\delta_2(t) + \ldots + h_{n2}(p)\delta_n(t)$$

(38-79)

$$\vdots$$

$$z_l(t) = h_{1l}(p)\delta_1(t) + h_{2l}(p)\delta_2(t) + \ldots + h_{nl}(p)\delta_n(t)$$

Then, $$r_1(t) = V_1(t) + z_1(t)$$
$$r_2(t) = V_2(t) + z_2(t)$$

(38-80)

$$\vdots$$

$$r_l(t) = V_l(t) + z_l(t)$$

$$C_1(t) = [B(p)G(p)]_{11}V_1(t) + [B(p)G(p)]_{11}\{h_{11}(p)\delta_1(t) + h_{21}(p)\delta_2(t) + \ldots + h_{n1}(p)\delta_n(t)\} - \delta_1(t) + [B(p)G(p)]_{21}V_2(t) + [B(p)G(p)]_{21}\{h_{12}(p)\delta_1(t) + h_{22}(p)\delta_2(t) + \ldots + h_{n2}(p)\delta_n(t)]$$

(38-81)

$$\vdots$$

$$+[B(p)G(p)]_{11}V(t) + [B(p)G(p)]_{11}\{h_{11}(p)\delta_1(t) + h_{21}(p)\delta_2(t) + \ldots + h_{n1}(p)\delta_n(t)\}$$

$$C_2(t) = [B(p)G(p)]_{12}V_1(t) + [B(p)G(p)]_{12}\{h_{11}(p)\delta_1(t) + h_{21}(p)\delta_2(t) + \ldots + h_{n1}(p)\delta_n(t)\} + [B(p)G(p)]_{22}V_2(t) + [B(p)G(p)]_{22}\{h_{12}(p)\delta_1(t) + h_{22}(p)\delta_2(t) + \ldots + h_{n2}(p)\delta_n(t)\} - \delta_2(t)$$

(38-82)

$$\vdots$$

$$+[B(p)G(p)]_{12}V_l(t) + [B(p)G(p)]_{12}\{h_{11}(p)\delta_1(t) + h_{21}(p)\delta_2(t) + \ldots + h_{n1}\delta_n(t)\}$$

$$\vdots$$

$$C_n(t) = [B(p)G(p)]_{1n}V_1(t) + [B(p)G(p)]_{1n}\{h_{11}(p)\delta_1(t) + h_{21}(p)\delta_2(t) + \ldots + h_{n1}(p)\delta_n(t)\} + [B(p)G(p)]_{2n}V_2(t) + [B(p)G(p)]_{2n}\{h_{12}(p)\delta_1(t) + h_{22}(p)\delta_2(t) + \ldots + h_{n2}(p)\delta_n(t)\}$$

(38-83)

$$\vdots$$

$$+[B(p)G(p)]_{1n}V_l(t) + [B(p)G(p)]_{1n}\{h_{11}(p)\delta_1(t) + h_2(p)\delta_2(t) + \ldots + h_n(p)\delta_n(t)\} - \delta_n(t)$$

In Equations 38-81 through 38-83, the various terms $[B(p)G(p)]_{11}$ through $[B(p)G(p)]_{1n}$ can be chosen to establish $C_1(t)$ through $C_n(t)$ as functions of $V_1(t)$ through $V_l(t)$, as if the terms $\delta_1(t)$ through $\delta_n(t)$ were not present. In so doing $b_{11}(p)$, $b_{12}(p)$, $b_{21}(p)$, etc., would be established so, as before, to make $[B_{11}(p)]$, $[B_{12}(p)]$, etc., as desired. However, the effects of the terms $\delta_1(t)$ through $\delta_n(t)$ on $C_1(t)$ through $C_n(t)$ must be substantially eliminated. It will be noted that the various transfer functions $h_{11}(p)$, $h_{12}(p)$, $h_{21}(p)$, etc., have not been established; and in the design of the multiple input-multiple output short-time memory device in the feedback path, the said device can be designed to achieve, substantially, the desired result of reducing, or nearly eliminating, the said effects on $C_1(t)$ through $C_n(t)$.

These results can be achieved while giving due care to the stability of all of the minor loops in the total system. It has been shown in U.S. Patent 3,010,035 how the Nyquist stability criteria can be extended. When so extended, it will take account of these cases where short-time memory devices are employed in the forward and feedback paths.

In considering stability, suppose that the system being controlled were disconnected from the system in FIGURE 14 and that the input signals $V_1(t) \ldots V_l(t)$ also were disconnected. Replace the signals $\delta_1(t)$ through $\delta_n(t)$ by $\delta_1'(t)$ through $\delta_n'(t)$, respectively. Then, for the resulting strictly linear system, consider the control loops only, in Laplace notation:

$$\left. \begin{array}{l} [B(s)G(s)]_{11}\left\{\sum_{\gamma=1}^{\gamma=n}h_{\gamma 1}(s)\delta_\gamma'(s)\right\} - \delta_1'(s) + \\ \\ [B(s)G(s)]_{21}\left\{\sum_{\gamma=1}^{\gamma=n}h_{\gamma 2}(s)\delta_\gamma'(s)\right\} + \ldots \\ \\ \ldots + [B(s)G(s)]_{l1}\left\{\sum_{\gamma=1}^{\gamma=n}h_{\gamma 1}(s)\delta_\gamma'(s)\right\} = 0 \end{array} \right\}$$ (38-84)

Also, $$\left. \begin{array}{l} [B(s)G(s)]_{12}\left\{\sum_{\gamma=1}^{\gamma=n}h_{\gamma 1}(s)\delta_\gamma'(s)\right\} + \\ \\ [B(s)G(s)]_{22}\left\{\sum_{\gamma=1}^{\gamma=n}h_{\gamma 2}(s)\delta_\gamma'(s)\right\} - \delta_2'(s) + \ldots \\ \\ \ldots + [B(s)G(s)]_{l2}\sum_{\gamma=1}^{\gamma=n}h_{\gamma 1}(s)\delta_\gamma'(s) = 0 \end{array} \right\}$$ (38-85)

$$\left. \begin{array}{l} [B(s)G(s)]_{1n}\left\{\sum_{\gamma=1}^{\gamma=n}h_{\gamma 1}(s)\delta_\gamma'(s)\right\} + \\ \\ [B(s)G(s)]_{2n}\left\{\sum_{\gamma=1}^{\gamma=n}h_{\gamma 2}(s)\delta_\gamma'\right\} + \ldots \\ \\ \ldots + [B(s)G(s)]_{ln}\left\{\sum_{\gamma=1}^{\gamma=n}h_{\gamma 1}(s)\delta_\gamma'(s)\right\} - \delta_n'(s) = 0 \end{array} \right\}$$ (38-86)

Reference should be made, next, to Equations (38-42) through (38-49). It is seen that stability can be achieved and, at the same time, that the effects on $C_1(t)$ through $C_n(t)$ of $\delta_1(t)$ through $\delta_n(t)$ will be substantially removed if, after all $[B(s)G(s)]_{\alpha\beta}$ are selected, all $h_{\gamma\alpha}(s)$ are computed from Equations 38-87 through 38-89 where $k_1$ through $k_n$ are each real $$0 < k_\gamma < 1$$

for $$\delta = 1, 2 \ldots n$$

Equations 38-87 through 38-89 follow, $$[B(s)G(s)]_{11}h_{11}(s) + [B(s)(T(s)]_{21}h_{12}(s) + \ldots + [B(s)G(s)]_{l1}h_{11}(s) = k_1$$
$$[B(s)G(s)]_{12}h_{11}(s) + [B(s)G)]_{22}(s) + \ldots [B(s)G(s)]_{l2}h_{11}(s) = 0$$

(38-87)

$$\vdots$$

$$[B(s)G(s)]_{1n}h_{11}(s) + [B(s)G(s)]_{2n}h_{12}(s) + \ldots + [B(s)G(s)]_{ln}h_{11}(s) = 0$$

$$[B(s)G(s)]_{11}h_{21}(s) + [B(s)G(s)]_{21}h_{22}(s) + \ldots + [B(s)G(s)]_{l1}h_{21}(s) = 0$$
$$[B(s)G(s)]_{12}h_{21}(s) + [B(s)G(s)]_{22}h_{22}(s) + \ldots + [B(s)G(s)]_{l2}h_{21}(s) = k_2$$

$$\vdots$$

$$[B(s)G(s)]_{1n}h_{21}(s) + [B(s)G(s)]_{2n}h_{22}(s) + \ldots + [B(s)G(s)]_{ln}h_{21}(s) = 0$$ (38-88)

$$[B(s)G(s)]_{11}h_{n1}(s)+[B(s)G(s)]_{21}h_{n2}(s)+\ldots$$
$$+[B(s)G(s)]_{l1}h_{nl}(s)=0$$

$$[B(s)G(s)]_{12}h_{n1}(s)+[B(s)G(s)]_{22}h_{n2}(s)+\ldots$$
$$+[B(s)G(s)]_{l m}h_{nl}(s)=0 \qquad (38\text{-}89)$$

.
.
.

$$[B(s)G(s)]_{1n}h_{n1}(s)+[B(s)G(s)]_{2n}h_{n2}(s)+\ldots$$
$$+[B(s)G(s)]_{l m}h_{nl}(s)=k_n$$

The basic procedures, effective in this invention, have been set forth. However, it seems desirable to show, at least by example, how analogue and digital equipment can be combined and employed because, while the input signals to the SCC equipment and the output signals therefrom may be analogue, either by necessity or by preference, it may be elected to employ digital equipment for the essential operations of delaying the signals, altering their magnitudes, and if need be their signs, to provide a plurality of signal components; and then of adding sets of appropriate components, ultimately to produce the outputs of the SCC equipment.

In the description to follow, certain of the transducers and other parts of the equipment which are well known to the art will not be dwelt upon in detail. However, those parts bearing directly upon novelty and related to the essential features of this invention, will be clearly identified.

Figure 20:
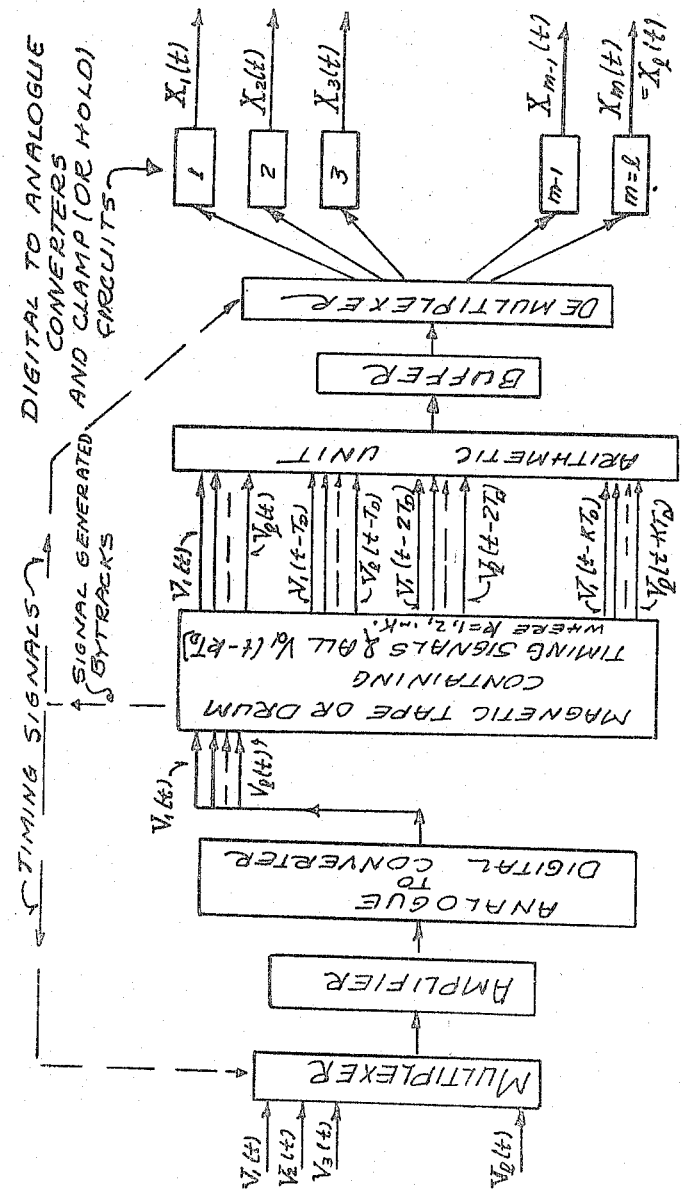
FIGURE 20 shows a signal component control unit for which the input signals $V_1(t), V_2(t) \ldots V_l(t)$ are in analogue or continuous form, and the output signals $X_1(t), X_2(t) \ldots X_m(t)$ are in analogue form; while the essential operations of the SCC technique are performed by digital equipment. Various other equipment such as a multiplexer, analogue to digital equipment, demultiplexer, and digital to analogue equipment are required and shown. However, a magnetic tape or drum unit and the arithmetic unit carry out, in digital form, the basic operations of the SCC techniques.

In FIGURE 20 is shown an overall diagram for combined analogue to digital to analogue SCC equipment. In this figure the separate input signals are $V_1(t)$, $V_2(t)$ ... $V_l(t)$. For this example, these input signals are assumed to be single valued continuous functions of time. Thus, they are in analogue form. Their original sources might have been process variables. Each such input signal could represent a process variable, or perhaps, a function of one or more process variables. If a modulation procedure has been employed in a telemetering scheme for bringing process variables to the SCC equipment, then it is assumed that, at the entrance points of the SCC equipment under discussion, all command functions have been demodulated so that the amplitudes are proportional to the values of the process variables represented or to the functions thereof. In some processes the analogue voltages are proportional to the square of the process variables, depending upon the types of the transducers which have been employed. These will not be treated in this example but by slight modifications clear to those skilled in the art, they could be readily handled.

It will be assumed, next, that a "time division" multiplexer is used to sample the input signals. The timing of the multiplexer can be controlled by the timing signals generated internally in the SCC equipment. Depending upon the speed of the sampling and the magnitudes of the input signals, a multiplexer can be a mechanical device, such as a rotating switch; or an electromechanical device, such as a relay tree with mercury wetted contacts; or a solid state device, such as a diode matrix. Mutiplexers are also commercially known as commutators and samplers.

In FIGURE 20 the amplifier shown after the multiplexer is optional and actually would be employed only in case the input signals $V_1(t)$, $V_2(t)$ ... $V_l(t)$ are too small to be used as the input signals to the analogue to digital converter.

The analogue to digital converter converts the said input signals into digital signals of suitable codes which digital signals become available essentially parallelly so far as overall system performance is concerned.

The next device in the sequence shown in FIGURE 20 is the short-time memory unit. This device performs a part of the function essential to this invention. Each command function, now in digital form, is to be placed in storage at very close to the same instant of time. At a certain specified and appreciable interval of time, $T_D$, later, the new, or now, existing values of the command functions are again stored. This process is repeated, at the ends of specified intervals of time, as many times as needed so that the short-time memory device and its input leads have available, in digital form, the present values of the command functions, and also those values which existed at each of several specified times in the past. The actual memory device can be built in any one of several forms. For example, it could be a magnetic drum or a magnetic tape. It will, for brevity, be referred to here as a tape unit though it can be built in other forms.

Figure 21:
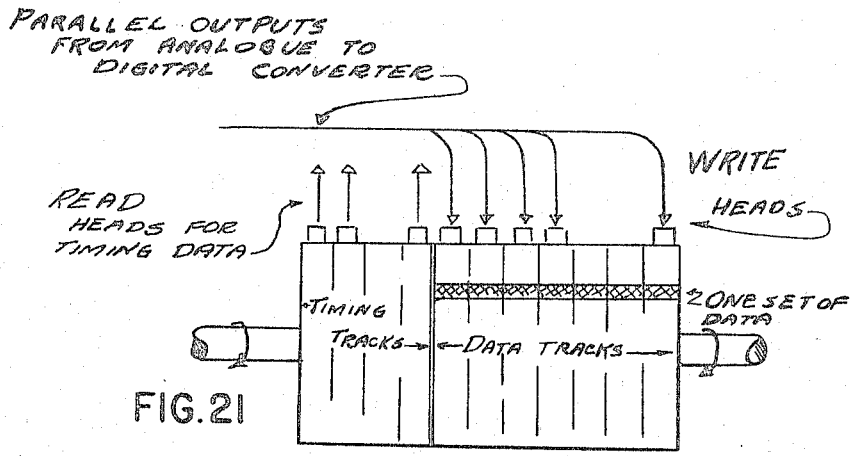
FIGURE 21 shows in some further detail the operation of the magnetic tape, or drum, which serves in FIGURE 20 as the short-time memory unit.

The short-time memory device, or magnetic tape unit, can contain two types of storage tracks: one is for data tracks and the other is for timing tracks. See FIGURE 21. It will be assumed, herein, that the number of data tracks is equal to the number of bits of the outputs of the analogue to digital converter. For process control this could be of the order of 12 to 16 tracks. The timing tracks contain permanently recorded signals used to time, synchronize, and control the tape drive, the multiplexer, and the READ and WRITE operations of the tape, and of the demultiplexer.

The total length of the tape, which forms an endless loop, depends upon the speed of the tape motion, density of recording, the head spacing, and the number of taps, or the number of delays of the equivalent analogue type delay line. Some representative figures will be given. Assume that: (1) there are $l=1000$ separate command functions, that is $V_1=V_{1000}$; (2) the packing, or recording density, is 150 bits per inch; (3) the number of equivalent taps of the delay line is seven; the number of bits of each data word is fourteen, and the width of each track is one fourth inch. Then, the magnetic tape could have the following specifications: (1) width of tape=10 inches including spare tracks; (2) length of tape=42 inches around the loop; (3) tape speed could be 42 inches per second; (4) the bit frequency could be approximately 6.3 kilocycles so that the circuitry could require a speed in the order of 20 kilocycles, which would be readily attainable.

Figure 22:
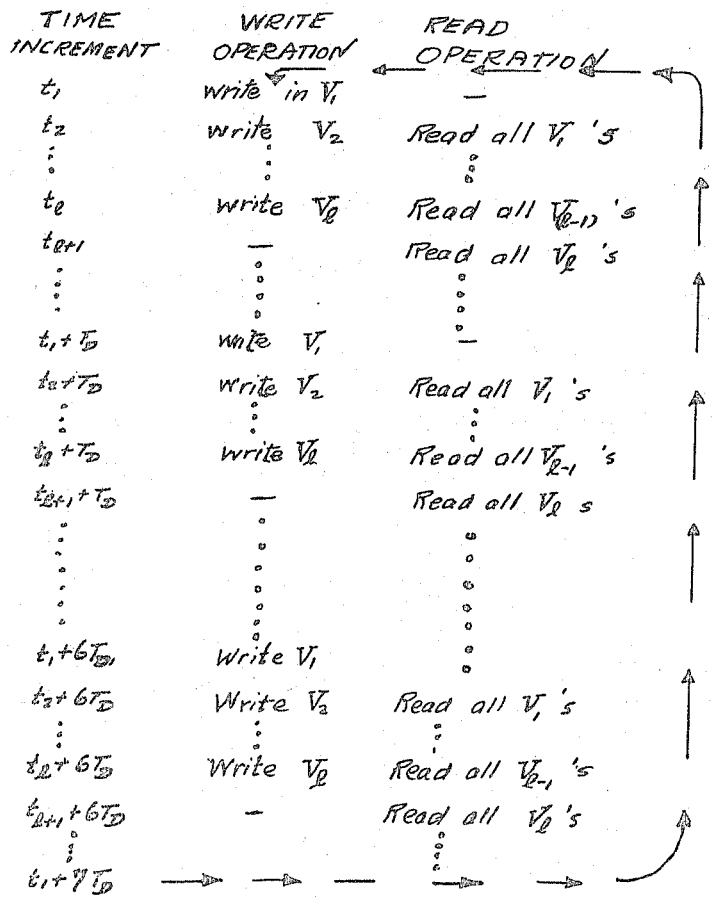
FIGURE 22 presents a timing chart for the magnetic tape or drum unit of the proceeding two figures and, thereby, helps to show how desired performance is obtained.
Figure 23:
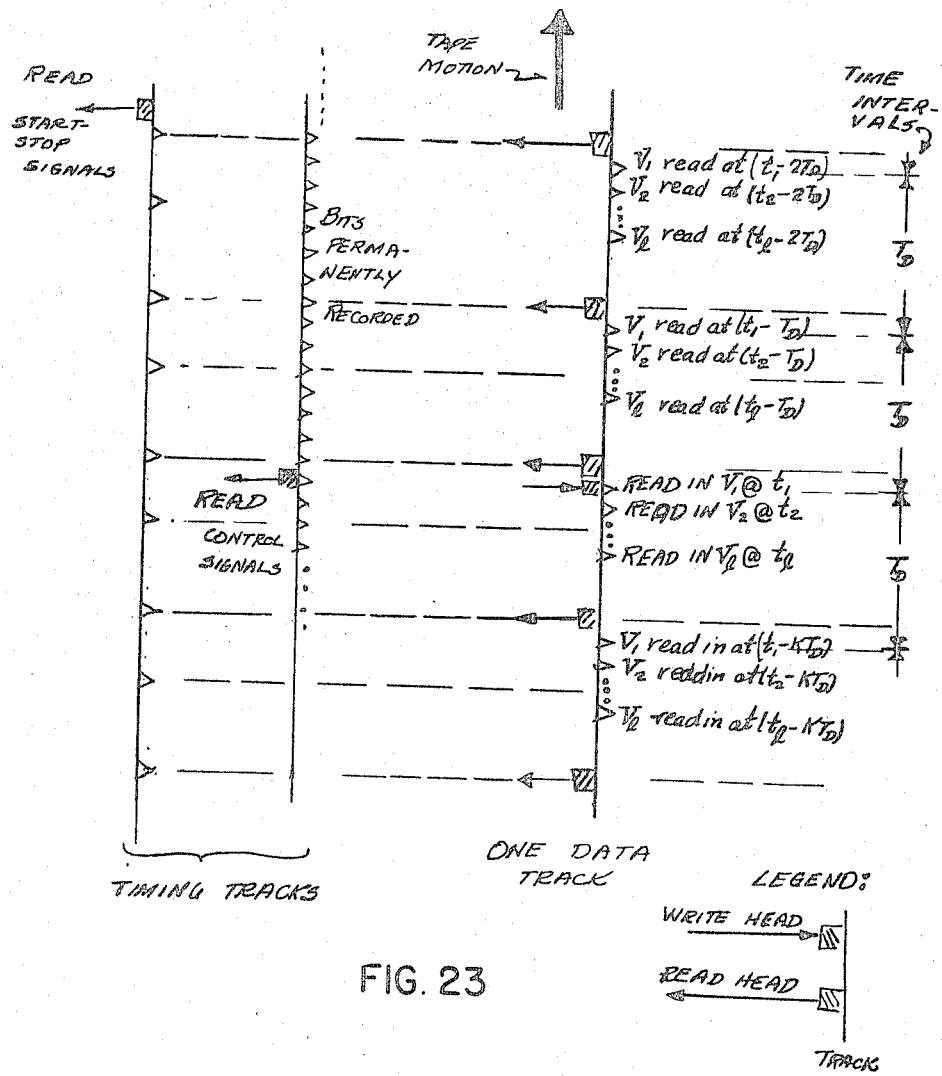
FIGURE 23 gives certain pertinent details of the timing chart tracks of the magnetic tape or the drum unit of FIGURE 20 through FIGURE 22.

A timing scheme is shown in FIGURE 22. This illustrates the sequence of WRITE and READ operations. FIGURE 23 shows the track and head timing assignments to carry out the timing scheme.

On each data track, see FIGURE 23, there is only one WRITE head but there are as many READ heads as there would be taps in the equivalent delay line. An erasing head can be used after the last READ head but this is not necessarily required because the WRITE signal is always either positive or negative. The signals read from the tape are fed to the next section which, in FIGURE 20, is the arithmetic unit.

Now, before going further it will be recalled that the tape unit serves as the delay line, or short-time memory device, which gives discrete time delays to the signals passing through the SCC device. Thus, in FIGURE 20 the tape unit receives, in digital form, via the WRITE head, $V_1(t)$, $V_2(t)$ ... $V_l(t)$. At a later interval of time it receives these signals again. Thus, it stores at one time in digital form the component signals, $$V_a(t-T_k)$$

where $$\alpha=1, 2 \ldots l$$

and where $k=1, 2 \ldots 7$, in the numerical example given above and also in the example shown in FIGURE 20. Note that $T_k$ can be fixed at the designers discretion, and so can $k$.

It will also be recalled that the next step in SCC technique requires that the appropriate set of component signals each be altered in magnitude and, if need be in sign, as may be required, and that the resulting components be summed to form one value of $X_\beta(t)$ where $\beta=1, 2 \ldots m$. In FIGURE 20 $m=l$, and the arithmetic unit shown in that figure provides $X_\beta(t)$ in digital form successively for $\beta=1, 2 \ldots l$ and places each said $X_\beta(t)$ in the buffer, still in digital form. Thus, $$X_\beta(t) = \sum_{\alpha=1}^{\alpha=l} {}_1b_{\alpha\beta}V_\alpha(t) \qquad (38-90)$$

$$= \sum_{k=0}^{k=K} \left\{ \sum_{\alpha=1}^{\alpha=l} {}_\beta B_{\alpha k}[V_\alpha(t-T_k)] \right\}$$

The buffer, now, holds a set of values of $X_\beta(t)$ in digital form. The essential features of the SCC device have been performed, but it remains for the signals $X_\beta(t)$ to be converted again to analogue form and, if the outputs of the SCC devices go to the system being controlled, then to deliver these said $X_\beta(t)$ signals to the system being controlled until a subsequent set of values are received from the demultiplexer.

Referring again to FIGURE 20, the buffer stores the signals from the arithmetic unit for the next steps in the operation. These next steps are quickly taken by the demultiplexer which serves the reverse function of the multiplexer. The demultiplexer can take the form of a rotating switch, a relay tree, or a diode matrix (but of different logical design than that used for the multiplexer). The demultiplexer serves to sort out the appropriate signals $X_1(t)$, $X_2(t)$ etc., and to deliver these in digital form to the correspondingly numbered digital to analogue converter, each of which has its own clamp, or hold, circuit for applying the value of $X_\beta(t)$ to the system being controlled or, in any event, providing $X_\beta(t)$ as the continuous or analogue output of the SCC equipment.

Figure 15:
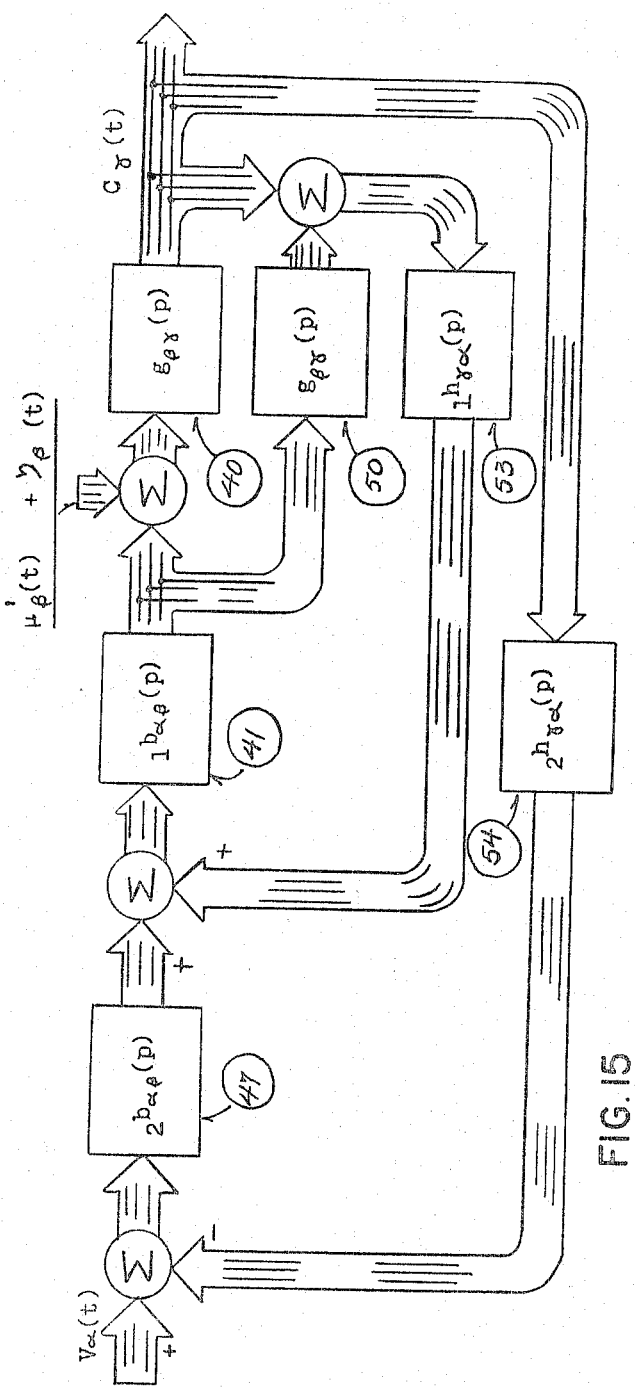
FIGURE 15 shows a multiple input-multiple output total control system wherein items 40, 41, 50 and 53 are arranged in FIGURE 14 to reduce the effects of noise, load disturbance, and also the effects of the nonlinearities within the system being controlled. Then, treating those said items as a whole, to form a system being controlled, a feedback unit, item 54, and an SCC compensator, item 47, are added so that the total arrangement then also incorporates all the features of FIGURE 13.

The foregoing explains the use or analogue to digital to analogue equipment in performing the SCC techniques for multiple input-multiple output signals. Thus this SCC unit could serve as an SCC compensator in the forward paths of a total control system. However, it could also serve in a set of feedback paths, or it could serve in both such locations. In FIGURE 15 the above described analogue to digital to analogue SCC device could serve at ${}_1b_{\alpha\beta}(p)$, at ${}_1h_{\gamma\alpha}(p)$ at ${}_2b_{\alpha\beta}(p)$ and at ${}_1h_{\gamma\alpha}(p)$. Furthermore, if the time delays to be used in the SCC devices, as established from a knowledge of the system being controlled, are rather long relative to the time required for the computer operations in the arithmetic units and in the multiplexers, demultiplexers, analogue to digital and digital to analogue parts of the SCC equipment; then, in accord with well known computer techniques, parts of the SCC equipment can serve on a time sharing basis, at several or all of the aforementioned locations in FIGURE 15.

In U.S. Patent 2,801,351 the changing of the SCC equipment parameters in accord with changes in the parameters of the system being controlled is described and also covered by claim 8 of that patent. This is known today, as adaptive control. Adaptive control is equally applicable to the multiple input-multiple output SCC equipment of the present invention. For example, in the multiple input-multiple output analogue to digital to analogue SCC equipment described above, adaptive control could be achieved by altering the instructions provided to the arithmetic unit. Adaptive control could also be obtained by altering the delays between sets of data on the magnetic tape. This can be more difficult but is possible. Both techniques could be used.

SYMBOLS AND DEFINITIONS

*Time and time oriented symbols*

$t=$the independent variable time.
$T_D \ldots T_1, T_2 \ldots T_l=$fixed values of time delay, primes are used in special instances, thus $T_1', T_2'$ etc.$_1$.
$T_d=$maximum time delay of a given or specific short-time memory device such as a delay line.

$p=d/dt=$Heaviside operator.
$1/p=\int_{0+}$
$S=$complex variable of the Laplace transform calculus.
$S=R\epsilon^{\tau\theta}$, where $R=$magnitude, $\theta=$angle, $j=+\sqrt{-1}$ and $\epsilon=$Naperian base$=2.7183$.
$\omega=$angular velocity$=2\pi$ times frequency.

*Variables*

$V_\alpha(t)=$command function or input, as an instantaneous function of time, $t$, at input terminal, where $\alpha=1, 2 \ldots l$.
$C_\gamma(t)=$output or controlled variable (or else the indirectly controlled variable) at output terminal $\gamma$ as a function of time, $t$, and where $\gamma=1, 2 \ldots n$.
$r_\alpha(t)=$reference input as a function of time $t$ for the $\alpha$ terminal where $\alpha=1, 2 \ldots l$.
$x_\beta(t)=$input signal to the system being controlled at terminal $\beta$ as a function of time, $t$, where $\beta$ can be $1, 2 \ldots m$.
$y_\gamma(t)=$output signal from the linearized model of the system being controlled as a function of time, $t$, and where $\gamma=1, 2 \ldots n$.
$z_\alpha(t)=$output from the network in the feedback path as a function of time, $t$, and where $\alpha=1, 2 \ldots l$.
$\mu_\beta'(t)=$noise input to the part of the system being controlled as a function of time, $t$, and where $\beta=1, 2 \ldots m$.
$\eta_\beta(t)=$the additional input signal to go with the linearized version of the nonlinear part of the system being controlled. This term is shown here as a function of time, $t$, and for input terminal $\beta$ where $\beta=1$, or 2, or $\ldots m$.

$V_\alpha(s)$, $C_\gamma(s)$, $r_\alpha(s)$, $X_\beta(s)$, $y_\gamma(s)$, $z_\alpha(s)$, $\mu_\beta'(s)$, and $\eta_\beta(s)$ are the Laplace transforms for $V_\alpha(t)$, $C_\gamma(t)$, $r_\alpha(t)$, $x_\beta(t)$, $y_\gamma(t)$, $z_\alpha(t)$, $\mu_\beta'(t)$, and $\eta_\beta(t)$, respectively.

Similarly, $V_\alpha(j\omega)$, $C_\gamma(j\omega)$, $r_\alpha(j\omega)$, $x_\beta(j\omega)$, $y_\gamma(j\omega)$, $z_\alpha(j\omega)$, $\mu_\beta'(j\omega)$, and $\eta_\beta(j\omega)$ are the steady state A.C. values for $V_\alpha(t)$, $C_\gamma(t)$, $r_\alpha(t)$, $x_\beta(t)$, $y_\gamma(t)$, $z_\alpha(t)$, $\mu_\beta'(t)$, and $\eta_\beta(t)$, respectively.

*Linear transfer functions*

$$g_{\beta\gamma}(s) = \frac{N_{\beta\gamma}(s)}{D_{\beta\gamma}(s)}$$

$=$transfer function between input terminal $\beta$ and output terminal $\gamma$ of a linear system being controlled wherein it is possible for $\beta=1$, or 2, or $\ldots$ or $m$, and for $\gamma=1$, or 2, or $\ldots$ or $n$. In general $N_{\beta\gamma}(s)$ and $D_{\beta\gamma}(s)$ are each polynomials in s and the degree of $N_{\beta\gamma}(s)$ is equal to, or less than, that of $D_{\beta\gamma}(s)$.

When a nonlinear system is replaced by a linear representation the term $g_{\beta\gamma}(s)$ may be employed for that linear representation.

Similarly, if a linear physical model of the system being controlled is employed physically in parallel with the system being controlled, or elsewhere, in the total control system, this, too, may have between an input and output terminal a transfer function $g_{\beta\gamma}(s)$.

$$b_{\alpha\beta}(s) = \frac{D_{\alpha_x\beta}(s)}{N_{\alpha_x\beta}(s)}$$

$=$Laplace transfer function for the specific equipment located between the input terminal $\alpha$ and the output terminal $\beta$ of the multiple input—multiple output, or MIMO compensator. The equipment between these two terminals can be identical to that described for the compensator of FIGURE 1 of U.S. Patent 3,010,035. In the MIMO compensator when the term $b_{\alpha\beta}(s)$ is employed, it will apply to such a compensator in a forward path of the total control system. Herein, $\alpha=1, 2 \ldots l$ and $\beta=1, 2 \ldots m$.

Other transfer functions $G(s)$, and $[B(s)G(s)]$ taken as a unit, and their form for the frequency domain and as operators involving $p$ are introduced and defined as used either specifically or by usage.

$$h_{\gamma\alpha}(s) = \frac{D_{\gamma_x\alpha}(s)}{N_{\alpha_x\alpha}(s)}$$

=Leplace transform between its own input terminal $\gamma$ and output terminal $\alpha$ of a MIMO compensator located in the feedback path of the total control system. In general, this compensator between its own input and output terminals $\gamma$ and $\alpha$ can be identical with that of FIGURE 1 of U.S. Patent 3,010,035, involving short-time memory devices as shown therein.

$[B(s)G(s)]_{\alpha\gamma}$ and like terms while defined as used, note however, that $[B(s)G(s)]$ is a single term, the two parts are employed only to give the familiar likeness of $[b_{\alpha\beta}(s)g_{\alpha\beta}(s)]$ terms.

*Representation of input-output and output-input relations for multiple input-multiple output nonlinear and possibly interacting systems being controlled which may be subject to noise*

The system being controlled can have $\beta$ inputs and $\gamma$ outputs where $\beta=1, 2 \ldots m$ and $\gamma=1, 2 \ldots n$. It will be assumed that when all of the outputs are known as functions of time, each input is discretely determined as a single valued function of all the said outputs though it may not be feasible to express the said input in closed form. Thus, with no noise present, $$X_\beta(t) = G_{\beta\gamma}^{-1}[C_1(t), C_2(t) \ldots C_n(t)]$$

where $G_{\beta\gamma}^{-1}$ signifies "function of" even though the form of the said function is not specified in closed form.

Next, with noise present it will be assumed that the same function can be used if the input signal can be appropriately altered, so it will be written that $$X_\beta(t) + \mu_\beta'(t) = G_{\beta\gamma}^{-1}[C_1(t) \ldots C_n(t)]$$

Next, it will be assumed that a linearized version of the nonlinear system being controlled is selected such that all of the inputs are functions of the outputs and interaction is maintained. An additional input will be assumed at each input terminal to complete the equalities as follows with $X_\beta(t)$, $\mu_\beta'(t)$, $C_1(t), C_2(t) \ldots C_n(t)$ each as shown by the last equation. Then, $$X_\beta(t) + \eta_\beta(t) = g_{\beta1}^{-1}[C_1(t)] + g_{\beta2}^{-1}[C_2(t)] + \ldots + g_{\beta n}^{-1}[C_n(t)]$$

The last two equations, when subtracted show what $\eta_\beta(t)$ should be in terms of the outputs, $$\eta_\beta(t) = \sum_{\gamma=1}^{\gamma=n} g_{\beta\gamma}^{-1}[C_\gamma(t)]$$

$$-G_{\beta\gamma}^{-1}[C_1(t), C_2(t) \ldots C_n(t)]$$

It is not intended to evaluate $\eta_\beta(t)$ but, instead, to show how to reduce the effect of $\eta_\beta(t)$, for $\beta=1, 2 \ldots m$, on all outputs $C_1(t), C_2(t) \ldots C_n(t)$ to substantially negligible effects.

The multiple input-multiple output compensator, can be described and defined in terms of a set of compensators which in turn are individually defined in U.S. Patent 3,010,035. The multiple input-multiple output compensator can have say $\alpha=1, 2 \ldots l$ inputs and $\beta=1, 2 \ldots m$ outputs where both $\alpha$ and $\beta$ are thus, any positive integers and can be equal or different in number. Connected from each said input to each said output of the multiple input-multiple output compensator there can be a single compensator wherein the said single compensator is of a type described in U.S. Patent 3,010,035. For example see FIGURE 1 of that referenced patent. However, certain of the equipment such as the short-time memory devices can be used for multiple purposes in the multiple input-multiple output SCC compensator.

In U.S. Patent 3,010,035 the "part of the system being controlled" applied, usually, to equipment which had a single input signal and a single output signal.

The term "part of the system being controlled," as employed in the present disclosure, applies to equipment which, in itself, has $m$ input signals and $n$ output signals wherein both $m$ and $n$ are any positive integers; and, in addition, cascaded with each input terminal, or else cascaded with each output terminal, or else cascaded with both input and output terminals there is a terminal of a multiple input-multiple output compensator such that the compensator either delivers reshaped or reformed signals to terminals of the system being controlled, or else reforms signals delivered by the system being controlled or else multiple input-multiple output compensators are employed with the system being controlled to do both of these tasks. It should be observed that the system being controlled can contain all linear elements, or all nonlinear elements, or some of each.

In contrast with the term "part of the system being controlled" another term can be introduced and this term is "other physical apparatus." In principle, it can be exactly like a "part of the system being controlled" *except* that an SCC arrangement, or compensator, specifically *is not* directly cascaded with the said "other physical apparatus."

The term "total system being controlled" applies to the entire assemblage of equipment between the input signals, or command function terminals and the output signal, or controlled variable terminals. Thus, the total system being controlled can include equipment which forms forward-paths and also closed-loop-paths, or both.

The term "altering value" as applied to the signals referred to in the claims contemplates changing only the sign of such signals, changing only the magnitudes of such signals, or changing both the sign and the magnitude of such signals.

FIGURE 15 shows how all of the earlier work can be incorporated into a single total control system. The legend on that figure is considered to be self explanatory.

Figure 16:
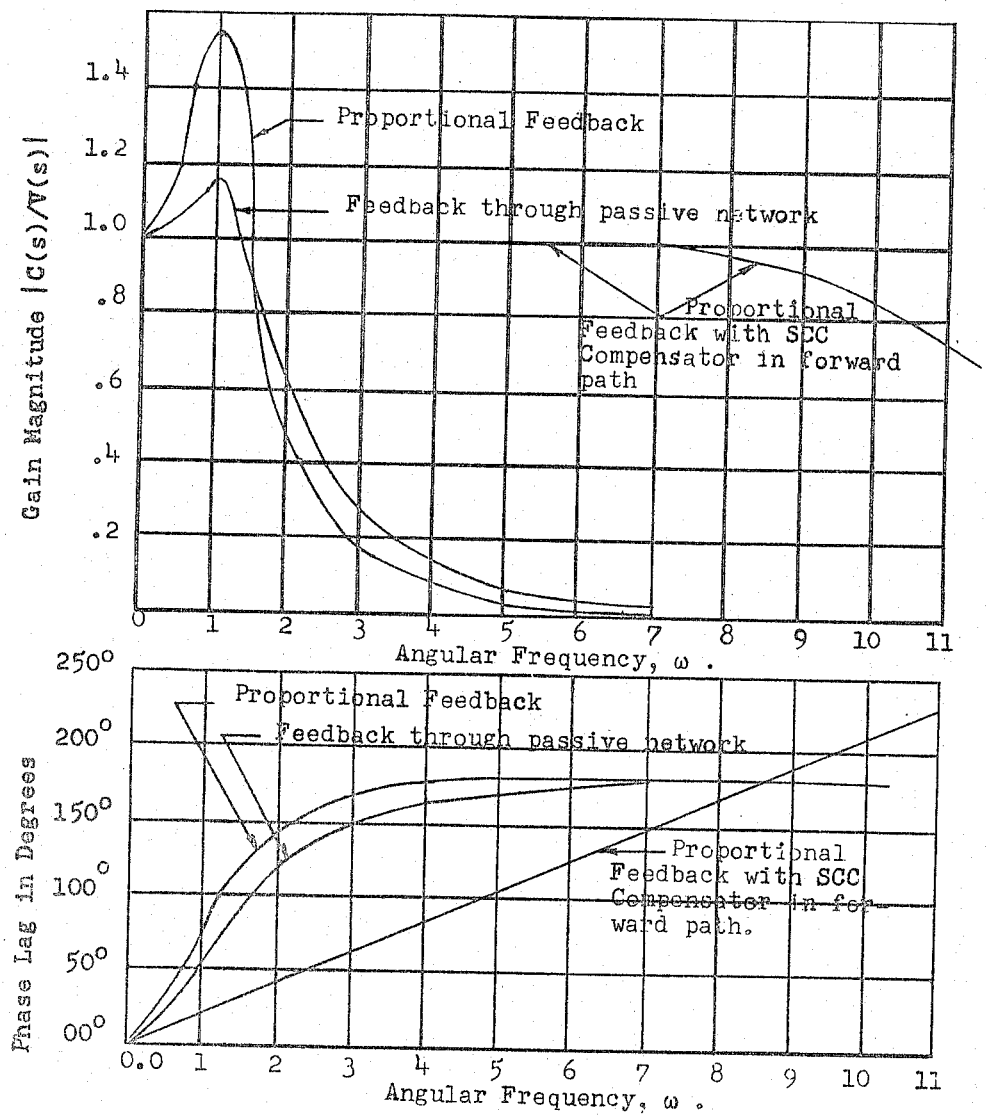
FIGURE 16 shows the calculated gain and phase-angle for a representative second order linear system with single input and single output.
Figure 17:
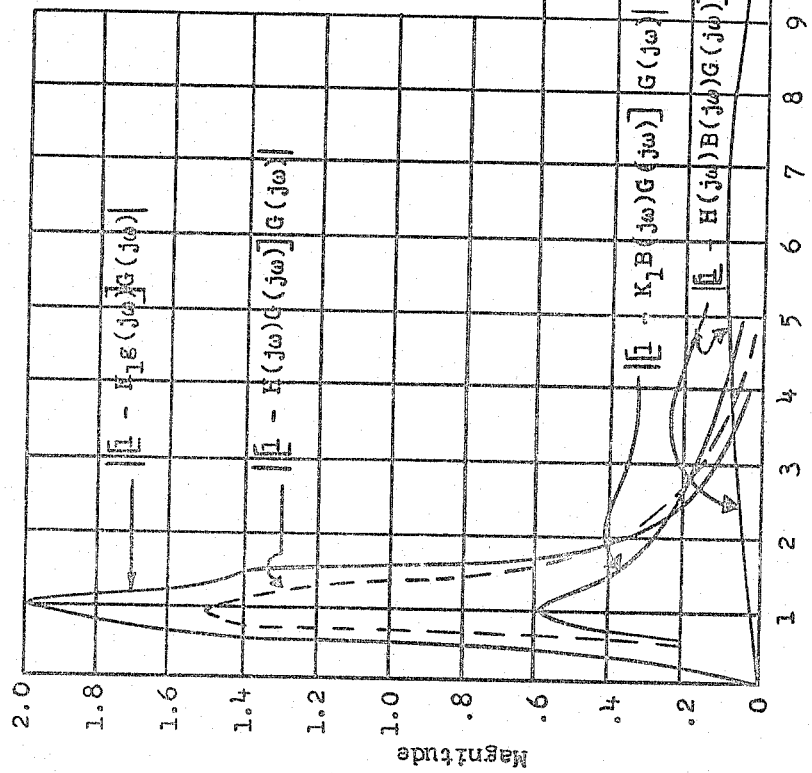
FIGURE 17 illustrates, for a single input-single output control total system, the relative effectiveness of: proportional feedback; more elaborate feedback; and, finally, the techniques and equipment of FIGURE 11, wherein the SCC compensator is employed in conjunction with model and specially designed feedback to reduce noise, load disturbance, and system nonlinearity effects on the output signals of the total control system.
Figure 18A:
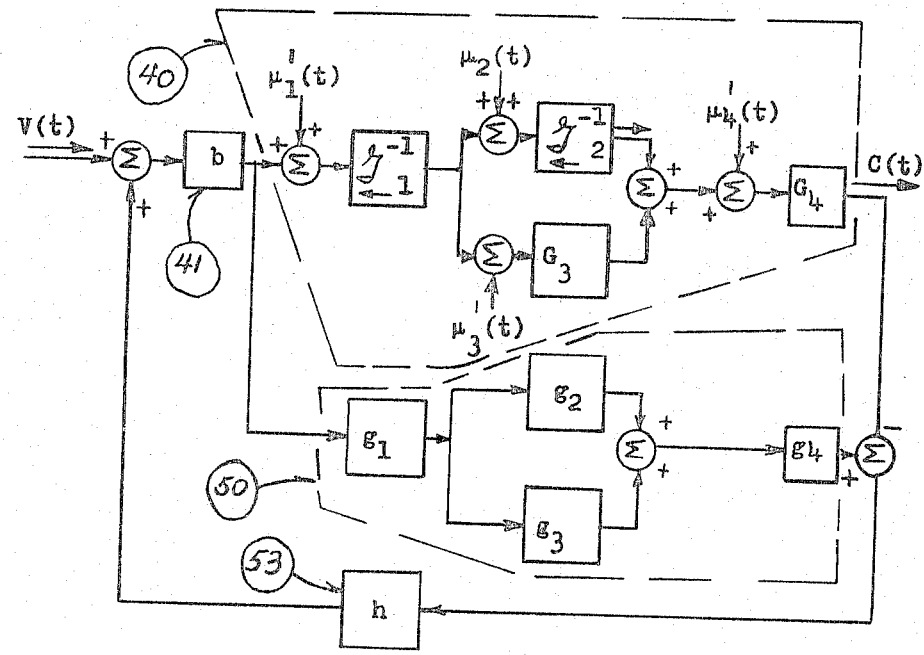
FIGURE 18A shows a relatively elaborate nonlinear system being controlled, 40, which involves four blocks, arranged for the reduction of the effects of noise, load disturbance, and system nonlinearities by means of the SCC compensator 41 used in conjunction with the model 50, and the feedback circuitry 53, which circuitry can also incorporate SCC techniques and equipment.
Figure 18B:
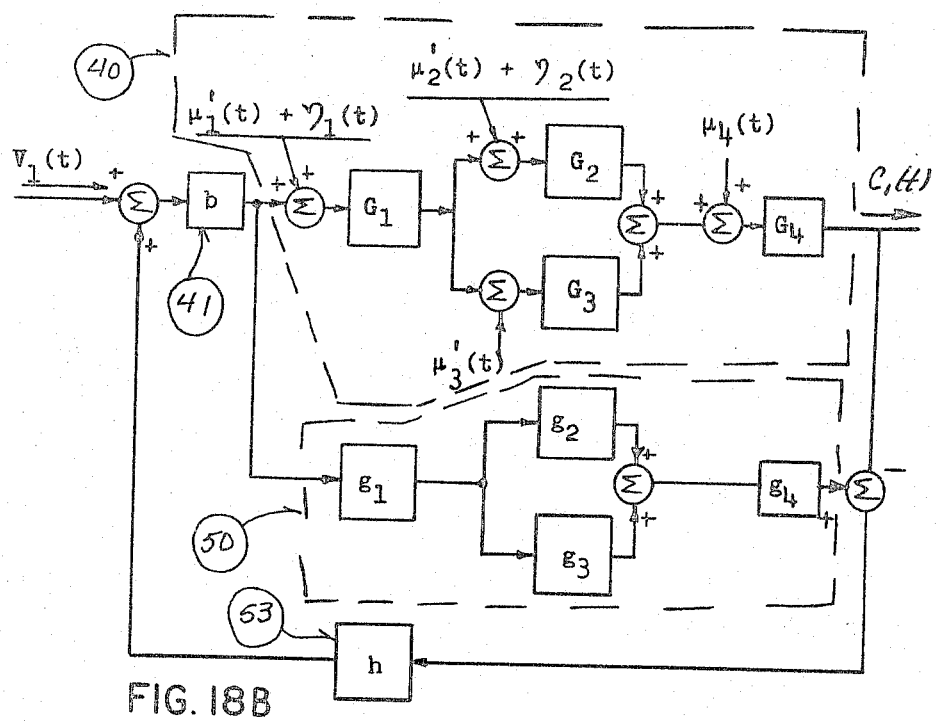
FIGURE 18B shows the linearized version of FIGURE 18A and provides equations to indicate how the techniques and equipment are employed.
Figure 19A:
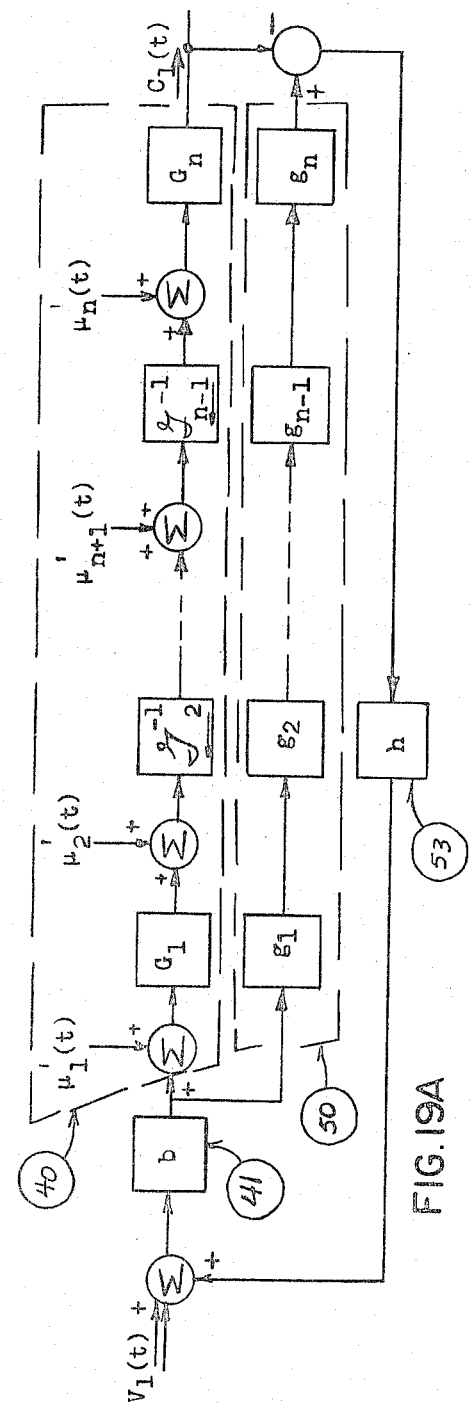
FIGURE 19A is like FIGURE 18A except that a different form is employed for the system being controlled.

FIGURES 16 and 17 show calculated results and indicate the use and power the SCC procedures and equipment.

FIGURES 18A, 18B, 19A, and 19B are included to illustrate some of the many possible uses of the SCC procedures when the system being controlled is relatively more involved than that suggested by the earlier figures.

SUMMARY

The signal component control procedure applied to a system being controlled, when that system being controlled may have a plurality of inputs or a plurality of outputs, or both, is a procedure for compelling (as may be desired) either the directly—or else the indirectly—controlled variables (herein generalized by the term output signals) to quite closely follow specified functions of the command functions. If noise, or load disturbances, or system nonlinearities, or any combinations thereof, are present, the effects of these on the said output signals can be substantially reduced, or else eliminated for all practical purposes. If the system being controlled is interacting, the total feedback control system can be made to act substantially as if it were a noninteracting system. The control system, and the signal component control apparatus may contain parts which are electrical or mechanical, in character, or else contain components of other physical form. In its simplest form, and as employed in this invention, the procedure involves the use of the SCC apparatus between the points where the command functions are received and the points where the input signals are delivered to the system being controlled. The SCC apparatus and the system being controlled are, thus, cascaded, in effect, to form the forward paths of the total control system. The total control system may be either of the open-loop type, or of the closed-loop type, or of the feedforward-feedback type. The SCC apparatus can be used, also, in other paths such as the feedback paths of a total feedback control system, or in the feed forward paths of a feedforward-feedback control system, or both.

It should be understood that the theory which has been expounded as underlying the present invention is believed to be correct though other theories may be developed to support or to explain the phenomena described herein. It should be understood that the invention may be embodied in other physical forms than those specifically described herein, all of which are intended to be within the scope of the present disclosure.

GENERIC NOTATION AND DEFINITIONS FOR SYMBOLS AND EQUATIONS USED IN CLAIMS

In view of the nature of the unique combinational relationships provided in accordance with this invention, it is desirable to define the interrelationships in the claims by means of mathematical equations. Since the inventive concept is broad enough to encompass various "reversal of part" arrangements and to encompass location of a multipath path control system in either a forward path or a backward path, certain complexities are encountered in iterating and subscripting the variables employed in the equations required in claims directed to generic features of the arrangement.

Accordingly, to facilitate generic treatment of the equations without sacrificing mathematical rigor, reference is made to FIG. 24 to provide a basis in the specification for the subscripts required in the claims. In the provision of a multipath control system in accordance with this invention, the multipath control system, or alternatively a multiple input multiple output control system, comprises first and second successively connected devices, shown in FIG. 24. The first device shown in FIG. 24 is identified by means of transfer function $A_{\Omega\sigma}(s)$ and the second device is identified by means of transfer functions $A_{\lambda\tau}(s)$. The input terminals of the first device are designated $\Omega$ where $\Omega = 1, 2 \ldots l$, and the output terminals of the first device are designated $\sigma$ where $\sigma = 1, 2 \ldots m_1$. The input points of the second device are designated $\lambda$ where $\lambda = 1, 2 \ldots m_2$ and the output points of the second device are designated $\tau$ where $\tau = 1, 2 \ldots n$.

There is a command signal $V_\rho(s)$ constituting each input signal $X_\Omega(s)$ to the first device; there is a separate output signal $X_\sigma(s)$ from the first device constituting each input signal $X_\lambda(s)$ to the second device; and there is a separate output signal $X_\tau(s)$ constituting each controlled variable $C_\theta(s)$.

With these definitions, the generic multipath control system arrangement of FIG. 24 may be described as providing controlled variables $C_\theta(s)$ in response to command signals $V_\rho(s)$ of the form $$C_\theta(s) = \sum_{\lambda=1}^{\lambda=m_2} A_{\lambda\tau}(s) X_\lambda(s)$$

where $\tau = \theta$, and where each $$X_\lambda(s) = \sum_{\Omega=1}^{\Omega=l} A_{\Omega\sigma}(s) V_\Omega(s)$$

where $\sigma = \lambda$ and $\Omega = \rho$.

It should also be understood that when each $A_{\Omega\sigma}(s)$ is of the form $b_{\alpha\beta}(s)$, each $A_{\lambda\tau}(s)$ is of the form $g_{\beta\gamma}(s)$; correspondingly when each $A_{\Omega\sigma}(s)$ is of the form $g_{\beta\gamma}(s)$ each $A_{\lambda\tau}(s)$ is of the form $b_{\alpha\beta}(s)$. Moreover, the multipath control system comprised of the cascaded first and second devices may occur in the forward path or in the feedback path of a closed-loop control system.

Finally, the first device is said to be input cascaded with the second device, or, correspondingly, the second device is said to be output cascaded with the first device.

What is claimed is:

1. A total control system of a type adapted for use per se or as part of a larger system, said total control system having incorporated therein a multipath control system comprised of a signal component control apparatus connected in cascaded relation with a part of the system being controlled to provide first and second successively connected devices, with command signals $V_\rho(s)$ for the multipath control system being identical with input signals $X_\Omega(s)$ to said first device, with output signals $X_\sigma(s)$ of said first device being identical to input signals $X_\lambda(s)$ to said second device, and with output signals $X_\tau(s)$ of said second device being identical to controlled variables $C_\theta(s)$ of said multipath control system, said first device having a number of input terminals $\Omega$, with $\Omega = 1, 2 \ldots l$, and a number of output terminals $\sigma$, with $\sigma = 1, 2 \ldots m_1$ and having a distinctive transfer function $A_{\Omega\sigma}(s)$ between each input said terminal and each said output terminal, said second device having a number of input points $\lambda$ with $\lambda = 1, 2 \ldots m_2$ and a number of output points $\tau$, with $\tau = 1, 2 \ldots n$ and having a distinctive transfer function $A_{\lambda\tau}(s)$ between each said input point and each said output point; such that said multipath control system provides controlled variables $C_\theta(s)$ in response to command signals $V_\rho(s)$ of the form $$C_\theta(s) = \sum_{\lambda=1}^{\lambda=m_2} A_{\lambda\tau}(s) X_\lambda(s)$$

$\tau = \theta$, and where each $$X_\lambda(s) = \sum_{\Omega=1}^{\Omega=l} A_{\Omega\sigma}(s) V_\Omega(s)$$

and thus each $C_\theta(s)$ is the sum of any specified number of specified functions, where each said specified function is of a single input $V_\rho(s)$, with the one of said devices that constitutes said part of the system being controlled having each of its distinctive transfer characteristics of the form $g_{\beta\gamma}(s)$ and with the one of said devices that constitutes said signal component control apparatus having each of its distinctive transfer characteristics of the form $b_{\alpha\beta}(s)$, in which both of the terms $l$ and $m_2$ are positive integers and in which at least one of said terms is greater than one.

2. In a total control system of a type adapted for use per se or as part of a larger system, said total control system having incorporated therein a multipath control system comprised of a signal component control apparatus connected in cascaded relation with a part of the system being controlled to provide first and second successively connected devices, with command signals $V_\rho(s)$ for the multipath control system being identical with input signals $X_\Omega(s)$ to said first device, with output signals $X_\sigma(s)$ of said first device being identical to input signals $X_\lambda(s)$ to said second device, and with output signals $X_\tau(s)$ of said second device being identical to controlled variables $C_\theta(s)$ of said multipath control system, said first device having a number of input terminal $\Omega$, with $\Omega = 1, 2 \ldots l$ and a number of output terminals $\sigma$, with $\sigma = 1, 2 \ldots m_1$ and having a distinctive transfer function $A_{\Omega\sigma}(s)$ betwen each said input terminal and each said output terminal, said second device having a number of input points $\lambda$, with $\lambda = 1, 2 \ldots m_2$, and a number of output points $\tau$, with $\tau = 1, 2 \ldots n$, and having a distinctive transfer function $A_{\lambda\tau}(s)$ between each said input point and each said output point, such that said multipath control system provides controlled variables $C_\theta(s)$ in response to command signals $V_\rho(s)$ of the form $$C_\theta(s) = \sum_{\lambda=1}^{\lambda=m_2} A_{\lambda\tau}(s) X_\lambda(s)$$

where $\tau = \theta$, and where each $$X_\lambda(s) = \sum_{\Omega=1}^{\Omega=l} A_{\Omega\sigma}(s) V_\Omega(s)$$

where $\sigma = \lambda$ and $\Omega = \rho$, the improvement wherein said device that constitutes said signal component control apparatus has each of its distinctive transfer characteristics of the form $b_{\alpha\beta}(s)$ and thus each $C_\theta(s)$ is the sum of any specified number of specified functions, where each said function is of a single input $V_\rho(s)$, in which both of the terms 1 and $m_2$ are positive integers and in which at least one of said terms is greater than one.

3. In a open loop total control system having any number of input signals $V_\alpha(s)$, where $\alpha=1, 2 \ldots l$, and having any number of output signals $C_\gamma(s)$, where $$\gamma=1,2 \ldots n$$

and with a part of the system being controlled having a number of inputs points $\beta$, where $\beta=1, 2 \ldots m$, and a a number of output points $\gamma$, said part of the system being controlled having means providing a distinctive transfer function $g_{\beta\tau}(s)$ between each said input point and each said output point, the improvement wherein said system has a signal component control apparatus connected in input cascaded relation to said part of the system being controlled, said signal component control apparatus having a number of input terminals $\alpha$ and a number of output terminals $\beta$ and having means connected between each said input terminal and each said output terminal for providing a distinctive transfer function $b_{\alpha\beta}(s)$, each said output terminal being connected to a single corresponding said input point such that said system provides output signals $C_\tau(s)$ in response to input signals $V_\alpha(s)$ where $$C_\alpha(s) = \left\{\sum_{\beta=1}^{\beta=m} g_{\beta\alpha}(s)\left[\sum_{\alpha=1}^{\alpha=1} b_{\alpha\beta}(s)V_\alpha(s)\right]\right\}$$

and thus each $C_\tau(s)$ is the sum of any number of specified functions each said function being a function of a distinctive one of said $V_\alpha(s)$, in which both of the terms 1 and $m_2$ are positive integers and in which at least one of said terms is greater than one.

4. In the system of claim 3 wherein the said part of the system being controlled is interacting and wherein each $C_\gamma(s)$ is equal to a single distinctive one of said command signals $V_\alpha(s)$ so that the normally interacting system performs as a specified non-interacting system.

5. In an open loop total control system having any number of input signals $V_\rho(s)$, where $\rho=1, 2 \ldots l$, and having any number of output signals $C_\theta(s)$, where $$\theta=1, 2 \ldots n$$

and with a part of the system being controlled having a number of input points $\rho$, and a number of output points $\sigma$, where $\sigma=1, 2 \ldots m$, said part of the system being controlled having means providing a distinctive transfer function $g_{\rho\sigma}(s)$ between each said input point and each output point, said system having a signal component control apparatus connected in output cascaded relation to said part of the system being controlled, said signal component control apparatus having a number of input terminals and a number of output terminals $\theta$ and having means connected between each said input terminal and each said ouput terminal for providing a distinctive transfer function $b_{\sigma\theta}(s)$, each said output point being connected to a single corresponding said input terminal such that said system provides output signals $C_\theta(s)$ in response to input signals $V_\rho(s)$ where $$C_\theta(s) = \left\{\sum_{\sigma=1}^{\sigma=m} b_{\sigma\theta}(s)\left[\sum_{\rho=1}^{\rho=1} g_{\rho\sigma}(s)V_\rho(s)\right]\right\}$$

and thus each $C_\theta(s)$ is the sum of any number of specified functions, each said function being a function of a distinctive one of said $V_\rho(s)$, in which both of the terms 1 and $m_2$ are positive integers and in which at least one of said terms is greater than one.

6. In the system of claim 5 wherein the said part of the system being controlled is interacting and wherein each $S_\theta(s)$ is equal to a single distinctive one of said command signals $V_\rho(s)$ so that the interacting system performs as if it were a specified non-interacting system.

7. An arrangement in accordance with claim 1 and wherein said control system is an open loop control system and said signal component control apparatus is connected in input cascaded relation to said part of the system being controlled.

8. An arrangement in accordance with claim 1 and wherein said control system ils an open loop control system and said signal component control apparatus is connected in output cascaded relation to said part of the system being controlled.

9. A closed loop, feedback type total control system having a forward path and a feedback path, said total control system having incorporated in one of said paths a multipath control system comprised of a signal component control apparatus connected in cascaded relation with a part of the system being controlled to provide first and second successively connected devices, and having other physical apparatus incorporated in the other of said paths, with command signals $V_\rho(s)$ for said multipath control system being identical with input signals $X_\Omega(s)$ to said first device, with output signals $X_\sigma(s)$ of said first device being identical to input signals $X_\lambda(s)$ to said second device, and with output signals $X_\tau(s)$ of said second device being identical to controlled variables $C_\theta(s)$ of said multipath control system, said first device having a number of input terminals $\Omega$, with $\Omega=1, 2 \ldots l$, and a number of output terminals $\sigma$, with $\sigma=1, 2 \ldots m$ and having a distinctive transfer function $A\Omega_\sigma(s)$ between each said input terminal and each said output terminal, said second device having a number of input points $\lambda$, with $\lambda=1, 2 \ldots m_2$ and a number of output points $\tau$, with $\tau=1, 2 \ldots n$, and having a distinctive transfer function $A_{\lambda\tau}(s)$ between each said input point and each said output point, such that said multipath control system provides controlled variables $C_\theta(s)$ in response to command signals $V_\rho(s)$ of the form $$C_\theta(s) = \sum_{\lambda=1}^{\lambda=m_2} A_{\lambda\tau}(s)X_\lambda(s)$$

where $\tau=\theta$,
and where each $$X_\lambda(s) = \sum_{\Omega=1}^{\Omega=1} A_{\Omega\sigma}(s)V_\Omega(s)$$

where $\sigma=\lambda$, and $\Omega=\rho$,
and thus each $C_\theta(s)$ is the sum of any specified number of specified functions, where each said specified function is of a single input $V_\rho(s)$, with the one of said devices that constitutes said part of the system being controlled having each of its distinctive transfer characteristics of the form $g_{\beta\gamma}(s)$ and with the one of said devices that constitutes said signal component control apparatus having each of its distinctive transfer characteristics of the form $b_{\alpha\beta}(s)$, in which both of the terms 1 and $m_2$ are positive integers and in which at least one of said terms is greater than one.

10. An arrangement in accordance with claim 9 and wherein the said multipath control system is incorporated into a forward path of said total control system and said other physical apparatus is incorporated in a feedback path.

11. An arrangement in accordance with claim 9 and wherein the said part of the system being controlled is interacting and each $C_\theta(s)$ is equal to a single distinctive one of said command signals $V\Omega(s)$ so that the normally interacting system performs as a specified non-interacting system.

12. An arrangement in accordance with claim 10 and wherein an additional signal component control apparatus is incorporated in the feedback path and the last-named feedback path is connected to respond to output from the total control system and supply corresponding signals to combine additively with the command functions of the total control system.

13. In a closed loop, feedback type total control system having a forward path and a feedback path, said total control system having incorporated in one of said paths a multipath control system comprised of a signal component control apparatus connected in cascaded relation with a part of the system being controlled to provide first and second successively connected devices, and having other physical apparatus incorporated in the other of said paths, said part of the system being controlled being characterized by the presence, singly or in combination of internal noise signals, load disturbances, and non-linearities of system elements, with command signals $V_\rho(s)$ for the multipath control system being identical with input signals $X\Omega(s)$ to said first device, with output signals $X_\sigma(s)$ of said first device being identical to input signals $X_\lambda(s)$ to said second device, and with output signals $X_\tau(s)$ of said second device being identical to controlled variables $C_\theta(s)$ of said multipath control system, said first device having a number of input terminals $\Omega$, with $\Omega=1, 2 \ldots l$, and a number of output terminals $\sigma$, with $\sigma=1, 2 \ldots m_1$, and having a distinctive transfer function $A\Omega_\sigma(s)$ between each said input terminal and each said output terminal, said second device having a number of input points $\lambda$, with $\lambda=1, 2 \ldots m_2$, and a number of output points $\tau$, with $\tau=1, 2 \ldots n$, and having a distinctive transfer function $A_{\lambda\tau}(s)$ between each said input point and each said output point, such that said multipath control system provides controlled variables $C_\theta(s)$ in response to command signals $V_\rho(s)$ of the form $$C_\theta(s) = \sum_{\lambda=1}^{\lambda=m_2} A_{\lambda\tau}(s) X_\lambda(s)$$

where $\tau=\theta$, and where each $$X_\lambda(s) = \sum_{\Omega=1}^{\Omega=l} A_{\Omega\sigma}(s) V_\Omega(s)$$

where $\sigma=\lambda$ and $\Omega=\rho$, and thus each $C_\theta(s)$ is the sum of any specified number of specified functions, where each said specified function is of a single input $V_\rho(s)$, with the one of said devices that constitutes said part of the system being controlled having each of its distinctive transfer characteristics of the form $g_{\theta\gamma}(s)$ and with the one of said devices than constitutes said signal component control apparatus having each of its distinctive transfer characteristics of the form $b_{\alpha\beta}(s)$, and in combination in said total control system, a linearized model of said part of the system being controlled having an input set of connections and an output set of connections, one said set of connections being connected to corresponding elements of said part of the system being controlled and the other said set of connections being connected in summing relation to corresponding elements of said part of the system being controlled, in which both of the terms 1 and $m_2$ are positive integers and in which at least one of said terms is greater than one.

14. In a feedback control system, a total control system having incorporated therein a signal component control apparatus, having at least one transfer function of the form $b(s)$, connected in cascaded relation with a part of the system being controlled, having at least one transfer function of the form $g(s)$, to provide a system having output that is a specified function of input thereto such that said total control system represents a composite system being controlled, an additional signal component control apparatus connected in cascaded relation with said composite system being controlled to provide an enlarged system having output that is a specified function of input thereto, and a feedback path connecting the last-named output to the last-named input and having other physical apparatus incorporated therein.

15. In a feedback control system, a closed loop total control system having a forward path and a feedback path connected from output to input thereof, said total control system having in one of said paths, a signal component control apparatus, having at least one transfer function of the form $b(s)$, connected in cascaded relation with a part of the system being controlled, having at least one transfer function of the form $g(s)$, and said total control system having in the other of said paths, other physical apparatus to provide said total system such that to output is a specified function of its input, with said total system representing a composite system being controlled, an additional signal component control apparatus connected in cascaded relation with said composite system being controlled to provide an enlarged system having output that is a specified function of input thereto, and an additional feedback path connecting the last-named output to the last-named input and having additional physical apparatus incorporated therein.

16. Signal component control apparatus for a multipath part of a system being controlled, said apparatus comprising an arrangement having input and output terminals $\alpha$ and $\beta$, respectively, and means for connecting each input terminal with each output terminal for producing an individual composite signal at each output terminal corresponding to each individual command signal at each input terminal such that each said composite signal comprises the sum of signal components derived from the single said corresponding command signal and characterized by discrete time delays and changed values in accordance with a transfer function $b_{\alpha\beta}(s)$.

17. Signal component control apparatus for a multipath part of a system being controlled, said apparatus comprising a multi-internal path arrangement having input and output terminals, $\alpha$ and $\beta$, respectively, and a distinctive internal path connecting each input terminal with each output terminal for producing an individual composite signal at each output terminal corresponding to each individual command signal at each input terminal such that each said composite signal comprises the sum of signal components derived from the single said corresponding command signal, each said internal path including means for delaying a command signal passing therethrough different intervals of time to produce a plurality of signal components, means of altering the value of at least some of such last-named signal components, and means for summing said last-named signal components to provide a composite signal containing components characterized by discrete time delays and changed values in accordance with a transfer function $b_{\alpha\beta}(s)$.

18. Within a total control system, a signal component control apparatus cascaded with a part of the system being controlled, the said combination of signal component control apparatus and part of the system being controlled having a plurality of input points and a plurality of output points, with there being between any said input point of the said combination and any said output point thereof, an arrangement comprising means for delaying the signal passing through the said combination between said last-named input point and said last-named output point different intervals of time and means for retaining the undelayed signal passing through to produce a plurality of signal components, and means for altering the values of and adding the said signal components so that, when added together, the resultant contribution to the output point is a specified function of the said input signal; and like arrangements between any other said input point and the said last-named output point of the total control system so that additional signal components derived by passage therethrough are also summed at the said output point to provide thereat a sum of functions, each said function being a function of a different input signal, and, likewise, similar arrangements between any said input point and any other said output point of the total control system so that each output signal is comprised of a sum of functions where each said function is a function of a different input signal.

19. In a closed loop feedback type total control system having a forward path and a feedback path, said total control system having incorporated in said forward path a multipath control system comprised of a signal component control apparatus connected in input cascaded relation with a part of the system being controlled, and having other physical apparatus incorporated in the said feedback paths, said part of the system being controlled being characterized by the presence, singly, or in combination, of internal noise signals, load disturbances, and non-linearities of system elements, with command signals $V_\rho(s)$ for the multipath control system being identical signals $X_\Omega(s)$ to said signal component control apparatus, with output signals $X_\sigma(s)$ of said signal component control apparatus being identical to input signals $X_\lambda(s)$ to said part of the system being controlled, and with output signals $X_\tau(s)$ of said part of the system being controlled being identical to controlled variables $C_\theta(s)$ of said multipath control system, said signal component control apparatus having a number of input terminals $\Omega$, where $\Omega = 1, 2 \ldots l$, and a number of output terminals $\sigma$, where $\sigma = 1, 2 \ldots m_1$, and having a distinctive transfer function $b_{\Omega\sigma}(s)$ between each said input terminal and each said output terminal, said part of the system being controlled having a number of input points $\lambda$ where $\lambda = 1, 2 \ldots m_2$ and a number of output points $\tau$, where $\tau = 1, 2 \ldots n$ and having a distinctive transfer function $g_{\lambda\tau}(s)$ between each said input point and each said output point, such that said multipath control system provides controlled variables $C_\theta(s)$ in response to command signals $V_\rho(s)$ of the form $$C_\theta(s) = \left\{ \sum_{\gamma=1}^{\gamma=m_2} g_{\lambda\tau}(s) \left[ \sum_{\Omega=1}^{\Omega=l} b_{\Omega\sigma}(s) V_\rho(s) \right] \right\}$$

where $\sigma = \lambda$ and $\rho = \Omega$ and where each $C_\theta(s)$ is one of the desired output from the total control system and is substantially the sum of any specified number of specified functions, where each said function is of a single input $V_\rho(s)$, and in combination in said total control system, a linearized model of said part of the system being controlled having an input set of connections and an output set of connections, said input set of connections being connected, in one to one correspondence, to said input points of said part of the system being controlled and said output set of connections being connected in summing relation and in one to one correspondence to said output points of said part of the system being controlled, in which both of the terms 1 and $m_2$ are positive integers and in which at least one of said terms is greater than one.

20. In a closed loop feedback type total control system, where itself can be part of a larger system, said total control system having input summing means to receive command signals $V_a(t)$ and delivered feedback signals $Z(t)$ to provide reference signals $r_a(t)$, such that $r_a(t) = V_a(t) - Z_a(t)$, output summing means to receive controlled variables $C_\gamma(t)$ and linear output signals $y_\xi(t)$ to provide feedback signals $\delta_\gamma(t)$, such that each $\delta_\gamma(t) = C_\gamma(t) - Y_\xi(t)$, reference input points $\alpha$, where $\alpha = 1, 2 \ldots l$, where signals $r_a(t)$, are received; output points $\gamma$, where $\gamma = 1, 2 \ldots n$, where controlled variables $C_\gamma(t)$ are provided; terminal points $\xi$ where $\xi = 1, 2 \ldots n$, where linear output signals $Y_\xi(t)$ are provided; first means providing a first forward path from said input points $\alpha$ to said output points $\gamma$, second means providing a second forward path from said input points $\alpha$ to said terminal points $\xi$, third means providing a feedback path from said output summing means to said input summing means, said first means comprising a multipath signal component control apparatus having transfer functions $b_{\alpha\beta}(p)$ between input and output terminals thereof, where $\beta = 1, 2 \ldots m$, and a part of the system being controlled in cascade with said signal component control apparatus and characterized by linearized transfer functions $g_{\beta\gamma}(p)$ between input and output terminals thereof taken together with injected signals $[\mu'_\beta(t) + \eta_\beta(t)]$ to account for noise, system non-linearities, and load disturbances so that for said first forward path any given controlled variable can be expressed as $$C_\alpha(t) = \sum_{\beta=1}^{\beta=m} g_{\beta\alpha}(p) \left\{ \sum_{\alpha=1}^{\alpha=l} b_{\alpha\beta}(p) r_\alpha(t) + [\mu'_\beta(t) + \eta_\beta(t)] \right\}$$

said second means including a linearized model of the system being controlled characterized by transfer functions $g_{\beta\gamma}(p)$ so that the linearized output signals become $$Y_\xi = \sum_{\beta=1}^{\beta=m} g_{\beta\alpha}(p) \left\{ \sum_{\alpha=1}^{\alpha=l} b_{\alpha\beta}(p) r(t) \right\}$$

said third means including other physical apparatus having a transfer function $h_{\gamma\alpha}(p)$ so that the delivered feedback signals become $$Z_\alpha(t) = \sum_{\alpha=1}^{\alpha=l} h_{\gamma\alpha}(s) \delta_\alpha(s)$$

such that said total control system performs in accordance with equations $$C_\alpha(t) \cong \sum_{\alpha=1}^{\alpha=l} [B(p)G(p)]_{\alpha\gamma} V_\alpha(t($$

$C_1(t) = [B(p)G(p)]_{11} V_1(t) + [B(p)G(p)]_{11}$
$\{h_{11}(p)\delta_1(t)$
$+h_{21}(p)\delta_2(t) + \ldots + h_{n1}(p)\delta_n(t)\} - \delta_1(t)$
$+[B(p)G(p)]_{21} V_2(t) + [B(p)G(p)]_{21}$
$\{h_{12}(p)\delta_1(t)$
$+h_{22}(p)\delta_2(t) + \ldots + h_{n2}(p)\delta_n(t)]$
.
.
.
$+[B(p)G(p)]_{11} V(t) + [B(p)G(p)]_{11}$
$\{h_{12}(p)\delta_1(t)$
$+h_{2\delta}(p)\delta_2(t) + \ldots + h_{n\delta}(p)\delta_n(t)\}$ $C_2(t) = [B(p)G(p)]_{12} V_1(t) + [B(p)G(p)]_{12}$
$\{h_{11}(p)\delta_1(t)$
$+h_{21}(p)\delta_2(t) + \ldots$
$h_{n1}(p)\delta_n(t)\}$
$+[B(p)G(p)]_{22} V_2(t)$
$+[B(p)G(p)]_{22} \{h_{12}(p)\delta_1(t)$
$+h_{22}(p)\delta_2(t) + \ldots$
$+h_{n2}(p)\delta_n(t)\} - \delta_2(t)$
.
.
.
$+[B(p)G(p)]_{12} V_\delta(t) + [B(p)G(p)]_{12}$
$\{h_{11}(p)\delta_1(t)$
$+h_{21}(p)\delta_2(t) + \ldots h_{nl}\delta_n(t)\}$
.
.
.

$C_n(t) = [B(p)G(p)]_{1n} V_1(t) + [B(p)G(p)]_{1n}$
$\{h_{11}(p)\delta_1(t)$
$+h_{21}(p)\delta_2(t) + \ldots + h_{n1}(p)\delta_n(t)\}$
$+[B(p)G(p)]_{2n} V_2(t) + [B(p)G(p)]_{2n}$
$\{h_{12}(p)\delta_1(t)$
$h_{22}(p)\delta_2(t) + \ldots + h_{n2}(p)\delta(t)\}$
.
.
.
$[B(p)G(p)]_{1n} V_1(t) + [B(p)G(p)]_{1n}$
$\{h_{11}(p)\delta_1(t)$
$+h_{2\delta}(p)\delta_2(t) + \ldots h_{n\delta}(p)\delta_n(t)\} - \delta_n(t)$ and with the $b_{\alpha\beta}(p)$ and the $h_{\gamma\alpha}(p)$ being related to minimize the $\delta_\gamma(t)$ which inherently derive from the effects of $[\mu'_\beta(t) + \eta_\beta(t)]$ so that $$C_\gamma(t) \cong \sum_{\alpha=1}^{\alpha=l} [B(p)G(p)]_{\alpha\gamma} V_\alpha(t)$$

in which both of the terms 1 and $m_2$ are positive integers and in which at least one of said terms is greater than one.

21. A total control system of a type adapted for use per se or as part of a larger system, said total control system having incorporated therein a multipath control system comprised of a signal component control apparatus connected in cascaded relation with a part of the system being controlled to provide first and second successively connected devices, with command signals $V_\rho(s)$ for the multipath control system being identical with input signals $X_\Omega(s)$ to said first device, with output signals $X_\sigma(s)$ of said first device being identical to input signals $X_\lambda(s)$ to said second device, and with output signals $X_\tau(s)$ of said second device being identical to controlled variables $C_\theta(s)$ of said multipath control system, said first device having a number of input terminals $\Omega$, with $\Omega=1, 2 \ldots l$, and a number of output terminals $\sigma$, with $\sigma=1, 2 \ldots m_1$, and having a distinctive transfer function $A_{\Omega\sigma}(s)$ between each said input terminal and each said output terminal, said second device having a number of input points $\lambda$, with $\lambda=1, 2 \ldots m_2$ and a number of output points $\tau$, with $\tau=1, 2 \ldots n$ having a distinctive transfer function $A_{\lambda\tau}(s)$ between each said input point and each said output point; such that said multipath control system provides controlled variables $C_\theta(s)$ in response to command signals $V_\rho(s)$ of the form $$C_\theta(s) = \sum_{\lambda=1}^{\lambda=m_2} A_{\lambda\tau}(s) X_\lambda(s)$$

where $\tau=\theta$, and where each $$X_\lambda(s) = \sum_{\Omega=1}^{\Omega=l} A_{\Omega\sigma}(s) V_\Omega(s)$$

where $\sigma=\lambda$ and $\Omega=\rho$, and thus each $C_\theta(s)$ is the sum of any specified number of specified functions, where each said specified function is of a single input $V_\rho(s)$, with the one of said devices that constitutes said part of the system being controlled having each of its distinctive transfer characteristics of the form $g_{\beta\tau}(s)$ and with the one of said devices that constitutes said signal component control apparatus having means connected between each input and output thereof for delaying a signal passing through said apparatus different intervals of time to produce a plurality of signal components and including means for altering the value of at least some of said signal components and means for summing said signal components to provide a composite signal containing components characterized by discrete time delays and changed values in accordance with a transfer function $b_{\alpha\beta}(s)$, in which both of the terms 1 and $m_2$ are positive integers and in which at least one of said terms in greater than one.

22. In a total control system of a type adapted for use per se or as part of a larger system, said total control system having incorporated therein a multipath control system comprised of a signal component control apparatus connected in cascaded relation with a part of the system being controlled to provide first and second successively connected devices, with command signals $V_\rho(s)$ for the multipath control system being identical with input signals $X_\Omega(s)$ to said first device, with output signals $X_\sigma(s)$ of said first device being identical to input signals $X_\lambda(s)$ to said second device, and with output signals $X_\tau(s)$ of said second device being identical to controlled variable $C_\theta(s)$ of said multipath control system, said first device having a number of input terminals $\Omega$, with $\Omega=1, 2 \ldots l$ and a number of output terminals $\sigma$, with $\sigma=1, 2 \ldots m_1$ and having a distinctive transfer function $A_{\Omega\sigma}(s)$ between each input terminal and each said output terminal, said second device having a number of input points $\lambda$, with $\lambda=1, 2 \ldots m_2$, and a number of output points $\tau$, with $\tau=1, 2 \ldots n$, and having distinctive transfer function $A_{\lambda\tau}(s)$ between each said input point and each said output point, such that said multipath control system provides controlled variables $C_\theta(s)$ in response to command signals $V_\rho(s)$ of the form $$C_\theta(s) = \sum_{\lambda=1}^{\lambda=m_2} A_{\lambda\tau}(s) X_\lambda(s)$$

where $\tau=\theta$, and where each $$X_\lambda(s) = \sum_{\Omega=1}^{\Omega=l} A_{\Omega\sigma}(s) V_\Omega(s)$$

where $\sigma=\lambda$, and $\Omega=\rho$, the improvement wherein said device that constitutes said signal component control apparatus having means connected between each input and output thereof for delaying a signal passing through said apparatus different intervals of time to produce a plurality of signal components and including means for altering the value of at least some of said signal components and means for summing said signal components to provide a composite signal containing components characterized by discrete time delays and changed value in accordance with a transfer function $b_{\alpha\beta}(s)$ and thus each $C\theta(s)$ is the sum of any specified number of specified functions, where each said function is of a single $V_\rho(s)$, in which both of the terms $l$ and $m_2$ are positive integers and in which at least one of said terms is greater than one.

23. A closed loop, feedback type total control system havin ga forward path and a feedback path, said total control system having incorporated in one of said paths a multipath control system comprised of a signal component control apparatus connected in cascaded relation with a part of the system being controlled to provide first and second successively connected devices, and having other physical apparatus incorporated in the other of said paths, with command signals $V_\rho(s)$ for said multipath control system being identical with input signals $X_\Omega(s)$ to said first device, with output signals $X_\sigma(s)$ of said first device being identical to input signals $X_\lambda(s)$ to said second device, and with output signals $X_\tau(s)$ of said second device being identical to controlled variables $C_\theta(s)$ of said multipath control system, said first device having a number of input terminals $\Omega$, with $\Omega=1, 2 \ldots l$, and a number of output terminals $\sigma$, with $\sigma=1, 2 \ldots m$ and having a distinctive transfer function $A_\sigma(s)$ between each said input terminal and each said output terminal, said second device having a number of input points $\lambda$, with $\lambda=1, 2 \ldots m_2$ and a number of output points $\tau$, with $\tau=1, 2 \ldots n$, and having a distinctive transfer function $A_{\lambda\tau}(s)$ between each said input point and each said output point, such that said multipath control system provides controlled variables $C_\theta(s)$ in response to command signals $V_\rho(s)$ of the form $$C_\theta(s) = \sum_{\lambda=1}^{\lambda=m_2} A_{\lambda\tau}(s) X_\lambda(s)$$

where $\tau=\theta$, and where each $$X_\lambda(s) = \sum_{\Omega=1}^{\Omega=l} A_{\Omega\sigma}(s) V_\Omega(s)$$

where $\sigma=\lambda$, and $\Omega=\rho$, and thus each $C_\theta(s)$ is the sum of any specified number of specified functions, where each said specified function is of a single input $V_\rho(s)$, with the one of said devices that constitutes said part of the system being controlled having each of its distinctive transfer characteristics of the form $g_{\beta\gamma}(s)$ and with the one of said devices that constitutes said signal component control apparatus having means connected between each input and output thereof for delaying a signal passing through said apparatus different intervals of time to produce a plurality of signal components and including means for altering the value of at least some of said signal components and means for summing said signal components to provide a composite signal containing components characterized by discrete time delays and changed values in accordance with a transfer function $b_{\alpha\beta}(s)$, in which both of the terms $l$ and $m_2$ are positive integers and in which at least one of said terms is greater than one.

24. In a total system of a type adapted for use per se or as part of a larger system, said total control system having incorporated therein a multipath control system comprised of a signal component control apparatus connected in cascaded relation with a part of the system being controlled to provide first and second successively connected devices, with command signals $V_\rho(s)$ for the multipath control system being identical with input signals $X_\Omega(s)$ to said first device, with output signals $X_\sigma(s)$ of said first device being identical to input signals $X_\lambda(s)$ to said second device, and with output signals $X_\tau(s)$ of said second device being identical to controlled variables $C_\theta(s)$ of said multipath control system, said first device having a number of input terminals $\Omega$, with $\Omega = 1, 2 \ldots l$ and a number of output terminals $\sigma$, with $\sigma = 1, 2 \ldots m_1$, and having a distinctive transfer function $A_{\Omega\sigma}(s)$ between each said input terminal and each said output terminal, said second device having a number of input points $\lambda$, with $\lambda = 1, 2 \ldots m_2$, and a number of output points $\tau$, with $\tau = 1, 2 \ldots n$ and having a distinctive transfer function $A_{\lambda\tau}(s)$ between each said input point and each said output point, such that said multipath control system provides controlled variables $C_\theta(s)$ in response to command signals $V_\rho(s)$ of the form $$C_\theta(s) = \sum_{\lambda=1}^{\lambda=m_2} A_\lambda(s) X_\lambda(s)$$

where $\tau = \theta$, and where each $$X_\lambda(s) = \sum_{\Omega=1}^{\Omega=l} A_{\Omega\sigma}(s) V_\Omega(s)$$

where $\sigma = \lambda$ and $\Omega = \rho$, the improvement wherein said device constitutes said signal component control apparatus has means providing through each path thereof a composite output signal corresponding to each input signal, each said composite output signal comprising the sum of signal components derived from the corresponding said input signal and characterized by discrete time delays and changed values in accordance with a transfer function $b_{\alpha\beta}(s)$ and thus each $C_\theta(s)$ is the sum of any specified number of specified functions, where each said function is of a single input $V_\rho(s)$, in which both of the terms $l$ and $m_2$ are positive integers and in which at least one of said terms is greater than one.

25. A total control system of a type adapted for use per se or as part of a larger system, said total control system having incorporated therein a multiple input-multiple output control system comprised of a signal component control apparatus connected in cascaded relation with a part of the system being controlled to provide first and second successively connected devices, with command signals $V_{\Omega\rho}(s)$ for the multipath control system being identical with input signals $V_\Omega(s)$ to said first device, with output signals $X_\sigma(s)$ of said first device being identical to input signals $X_\lambda(s)$ to said second device, and with output signals $X_\tau(s)$ of said second device being identical to controlled variables $C_\tau(s)$ of said multiple input-multiple output control system, said first device having a number of input terminals $\Omega$, with $\Omega = 1, 2 \ldots l$, and a number of output terminals $\sigma$, with $\sigma = 1, 2 \ldots m_1$ and having a distinctive transfer function $A_{\Omega\sigma}(s)$ between each said input terminal and each said output terminals, said second device having a number of input points $\lambda$ with $\lambda = 1, 2 \ldots m_2$ and a number of output points $\tau$, with $\tau = 1, 2 \ldots n$ and having a distinctive transfer function $A_{\lambda\tau}(s)$ between each said input point and each said otuput point; such that said multiple input-multiple output control system provides controlled variables $C_\theta(s)$ in response to command signals $V_\rho(s)$ of the form $$C_\theta(s) = \sum_{\lambda=1}^{\lambda=m_2} A_{\lambda\tau}(s) X_\lambda(s)$$

where $\tau = \theta$, and where each $$X_\lambda(s) = \sum_{\Omega=1}^{\Omega=l} A_{\Omega\sigma}(s) V_\Omega(s)$$

where $\sigma = \lambda$ and $\Omega = \rho$, and thus each $C_\theta(s)$ is the sum of any specified number of specified functions, where each said specified function is a single input $V_\rho(s)$, with the one of said devices that constitutes said part of the system being controlled having each of its distinctive transfer characteristics of the form $g_{\beta\gamma}(s)$ and with the one of said devices that constitutes said signal component control apparatus having each of its distinctive transfer characteristics of the form $b_{\alpha\beta}(s)$, in which both of the terms $l$ and $m_2$ are positive integers and in which at least one of said terms is greater than one.

26. In a total control system of a type adapted for use per se or as part of a larger system, said total control system having incorporated therein a multiple input-multiple output control system comprised of a signal component control apparatus connected in cascaded relation with a part of the system being controlled to provide first and second successively connected devices, with command signals $V_\rho(s)$ for the multiple input-multiple output control system being identical with input signals $X_\Omega(s)$ to said first device, with output signals $X_\sigma(s)$ of said first device being identical to input signals $X_\lambda(s)$ to said second device, and with output signals $X_\tau(s)$ of said second device being identical to controlled variables $C_\theta(s)$ of said multiple input-multiple output control system, said first device having a number of input terminals $\Omega$, with $\Omega = 1, 2 \ldots l$ and a number of output terminals $\sigma$, with $\sigma = 1, 2 \ldots m_1$ and having a distinctive transfer function $A_{\Omega\sigma}(s)$ between each said input terminal and each said output terminal, said second device having a number of input points $\lambda$, with $\lambda = 1, 2 \ldots m_2$, and a number of output points $\tau$, with $\tau = 1, 2 \ldots n$, and having a distinctive transfer function $A_{\lambda\tau}(s)$ between each said input point and each said output point, such that said multiple input-multiple output control system provides controlled variables $C_\theta(s)$ in response to command signals $V_\rho(s)$ of the form $$C_\theta(s) = \sum_{\lambda=1}^{\lambda=m_2} A_{\lambda\tau}(s) X_\lambda(s)$$

where $\tau = \theta$, and where each $$X_\lambda(s) = \sum_{\Omega=1}^{\Omega=l} A_{\Omega\sigma}(s) V_\Omega(s)$$

where $\sigma = \lambda$ and $\Omega = \rho$, the improvement wherein said device that constitutes said signal component control apparatus has each of its distinctive transfer characteristics of the form $b_{\alpha\beta}(s)$ and thus each $C_\theta(s)$ is the sum of any specified number of specified functions, where each said function is of a single input $V_\rho(s)$, in which both of the terms $l$ and $m_2$ are positive integers and in which at least one of said terms is greater than one.

27. A closed loop, feedback type total control system having a forward path and a feedback path said total control system having incorporated in one of said paths a multiple input-multiple output control system comprised of a signal component control apparatus connected in cascaded relation with a part of the system being controlled to provide first and second successively connected devices, and having other physical apparatus incorporated in the other of said paths, with command signals $V_\rho(s)$ for said multiple input-multiple output control system being identical with input signals $X_\Omega(s)$ to said first device, with output signals $X_\sigma(s)$ of said first device being identical to input signals $X_\lambda(s)$ to said second device, and with output signals $X_\tau(s)$ of said second device being identical to controlled variables $C_\theta(s)$ of said multiple input-multiple output control system, said first device having a number of input terminals $\Omega$, with $\Omega = 1, 2 \ldots l$, and a number of output terminals $\sigma$, with $\sigma=1, 2 \ldots m$ and having a distinctive transfer function $A_{\Omega\sigma}(s)$ between each said input terminal and each said output terminal, said second device having a number of input points $\lambda$, with $\lambda=1, 2 \ldots m_2$ and a number of output points $\tau$, with $\tau=1, 2 \ldots n$, and having a distinctive transfer function $A_{\lambda\tau}(s)$ between each said input point and each said output point, such that said multiple input-multiple output control system provides controlled variables $C_\theta(s)$ in response to command signals $V_\rho(s)$ of the form $$C_\theta(s) = \sum_{\lambda=1}^{\lambda=m_2} A_{\lambda\tau}(s) X_\lambda(s)$$

where $\tau=\theta$, and where each $$X_\lambda(s) = \sum_{\Omega=1}^{\Omega=l} A_{\Omega\sigma}(s) V_\Omega(s)$$

where $\sigma=\lambda$, and $\Omega=\rho$, and thus each $C_\theta(s)$ is the sum of any specified number of specified functions, where each said specified function is of a single input $V_\rho(s)$, with the one of said devices that constitutes said part of the system being controlled having each of its distinctive transfer characteristics of the form $g_{\beta\gamma}(s)$ and with the one of said devices that constitutes said signal component control apparatus having each of its distinctive transfer characteristics of the form $b_{\alpha\beta}(s)$, in which both of the terms $l$ and $m_2$ are positive integers and in which at least one of said terms is greater than one.

28. In a closed loop, feedback type total control system having a forward path and a feedback path, said total control system having incorporated in one of said paths a multiple input-multiple output control system comprised of a signal component control apparatus connected in cascaded relation with a part of the system being controlled to provide first and second successively connected devices, and having other physical apparatus incorporated in the other of said paths, said part of the system being controlled being characterized by the presence, singly or in combination of internal noise signals, load disturbances, and non-linearities of system elements, with command signals $V_\rho(s)$ for the multiple input-multiple output control system being identical with input signals $X_\Omega(s)$ to said first device, with output signals $X_\sigma(s)$ of said first device being identical to input signals $X_\lambda(s)$ to said second device, and with output signals $X_\tau(s)$ of said second device being identical to controlled variables $C_\theta(s)$ of said multiple input-multiple output control system, said first device having a number of input terminals $\Omega$, with $\Omega=1, 2 \ldots l$, and a number of output terminals $\sigma$, with $\sigma=1, 2 \ldots m_1$, and having a distinctive transfer function $A_{\Omega\sigma}(s)$ between each said input terminal and each said output terminal, said second device having a number of input points $\lambda$, with $\lambda=1, 2 \ldots m_2$, and a number of output points $\tau$, with $\tau=1, 2 \ldots n$, and having a distinctive transfer function $A_{\lambda\tau}(s)$ between each said input point and each said output point, such that said multiple input-multiple output control system provides controlled variables $C_\theta(s)$ in response to command signals $V_\rho(s)$ of the form $$C_\theta(s) = \sum_{\lambda=1}^{\lambda=m_2} A_{\lambda\tau}(s) X_\lambda(s)$$

where $\tau=\theta$, and where each $$X_\lambda(s) = \sum_{\Omega=1}^{\Omega=l} A_{\Omega\sigma}(s) V_\Omega(s)$$

and thus each $C_\theta(s)$ is the sum of any specified number of specified functions, where each said specified function is of a single input $V_\rho(s)$, with the one of said devices that constitutes said part of the system being controlled having each of its distinctive transfer characteristics of the form $g_{\beta\gamma}(s)$ and with the one of said devices that constitutes said signal component control apparatus having each of its distinctive transfer characteristics of the form $b_{\alpha\beta}(s)$, and in combination in said total control system, a linearized model of said part of the system being controlled having an input set of connections and an output set of connections, one said set of connections being connected to corresponding elements of said part of the system being controlled and the other said set of connections being connected in summing relation to corresponding elements of said part of the system being controlled, in which both of the terms $l$ and $n_2$ are positive integers and in which at least one of said terms is greater than one.

29. In a closed loop feedback type total control system, which itself can be part of a larger system, said total control system having input summing means to receive command signals $V_\alpha(t)$ and delivered feedback signals $Z_\alpha(t)$ to provide reference signals $r_\alpha(t)$, such that each $r_\alpha(t) = V_\alpha(t) - Z_\alpha(t)$, output summing means to receive controlled variables $C_\gamma(t)$ and linear output signals $y_\xi(t)$ to provide feedback signals $\delta_\alpha(t)$, such that each $\delta_\gamma(t) = C_\gamma(t) - y\xi(t)$, reference input points $\alpha$, where $\alpha=1, 2 \ldots l$, where signals $r_\gamma(t)$ are received; output points $\gamma$, where $\gamma=1, 2 \ldots n$, where controlled variables $C_\gamma(t)$ are provided; terminal points $\xi$ where $\xi=1, 2 \ldots n$, where linear output signals $y_\xi(t)$ are provided; first means providing a first forward path from said input points $\alpha$ to said output points $\gamma$, second means providing a second forward path from said input points $\alpha$ to said terminal points $\xi$, third means providing a feedback path from said output summing means to said input summing means, said first means comprising a multiple input-multiple output signal component control apparatus having transfer functions $b_{\alpha\beta}(p)$ between input and output terminals thereof, where $\beta=1, 2 \ldots m$, and a part of the system being controlled in cascade with said signal component control apparatus and characterized by linearized transfer functions $g_{\beta\gamma}(p)$ between input and output terminals thereof taken together with injected signals $[\mu'_\beta(t) + \eta_\beta(t)]$ to account for noise, system non-linearities, and load disturbances so that for said first forward path any given controlled variable can be expressed as $$C_\gamma(t) = \sum_{\beta=1}^{\beta=m} g_{\beta\gamma}(p) \left\{ \sum_{\alpha=1}^{\alpha=l} b_{\alpha\beta}(p) r_\alpha(t) + [\mu'_\beta(t) + \eta_\beta(t)] \right\}$$

said second means including a linearized model of the system being controlled characterized by transfer functions $g_{\beta\gamma}(p)$ so that the linearized signals become $$y_\xi(t) = \sum_{\beta=1}^{\beta=m} g_{\beta\gamma}(p) \left\{ \sum_{\alpha=1}^{\alpha=l} b_{\alpha\beta}(p) r t \right\}$$

said third means including other physical apparatus having a transfer function $h_{\gamma\alpha}(p)$ so that the delivered feedback signals become $$Z_\alpha(t) = \sum_{\alpha=1}^{\alpha=l} h_{\gamma\alpha}(s) \delta_\gamma(s)$$

such that said total control system performs in accordance with equations $C_1(t) = [B(p)G(p)]_{11} V_1(t) + [B(p)G(p)]_{11}$
$\{h_{11}(p)\delta_1(t) + h_{21}(p)\delta_2(t) + \ldots$
$+ h_{n1}(p)\delta_n(t)\} - \delta_1(t) + [B(p)G(p)]_{21} V_2(t)$
$+ [B(p)G(p)]_{21}\{h_{12}(p)\delta_1(t) + h_{22}(p)\delta_2(t)$
$+ \ldots + h_{n2}(p)\delta_n(t)\}$

.
.
.

$+ [B(p)G(p)]_{11} V(t) + [B(p)G(p)]_{11}$
$\{h_{11}(p)\delta_1(t) + h_{21}(p)\delta_2(t) + \ldots$
$+ h_{n1}(p)\delta_n(t)\}$ $$C_2(t) = [B(p)G(p)]_{12}V_1(t) + [B(p)G(p)]_{12}$$
$$\{h_{11}(p)\delta_1(t) + h_{21}(p)\delta_2 + \ldots + h_{n1}(p)\delta_n(t)\}$$
$$+ [B(p)G(p)]_{22}V_2(t) + [B(p)G(p)]_{22}$$
$$\{h_{12}(p)\delta_1(t) + h_{22}(p)\delta_2(t) + \ldots$$
$$+ h_{n2}(p)\delta_n(t)\} - \delta_2(t)$$

⋮

$$+ [B(p)G(p)]_{12}V_1(t) + [B(p)G(p)]_{12}$$
$$\{h_{11}(p)\delta_1(t) + h_{21}(p)\delta_2(t) + h_{n1}\delta_n(t)\}$$

⋮

$$C_n(t) = [B(p)G(p)]_{1n}V_1(t) + [B(p)G(p)]_{1n}$$
$$\{h_{11}(p)\delta_1(t) + h_{21}(p)\delta_2(t) + \ldots$$
$$+ h_{n1}(p)\delta_n(t)\} + [B(p)G(p)]_{2n}V_2(t)$$
$$+ [B(p)G(p)]_{2n}\{h_{12}(p)\delta_1(t) + h_{22}(p)\delta_2(t)$$
$$+ \ldots + h_{n2}(p)\delta_n(t)\}$$

⋮

$$+ [B(p)G(p)]_{1n}V_1(t) + [B(p)G(p)]_{1n}$$
$$\{h_{11}(p)\delta_1(t) + h_{21}(p)\delta_2(t) + \ldots$$
$$+ h_{n1}(p)\delta_n(t)\} - \delta_n(t)$$

and with the $b_{\alpha\beta}(p)$ and the $h_{\gamma\alpha}(p)$ being related to minimize the $\delta_\gamma(t)$ which inherently derive from the effects $[\mu'_\beta(t) + \eta_\beta(t)]$ so that $$C_\gamma(t) \cong \sum_{\alpha=1}^{\alpha=l} [B(p)G(p)]_{\alpha\gamma}V_\alpha(t)$$

in which both the terms $l$ and $m_2$ are positive integers and in which at least one of said terms is greater than one.

30. A total control system of a type adapted for use per se or as part of a larger system, said total control system having incorporated therein a multiple input-multiple output control system comprised of a signal component control apparatus connected in cascade relation with a part of the system being controlled to provide first and second successively connected devices, with command signals $V_\rho(s)$ for the multiple input-multiple output control system being identical with input signals $X_\Omega(s)$ to said first device, with output signals $X_\sigma(s)$ of said first device being identical to input signals $X_\lambda(s)$ to said second device, and with output signals $X_\tau(s)$ of said second device being identical to controlled variables $C_\theta(s)$ of said multiple input-multiple output control system, said first device having a number of input terminals $\Omega$ with $\Omega=1, 2 \ldots l$, and a number of output terminals $\sigma$, with $\sigma=1, 2 \ldots m_1$, and having a distinctive transfer function $A_{\Omega\sigma}(s)$ between each said input terminal and each said output terminal, said second device having a number of input points $\lambda$, with $\lambda=1, 2 \ldots m_2$ and a number of output points $\tau$, with $\tau=1, 2 \ldots n$ and having a distinctive transfer function $A_{\lambda\tau}(s)$ between each said input point and each said output point; such that said multiple input-multiple output control system provides controlled variables $C_\theta(s)$ in response to command signals $V_\rho(s)$ of the form $$C_\theta(s) = \sum_{\lambda=1}^{\lambda=m_2} A_{\lambda\tau}(s) X_\lambda(s)$$

where $\tau=\theta$, and where each $$X_\lambda(s) = \sum_{\Omega=1}^{\Omega=l} A_{\Omega\sigma}(s) V_\Omega(s)$$

where $\sigma=\lambda$ and $\Omega=\rho$, and thus each $C_\theta(s)$ is the sum of any specified number of specified functions, where each said specified function is of a single input $V_\rho(s)$, with the one of said devices that constitutes said part of the system being controlled having each of its distinctive transfer characteristics of the form $g_{\beta\gamma}(s)$ and with the one of said devices that constitutes said signal component control apparatus having means connected between each input and output thereof for delaying a signal passing through said apparatus different intervals of time to produce a plurality of signal components and including means for altering the value of at least some of said signal components and means for summing said signal components to provide a composite signal containing components characterized by discrete time delays and changed values in accordance with a transfer function $b_{\alpha\beta}(s)$, in which both of the terms $l$ and $n_2$ are positive integers and in which at least one of said terms is greater than one.

31. In a total control system of a type adapted for use per se or as part of a larger system, said total control system having incorporated therein a multiple input-multiple output control system comprised of a signal component control apparatus connected in cascade relation with a part of the system being controlled to provide first and second successively connected devices, with command signals $V_\rho(s)$ for the multiple input-multiple output control system being identical with input signals $X_\Omega(s)$ to said first device, with output signals $X_\sigma(s)$ of said first device being numerical to input signals $X_\lambda(s)$ to said second device, and with output signals $X_\tau(s)$ of said second device being identical to controlled variables $C_\theta(s)$ of said multiple input-multiple output control system, said first device having a number of input terminals $\Omega$, with $\Omega=1, 2 \ldots l$, and a number of output terminals $\sigma$, with $\sigma=1, 2 \ldots m_1$ and having a distinctive transfer function $A_{\Omega\sigma}(s)$ between each said input terminal and each said output terminal, said second device having a number of input points $\lambda$, with $\lambda=1, 2 \ldots m_2$, and a number of output points $\tau$, with $\tau=1, 2 \ldots n$, and having a distinctive transfer function $A_{\lambda\tau}(s)$ between each said input point and each said output point, such that said multiple input-multiple output control system provides controlled variables $C_\theta(s)$ in response to command signals $V_\rho(s)$ of the form $$C_\theta(s) = \sum_{\lambda=1}^{\lambda=m_2} A_{\lambda\tau}(s) X_\lambda(s)$$

where $\tau=\theta$, and where each $$X_\lambda(s) = \sum_{\Omega=1}^{\Omega=l} A_{\Omega\sigma}(s) V_\Omega(s)$$

where $\sigma=\lambda$, and $\Omega=\rho$, the improvement wherein said device that constitutes said signal component control apparatus having means connected between each input and output thereof for delaying a signal passing through said apparatus different intervals of time to produce a plurality of signal components and including means for altering the value of at least some of said signal components and means for summing said signal components to provide a composite signal containing components characterized by discrete time delays and changed values in accordance with a transfer function $b_{\alpha\beta}(s)$ and thus each $C_\theta(s)$ is the sum of any specified number of specified functions, where each said function is of a single $V_\rho(s)$, in which both of the terms $l$ and $n_2$ are positive integers and in which at least one of said terms is greater than one.

32. A closed loop, feedback type total control system having a forward path and a feedback path, said total control system having incorporated in one of said paths a multiple input-multiple output control system comprised of a signal component control apparatus connected in cascaded relation with a part of the system being controlled to provide first and second successively connected devices, and having other physical apparatus incorporated in the other of said paths, with command signal $V_\rho(s)$ for said multiple input-multiple output control system being identical with input signals $X\Omega(s)$ to said first device, with output signals $X_\sigma(s)$ of said first device being identical to input signals $X_\lambda(s)$ to said second device, and with output signals $X_\tau(s)$ of said second device being identical to controlled variables $C_\theta(s)$ of said multiple input-multiple output control system, said first device having a number of input terminals $\Omega$, with $\Omega=1, 2 \ldots l$, and a number of output terminals $\sigma$, with $\sigma=1, 2 \ldots m$ and having a distinctive transfer function $A\Omega_\sigma(s)$ between each said input terminal and each said output terminal, said second device having a number of input points $\lambda$, with $\lambda=1, 2 \ldots m_2$ and a number of output points $\tau$, with $\tau=1, 2 \ldots n$, and having a distinctive transfer function $A_{\lambda\tau}(s)$ between each said input point and each said output point, such that said multiple input-multiple output control system provides controlled variable $C_\theta(s)$ in response to command signal $V_\rho(s)$ of the form $$C_\theta(s) = \sum_{\lambda=1}^{\lambda=m_2} A_{\lambda\tau}(s) X_\lambda(s)$$

where $\tau=\theta$, and where each $$X_\lambda(s) = \sum_{\Omega=1}^{\Omega=l} A_{\Omega\sigma}(s) V_\Omega(s)$$

where $\sigma=\lambda$, and $\Omega=\rho$, and thus each $C_\theta(s)$ is the sum of any specified number of specified functions, where each said specified function is of a single input $V_\rho(s)$, with the one of said devices that constitutes said part of the system being controlled having each of its distinctive transfer characteristics of the form $g_{\beta\gamma}(s)$ and with the one of said devices that constitutes said signal component control apparatus having means connected between each input and output thereof for delaying a signal passing through said apparatus different intervals of time to produce a plurality of signal components and including means for altering the value of at least some of said signal components and means for summing said signal components to provide a composite signal containing components characterized by discrete time delays and changed values in accordance with a transfer function $b_{\alpha\beta}(s)$.

33. In a total system for controlling the output, or outputs, of a control system in which there are one or more input command signals and one or more output controlled variables, and in which there is more than one input signal and/or more than one output controlled variable, said total system comprising:
(a) means including a signal component control device to modify the command function of each input command signal, each such signal component control device including means form delaying a signal passing through the device different intervals of time, while also retaining the undelayed signal to produce therewith a plurality of components, altering the magnitude and, if necessary, the sign of said components so that when added together the resultant output signal is a specified function of the input signal to said device, and then adding together said altered components; and
(b) means for causing the output, or outputs, of each such device to be fed to the remainder of the total system being controlled to cause the outputs of the total system being controlled to be specified functions of one or more of the input command functions.

34. A total system as set forth in claim 33 in which the control system is of the open loop type.

35. A total system as set forth in claim 34 in which the control system is a part of a larger control system.

36. A total system as set forth in claim 33 in which the control system contains feed back.

37. A total system as set forth in claim 36 in which one of said signal component control devices is used in the forward paths of the control system to modify the signal passing between each input point and each output point in the control system.

38. A total system as set forth in claim 36 in which the control system is characterized by a number of outputs equal to or greater than the number of inputs, and in which the output of each signal component control device is a specified function of one and only one input whereby said control system functions as a non-interacting system with specified input-output characteristics.

39. A total system as set forth in claim 37 in which one or more of said signal component control devices is used in a feed back path.

References Cited by the Examiner

UNITED STATES PATENTS

| | | | |
|---|---|---|---|
| 2,801,351 | 7/1957 | Calvert et al. | 235—181 X |
| 2,829,322 | 4/1958 | Silva | 235—151 X |
| 2,922,965 | 1/1960 | Harrison. | |
| 3,010,035 | 11/1961 | Calvert et al. | |
| 3,051,883 | 8/1962 | Smith | 307—149 X |
| 3,109,970 | 11/1963 | Smith | 318—28 |
| 3,110,802 | 11/1963 | Ingham et al. | 340—166 X |
| 3,135,917 | 6/1964 | Best et al. | 333—166 X |
| 3,184,662 | 5/1965 | Wallace | 318—18 |

OTHER REFERENCES

Short-Time Memory Devices in Closed Loop System Steady-State Response, pages 340–344, J. F. Calvert et al., III; in AIEE Transactions, Part II, volume 74.

MALCOLM A. MORRISON, *Primary Examiner.*

I. KESCHNER, *Assistant Examiner.*

UNITED STATES PATENT OFFICE
CERTIFICATE OF CORRECTION

Patent No. 3,317,719                                          May 2, 1967

John F. Calvert et al.

It is hereby certified that error appears in the above numbered patent requiring correction and that the said Letters Patent should read as corrected below.

Column 2, line 47, for "$[N_{a_x \beta}(s)]$" read -- $[N_{\alpha_x \beta}(s)]$ --; column 4, line 19, for "$V_1(t), V_2(t)...V_1(t)$" read -- $V_1(t), V_2(t),..., V_\ell(t)$ --; line 21, for "$X_1(t), X_2(t)...X_m(t)$" read -- $X_1(t), X_2(t), ..., X_m(t)$ --; same column 4, lines 72 and 73, the formula should appear as shown below instead of as in the patent:

$$b_{\alpha\beta}(s) = \left\{ B_0 + B_1 \epsilon^{-T_1 s} + B_2 \epsilon^{-T_2 s} + B_3 \epsilon^{-T_3 s} \right\} \frac{1}{N_{x}(p)_{\alpha\beta}}$$

column 5, line 4, for "$r_a(s)$" read -- $r_\alpha(s)$ --; lines 6 to 8, the formula should appear as shown below instead of as in the patent:

$$b_{\alpha\beta}(s) r_\alpha(s) = \left[ \frac{1}{N_x(s)_{\alpha\beta}} \right] \left\{ \begin{array}{l} B_0 r_\alpha(s) + B_1 \epsilon^{-T_1 s} r_\alpha(t) \\ \phantom{B_0} {\alpha\beta} \phantom{r_\alpha(s)+B} {\alpha\beta} \\ + B_2 \epsilon^{-T_2 s} r_\alpha(s) + B_3 \epsilon^{-T_3 s} r_\alpha(t) \\ \phantom{+B_2\epsilon} {\alpha\beta} \phantom{r_\alpha(s)+B} {\alpha\beta} \end{array} \right\}$$

same column 5, lines 14 to 18, the formula should appear as shown below instead of as in the patent:

$$b_{\alpha\beta}(p) r_\alpha(t) = \frac{1}{N_x(p)_{\alpha\beta}} \left\{ \begin{array}{l} B_0 r(t) + B_1(p) r_\alpha(t-T_1) U(t-T_1) + \\ {\alpha\beta} \phantom{r(t)+B} {\alpha\beta} \\ B_2 r_\alpha(t-T_2) U(t-T_2) + B_3 r_\alpha(t-T_3) U(t-T_3) \\ {\alpha\beta} \phantom{r_\alpha(t-T_2)U(t-T_2)+B} {\alpha\beta} \end{array} \right\}$$

column 7, line 64, for that portion of the equation reading "$g_{21}^{(s)}$" read -- $g_{21}(s)$ --; column 8, line 18, for that portion of the equation reading "$h_{12}(s)\}$" read -- $h_{12}(s))\}$ --; lines 35 and 36, after the equation insert a vertical line; column 9, line 22, for "$[B(j\omega)G(j\omega)]_{a\beta}$" read -- $[B(j\omega)G(j\omega)]_{\alpha\beta}$ --;

(2)
3,317,719 line 25, for "$h(j\omega)_{\gamma a}$" read -- $h(j\omega)_{\gamma\alpha}$ --; line 26, for
"$\{[B(j\omega)G(j\omega)]_{a\beta}h(j\omega)_{\gamma a}\}$" read -- $\{[B(j\omega)G(j\omega)]_{\alpha\beta}h(j\omega)_{\gamma\alpha}\}$ --;
lines 53 and 54, for that portion of the equation reading
"$C^Z_\cong$" read -- $C_2\cong$ --; line 57, for "$V_1(j\omega$" read -- $V_1(j\omega)$ --;
column 10, line 7, for "pnumatic" read -- pneumatic --; line
12, for that portion of the equation reading "$G^{-1}C(t)=$" read
-- $G^{-1}C(t)=$ --; line 47, for that portion of the equation
reading "$-G_{11}{}^1$" read -- $-G_{11}{}^{-1}$ --; lines 50 and 51, the
the equation should appear as shown below instead of as in
the patent:

$$\eta_2(t)=\{g_{21}{}^{-1}[C(t)]-G_{21}{}^{-1}[C_1(t)]\}+\{g_{22}[C_2(t)]-G_{22}{}^{-1}[C_2(t)]\}$$

same column 10, line 69, for that portion of the equation
reading "$\mu_2{}'(t)\}$" read -- $\mu_2{}'(t)]\}$ --; column 11, line 6, for
that portion of the equation reading "$(p)\eta_2(t)$" read
-- $(p)[\eta_2(t)$ --; line 7, for that portion of the equation read-
ing "$+\mu_2{}'(t)]+g_{22}(p)\eta_2(t)$" read -- $+\mu_1{}'(t)]+g_{22}(p)[\eta_2(t)$ --;
line 30, for that portion of the equation reading "$\beta_{12}(p)=$"
read -- $b_{12}(p)=$ --; line 53, for that portion of the equation
reading "$(t)-[B(p)$" read -- $(t)+[B(p)$ --; same column 11, line
65, after the closing brace insert -- $-\delta_2(t)$ --; column 12,
line 23, for that portion of the equation reading "$(s)\}\delta'(s)$"
read -- $(s)\}\delta'_1(s)=[1-\{[B(s)G(s)]_{22}h_{22}(s)$ --; same column 12,
lines 28 and 57, for "$[B(s)G(s)]_{a\beta}$", each occurrence, read
-- $[B(s)G(s)]_{\alpha\beta}$ --; line 44, for "38-42", second occurrence,
read -- 38-45 --; column 13, line 29, for "$h_{a\beta}(s)$" read
-- $h_{\alpha\beta}(s)$ --; column 14, line 59, for that portion of the
equation reading "$\ldots+b_{11}(s)r_1(s)$" read -- $\ldots+b_{\ell 1}(s)r_\ell(s)$ --;
line 60, for that portion of the equation reading
"$\ldots+b_{12}(s)r_1(s)$" read -- $\ldots+b_{\ell 2}(s)r_\ell(s)$ --; line 65, for
that portion of the equation reading "$\ldots+b_{1m}(s)r_1(s)$" read
-- $\ldots+b_{\ell m}(s)r_\ell(s)$ --; column 15, line 3, for "$+g_{11}(s)b_{11}(s)r_1(s)$"
read -- $+g_{11}(s)b_{\ell 1}(s)r_\ell(s)$ --; line 6, for
"$+g_{21}(s)b_{12}(s)r_1(s)$" read -- $+g_{21}(s)b_{\ell 2}(s)r_\ell(s)$ --; line 11,
for "$+g_{m\ell}(s)b_{1m}(s)r_1(s)$" read -- $+g_{m\ell}(s)b_{\ell m}(s)r_\ell(s)$ --; line
14, for "$+g_{12}(s)b_{11}(s)r_1(s)$" read -- $+g_{12}(s)b_{\ell 1}(s)r_\ell(s)$ --;
line 16, for "$+g_{22}(s)b_{12}(s)r_1(s)$" read -- $+g_{22}(s)b_{\ell 2}(s)r_\ell(s)$
--; line 23, for "$+g_{m2}(s)b_{1m}(s)r_1(s)$" read -- $+g_{m2}(s)b_{\ell m}(s)r_\ell(s)$ (3)
3,317,719

--; line 25, for "$+g_{1n}(s)b_{11}(s)r_1(s)$" read -- $+g_{1n}(s)b_{\ell 1}(s)r_\ell(s)$
--; line 27, for "$+g_{2n}(s)b_{12}(s)r_1(s)$" read -- $+g_{2n}(s)b_{\ell 2}(s)r_\ell(s)$
--; line 32, for "$+g_{mn}(s)b_{1m}(s)r_1(s)$" read -- $+g_{mn}(s)b_{\ell m}(s)r_\ell(s)$
--; same column 15, lines 47 to 49 and lines 58 and 59, for that portion of the equation, each occurrence, reading $$\sum_{a=1}^{a=1} \quad \text{read} \quad \sum_{\alpha=1}^{\alpha=\ell}$$

line 49, strike out "(38-62)"; line 51, strike out "(38-63"; line 53, for that portion of the equation reading "$[B(s)G(s)]_{\alpha\gamma}$" read -- $[B(s)G(s)]_{\alpha\gamma}$ --; line 57, strike out "(38-64)"; line 64, for "$+[B(s)G(s)]_{11}r_1(s)$" read -- $+[B(s)G(s)]_{\ell 1}r_\ell(s)$; same column 15, line 66, and column 17, line 5, for "$+[B(s)G(s)]_{12}r_1(s)$", each occurrence, read -- $+[B(s)G(s)]_{\ell 2}r_\ell(s)$ --; column 15, line 72, and column 17, line 10, for "$+[B(s)G(s)]_{1n}r_1(s)$", each occurrence, read -- $+[B(s)G(s)]_{\ell n}r_\ell(s)$ --; column 16, line 4, the equation should appear as shown below instead of as in the patent:

$$[BG]_{12} = |B(j\omega)G(j\omega)|_{12}\epsilon^{-jT_1\omega}$$

same column 16, line 5, the equation should appear as shown below instead of as in the patent:

$$[BG]_{1n} = |B(j\omega)G(j\omega)|_{1n}\epsilon^{-jT_1\omega}$$

same column 16, line 8, for "$g_{\beta\gamma}(j\omega)b_{a\beta}(j\omega)=g_{\beta\gamma}b_{a\beta}$" read -- $g_{\beta\gamma}(j\omega)b_{\alpha\beta}(j\omega)=g_{\beta\gamma}b_{\alpha\beta}$ --; same column 16, line 29, the equation should appear as shown below instead of as in the patent:

$$g_{11}b_{\ell 1} + g_{21}b_{\ell 2} + \ldots + g_{m1}b_{\ell m} = |BG|_{\ell 1}\epsilon^{-jT_\ell \omega}$$

same column 16, line 33, the equation should appear as shown below instead of as in the patent:

$$g_{1n}b_{\ell 1} + g_{2n}b_{\ell 2} + \ldots + g_{mn}b_{\ell m} = |BG|_{\ell n}\epsilon^{-jT_\ell \omega}$$

same column 16, line 36, for "$b_{a\beta}$" read -- $b_{\alpha\beta}$ --; lines 38 and 42, for "$(BG)_{a\gamma}$", each occurrence, read -- $(BG)_{\alpha\gamma}$ --;

(4)
3,317,719 lines 40 and 41, for "$(b_{a\beta})$", each occurrence, read -- $(b_{\alpha\beta})$ --; lines 52 and 56, for "$[BG]_{a\gamma}$", each occurrence, read -- $[BG]_{\alpha\gamma}$ --; column 17, line 20, for "$r_1(s)=V_1(s)+h_{11}(s)C_1(s)+h_{21}(s)C_2(s)$" read -- $r_\ell(s)=V_\ell(s)+h_{1\ell}(s)C_1(s)+h_{2\ell}(s)C_2(s)$ --; line 21, for "$+h_{n1}(s)C_n(s)$" read -- $+h_{n\ell}(s)C_n(s)$ --; line 33, for "$+[BG]_{11}V_1+[BG]_{11}[h_{11}C_1+h_{21}C_2+\ldots+h_{n1}C_n]$" read -- $+[BG]_{\ell 1}V_\ell+[BG]_{\ell 1}[h_{1\ell}C_1+h_{2\ell}C_2+\ldots+h_{n\ell}C_n]$ --; lines 35, 38, 40, 42, 49, 52, 62 and 65, and column 34, line 73, and column 40, line 43, for that portion of the equations, each occurrence, reading $$\sum_{\alpha=1}^{\alpha=1} \quad \text{read} \quad \sum_{\alpha=1}^{\alpha=\ell}$$

column 17, line 56, for "$h_{\alpha\gamma}=0$" read -- $h_{\gamma\alpha}=0$ --; same column 17, line 59, and column 18, line 2, for "$V_a$", each occurrence, read -- $V_\alpha$ --; column 17, lines 72 to 75, the equation should appear as shown below instead of as in the patent:

$$C\ell = \frac{\sum_{\alpha=1}^{\alpha=\ell} [BG]_{\alpha\ell}V_\alpha}{\{1-BG_{\ell\ell} h_{\ell\ell}}$$

column 18, line 2, for "$C_1$", second occurrence, read -- $C_\ell$ --; line 5, for "$(BG)_{a\gamma}=0$" read -- $(BG)_{\alpha\gamma}=0$ --; line 8, for "$C_\gamma=[BG]_{\gamma\gamma}V\alpha\{1-[BG]_{\gamma\gamma}h_{\gamma\gamma}\}$" read -- $C_\gamma=[BG]_{\gamma\gamma}V\gamma\{1-[BG]_{\gamma\gamma}h_{\gamma\gamma}\}$ --; line 42, for "$n_{m1}(t)+$" read -- $n_m(t)+$ --; line 49, for "$+[B(p)G(p)]_{11}r_1(t)-\delta_1(t)$" read -- $+[B(p)G(p)]_{\ell 1}r_\ell(t)-\delta_1(t)$ --; line 51, for "$+[B(p)G(p)]_{12}r_1(t)-\delta_2(t)$" read -- $+[B(p)G(p)]_{\ell 2}r_\ell(t)-\delta_2(t)$ --; same column 18, line 56, for "$+[B(p)G(p)]_{1n}r_1(t)-\delta_n(t)$" read -- $+[B(p)G(p)]_{\ell n}r_\ell(t)-\delta_n(t)$ --; column 19, line 8, the equation should appear as shown below instead of as in the patent:

$$z_\ell(t)=h_{1\ell}(p)\delta_1(t)+h_{2\ell}(p)\delta_2(t)+\ldots+h_{n\ell}(p)\delta_n(t)$$

line 17, the equation should appear as shown below instead of as in the patent:

(5)
3,317,719

$$r_\ell(t) = V_\ell(t) + z_\ell(t)$$

lines 28 to 30, the equation should appear as shown below instead of as in the patent:

$$+[B(p)G(p)]_{\ell 1}V(t) + [B(p)G(p)]_{\ell 1}$$
$$\{h_{1\ell}(p)\delta_1(t) + h_{2\ell}(p)\delta_2(t)$$
$$+ \ldots + h_{n\ell}(p)\delta_n(t)\}$$

lines 40 and 41, the equation should appear as shown below instead of as in the patent:

$$+[B(p)G(p)]_{\ell 2}V_\ell(t) + [B(p)G(p)]_{\ell 2}$$
$$\{h_{1\ell}(p)\delta_1(t) + h_{2\ell}(p)\delta_2(t) + \ldots + h_{n\ell}\delta_n(t)\}$$

lines 55 and 56, the equation should appear as shown below instead of as in the patent:

$$+[B(p)G(p)]_{\ell n}V_\ell(t) + [B(p)G(p)]_{\ell n}$$
$$\{h_{1\ell}(p)\delta_1(t) + h_2(p)\delta_2(t) + \ldots$$

line 60, for "$[B(p)G(p)]_{1n}$" read -- $[B(p)G(p)]_{\ell n}$ --; same column 19, line 62, for "$V_1(t)$" read -- $V_\ell(t)$ --; column 20, line 8, for "$V_1(t)\ldots V_1(t)$" read -- $V_1(t)\ldots V_\ell(t)$ --; line 20, the equation should appear as shown below instead of as in the patent:

$$\ldots + [B(s)G(s)]_{\ell 1}\left\{\sum_{\gamma=1}^{\gamma=n} h_{\gamma\ell}(s)\delta_\gamma{'}(s)\right\} = 0$$

same column 20, line 41, the equation should appear as shown below instead of as in the patent:

$$\ldots + [B(s)G(s)]_{\ell n}\left\{\sum_{\gamma=1}^{\gamma=n} h_{\gamma\ell}(s)\delta_\gamma{'}(s)\right\} - \delta_n{'}(s) = 0$$

same column 20, line 48, for "$[B(s)G(s)]_{a\beta}$" read -- $[B(s)G(s)]_{\alpha\beta}$ --; same line 48, for "$h_{\gamma a}(s)$" read -- $h_{\gamma\alpha}(s)$ --; line 54, for "$\delta=1,2\ldots n$" read -- $\gamma=1,2\ldots n$ --; lines 56 to 59, the equation should appear as shown below instead of as in the patent:

(6)
3,317,719

$$[B(s)G(s)]_{11}h_{11}(s)+[B(s)G(s)]_{21}h_{12}(s)+\ldots$$
$$+[B(s)G(s)]_{\ell 1}h_{1\ell}(s)=k_1$$
$$[B(s)G(s)]_{12}h_{11}(s)+[B(s)G(s)]_{22}h_{12}(s)+\ldots$$
$$+[B(s)G(s)]_{\ell 2}h_{1\ell}(s)=0$$

same column 20, line 65, for "$+[B(s)G(s)]_{1n}h_{11}(s)=0$" read
-- $+[B(s)G(s)]_{\ell n}h_{1\ell}(s)=0$ --; line 68, for
"$+[B(s)G(s)]_{11}h_{21}(s)=0$" read -- $+[B(s)G(s)]_{\ell 1}h_{2\ell}(s)=0$ --;
line 70, for "$+[B(s)G(s)]_{12}h_{21}(s)=k_2$" read --
$+[B(s)G(s)]_{\ell 2}h_{2\ell}(s)=k_2$ --; same column 20, line 75, for
"$+[B(s)G(s)]_{1n}h_{21}(s)=0$" read -- $+[B(s)G(s)]_{\ell n}h_{2\ell}(s)=0$ --;
column 21, line 2, for "$+[B(s)G(s)]_{11}h_{n1}(s)=0$" read
-- $+[B(s)G(s)]_{\ell 1}h_{n\ell}(s)=0$ --; line 4, for
"$+[B(s)G(s)]_{1n}h_{n1}(s)=0$" read -- $+[B(s)G(s)]_{\ell n}h_{n\ell}(s)=0$ --;
line 10, for "$+[B(s)G(s)]_{1n}h_{n1}(s)=k_n$" read --
$+[B(s)G(s)]_{\ell n}h_{n\ell}(s)=k_n$ --; same column 21, line 65, for
"$V_1(t), V_2(t)\ldots V_1(t)$" read -- $V_1(t), V_2(t)\ldots V_\ell(t)$ --;
column 22, line 32, for "$V_1=V_{1000}$" read -- $V_\ell=V_{1000}$ --;
line 61, for "$V_1(t), V_2(t)\ldots V_1(t)$" read --
$V_1(t), V_2(t)\ldots V_\ell(t)$ --; line 64, for "$V_a(t-T_k)$" read
-- $V_\alpha(t-T_k)$ --; column 23, line 34, for "or" read -- of --;
line 42, for "$_1b_{a\beta}(p)$, at $_1h_{\gamma a}(p)$ at $_2b_{a\beta}(p)$ and at
$_1h_{\gamma a}(p)$" read -- $_1b_{\alpha\beta}(p)$, at $_1h_{\gamma\alpha}(p)$ at $_2b_{\alpha\beta}(p)$ and at
$_2h_{\gamma\alpha}(p)$ --; column 24, line 4, for "$S=Re^{\tau\theta}$" read -- $S=Re^{\partial\theta}$
--; line 9, for "$V_a(t)$" read -- $V_\alpha(t)$ --; line 15, for
"$r_a(t)$" read -- $r_\alpha(t)$ --; line 23, for "$z_a(t)$" read -- $z_\alpha(t)$
--; line 33, for "$V_a(s), C_\gamma(s), r_a(s), X_\beta(s), y_\gamma(s), z_a(s)$,"
read -- $V_\alpha(s), C_\gamma(s), r_\alpha(s), X_\beta(s), y_\gamma(s), z_\alpha(s)$, --; line
34, for "$V_a(t), C_\gamma(t), r_a(t)$," read -- $V_\alpha(t), C_\gamma(t), r_\alpha(t)$,
--; line 35, for "$z_a(t)$" read -- $z_\alpha(t)$ --; line 37, for
"$z_a(j\omega)$" read -- $z_\alpha(j\omega)$ --; line 38, for "$V_a(t), C_\gamma(t),
r_a(t), x_\beta(t), y_\gamma(t), z_a(t)$," read -- $V_\alpha(t), C_\gamma(t), r_\alpha(t),
x_\beta(t), y_\gamma(t), z_\alpha(t)$, --; same column 24, line 47, for
"$--_{\beta\gamma}(s)$" read -- $N_{\beta\gamma}(s)$ --; column 25, line 5, for "Leplace"
read -- Laplace --; line 12, for "$[B(s)G(s)]_{a\gamma}$" read --
$[B(s)G(s)]_{\alpha\gamma}$ --; line 15, for "$[b_{a\beta}(s)g_{a\beta}(s)]$" read -- $[b_{\alpha\beta}(s)g_{\alpha\beta}(s)]$ --; column 27, line 59, column 28, lines 26 and 69, column 31, line 36, column 35, line 33, column 36, lines 8 and 57, column 37, line 31, column 38, lines 2 and 47, column 39, lines 15 and 65, column 41, line 66, column 42, line 44 and column 43, line 20, for that portion of the formula, each occurrence, reading $$\sum_{\Omega=1}^{\Omega=1} \quad \text{read} \quad \sum_{\Omega=1}^{\Omega=\ell}$$

line 38, for "$b_{a\beta}(s)$" read -- $b_{\alpha\beta}(s)$ --; column 29, line 26, for "$C_\tau(s)$ in response to input signals $V_a(s)$" read -- $C_\gamma(s)$ in response to input signals $V_\alpha(s)$ --; lines 28 to 30, the formula should appear as shown below instead of as in the patent:

$$C_\gamma(s) = \left\{ \sum_{\beta=1}^{\beta=m} g_{\beta\gamma}(s) \left[ \sum_{\alpha=1}^{\alpha=\ell} b_{\alpha\beta}(s) V_\alpha(s) \right] \right\}$$

same column 29, line 40, for "$V_a(s)$" read -- $V_\alpha(s)$ --; line 63, for that portion of the formula reading $$\sum_{\rho=1}^{\rho=1} \quad \text{read} \quad \sum_{\rho=1}^{\rho=\ell}$$

same column 29, line 73, for "$S_\theta(s)$" read -- $C_\theta(s)$ --; column 30, line 7, for "ils" read -- is --; column 33, lines 32 to 34, the formula should appear as shown below instead of as in the patent:

$$C_\theta(s) = \left\{ \sum_{\lambda=1}^{\lambda=m_2} g_{\lambda\tau}(s) \left[ \sum_{\Omega=1}^{\Omega=\ell} b_{\Omega\sigma}(s) V_\rho(s) \right] \right\}$$

same column 33, line 54, for "$V_a(t)$" read -- $V_\alpha(t)$ --; line 56, for "$r_a(t)=V_a(t)-Z_a(t)$" read -- $r_\alpha(t)=V_\alpha(t)-Z_\alpha(t)$ --; column 34, lines 5 and 6, the formula should appear as shown below instead of as in the patent:

$$C_\gamma(t) = \sum_{\beta=1}^{\beta=m} g_{\beta\gamma}(p) \left\{ \sum_{\alpha=1}^{\alpha=\ell} b_{\alpha\beta}(p) r_\alpha(t) + \left[ \mu_\beta'(t) + \eta_\beta(t) \right] \right\}$$

same column 34, lines 11 and 12, the formula should appear as shown below instead of as in the patent:

$$Y_\xi(t) = \sum_{\beta=1}^{\beta=m} g_{\beta\gamma}(p) \left( \sum_{\alpha=1}^{\alpha=\ell} b_{\alpha\beta}(p) r(t) \right)$$

same column 34, lines 18 to 20, the formula should appear as shown below instead of as in the patent:

$$Z_\alpha(t) = \sum_{\gamma=1}^{\gamma=n} h_{\gamma\alpha}(s) \delta_\gamma(s)$$

same column 34, lines 23 to 25, strike out the formula; lines 35 to 37, the equation should appear as shown below instead of as in the patent:

$$+[B(p)G(p)]_{\ell_1} V(t) + [B(p)G(p)]_{\ell_1}$$
$$\{h_{1\ell}(p)\delta_1(t)$$
$$+h_{2\ell}(p)\delta_2(t)+\ldots+h_{n\ell}(p)\delta_n(t)\}$$

same column 34, line 50, for "$+[B(p)G(p)]_{12}V_\delta(t)+[B(p)G(p)]_{12}$" read -- $+[B(p)G(p)]_{\ell_2}V_\ell(t)+[B(p)G(p)]_{\ell_2}$ --; line 62, for "$h_{22}(p)\delta_2(t)+\ldots+h_{n2}(p)\delta(t)\}$" read -- $+h_{22}(p)\delta_2(t)+\ldots+h_{n2}(p)\delta_n(t)\}$ --; lines 66 to 68, the equation should appear as shown below instead of as in the patent:

(9)
3,317,719

$$+[B(p)G(p)]_{\ell_n}V_\ell(t)+[B(p)G(p)]_{\ell_n}\{h_{1\ell}(p)\delta_1(t)+h_{2\ell}(p)\delta_2(t)+\ldots+h_{n\ell}(p)\delta_n(t)\}-\delta_n(t)$$

column 35, line 17, for "$\Omega=1,2\ldots1$" read -- $\Omega=1,2\ldots\ell$ --; line 41, for "$g_{\beta\tau}(s)$" read -- $g_{\beta\gamma}(s)$ --; column 36, line 26, for "havin ga" read -- having a --; line 43, for "$A_\sigma(s)$" read -- $A_{\Omega\sigma}(s)$ --; column 37, line 54, for "$V_{\Omega p}(s)$" read -- $V_\rho(s)$ --; line 59, for "$C_\tau(s)$" read -- $C_\theta(s)$ --; column 40, lines 52 and 53, the formula should appear as shown below instead of as in the patent:

$$y_\xi(t) = \sum_{\beta=1}^{\beta=m} g_{\beta\gamma}(p) \left\{ \sum_{\alpha=1}^{\alpha=\ell} b_{\alpha\beta}(p) r(t) \right\}$$

same column 40, line 58, for that portion of the formula reading $$\sum_{\alpha=1}^{\alpha=1} \quad \text{read} \quad \sum_{\gamma=1}^{\gamma=n}$$

same column 40, lines 73 to 75, the equation should appear as shown below instead of as in the patent:

$$+[B(p)G(p)]_{\ell_1}V(t)+[B(p)G(p)]_{\ell_1}\{h_{1\ell}(p)\delta_1(t)+h_{2\ell}(p)\delta_2(t)+\ldots+h_{n\ell}(p)\delta_n(t)\}$$

column 41, lines 9 and 10, the equation should appear as shown below instead of as in the patent:

$$+[B(p)G(p)]_{\ell_2}V_\ell(t)+[B(p)G(p)]_{\ell_2}\{h_{1\ell}(p)\delta_1(t)+h_{2\ell}(p)\delta_2(t)+h_{n\ell}\delta_n(t)\}$$

(10)
3,317,719 same column 41, lines 23 to 25, the equation should appear as shown below instead of as in the patent:

$$+[B(p)G(p)]_{\ell_n}V_\ell(t)+[B(p)G(p)]_{\ell_n}\{h_{1\ell}(p)\delta_1(t)+h_{2\ell}(p)\delta_2(t)+\ldots+h_{n\ell}(p)\delta_n(t)\}-\delta_n(t)$$

same column 41, line 39, for "cascade" read -- cascaded --; column 43, line 49, for "form" read -- for --.

Signed and sealed this 26th day of December 1967.

(SEAL)
Attest:

EDWARD M. FLETCHER, JR.
Attesting Officer

EDWARD J. BRENNER
Commissioner of Patents

UNITED STATES PATENT OFFICE
CERTIFICATE OF CORRECTION

Patent No. 3,317,719

May 2, 1967

John F. Calvert et al.

It is hereby certified that error appears in the above numbered patent requiring correction and that the said Letters Patent should read as corrected below.

Column 10, lines 27 to 51, wherever "$G^{-1}$" with or without subscripts appears, substitute with $\mathcal{J}^{-1}$ using the identical subscripts as heretofore used for "$G^{-1}$"; same column 10, line 30, for "$g^{-}[c(t)]$" read read -- $g^{-1}[c(t)]$ --; column 12, lines 7 and 10, for "G", each occurrence, read -- $\mathcal{J}$ --; column 15, line 75, the equation should appear as shown below instead of as in the patent:

$$[BG]_{\alpha\beta} = [B(j\omega)G(j\omega)]_{\alpha\beta} = \left| B(j\omega)G(j\omega) \right|_{\alpha\beta} \varepsilon^{-jT_{\alpha\omega}}$$

column 17, line 4, for "$+[B(s)G(s)]_{12}r_1(s)$" read -- $+[B(s)G(s)]_{\ell 2}r_\ell(s)$ --; column 18, line 2, for "all $c_1 \ldots c_2 \ldots c_1$" read -- all $c_1 \ldots c_2 \ldots c_\ell$ --; column 29, lines 4 and 34, column 31, line 55, column 33, line 48 and column 35, lines 1 and 52, for "1", each occurrence, read -- $\ell$ --; column 33, lines 59 and 63, for "Yξ", each occurrence, read -- yξ --; same column 33, line 60, for "$r_a(t)$" read -- $r_\alpha(t)$ --.

Signed and sealed this 14th day of January 1969.

(SEAL)
Attest:

EDWARD M. FLETCHER, JR.
Attesting Officer

EDWARD J. BRENNER
Commissioner of Patents